US009978097B1

(12) United States Patent
Melling et al.

(10) Patent No.: US 9,978,097 B1
(45) Date of Patent: May 22, 2018

(54) ACCRUALS PROCESSING WITHIN AN ELECTRONIC INVOICING AND BUDGETING SYSTEM

(75) Inventors: Thomas G. Melling, Sammamish, WA (US); Ronald G. Wencel, Frankfort, IL (US); Steven A. Jatnieks, Plainfield, IL (US); Gregory P. Shriber, Issaquah, WA (US); Richard D. Boone, Kirkland, WA (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 1648 days.

(21) Appl. No.: 11/847,258

(22) Filed: Aug. 29, 2007

(51) Int. Cl.
G06Q 40/00 (2012.01)
G06Q 20/14 (2012.01)

(52) U.S. Cl.
CPC ............. *G06Q 40/00* (2013.01); *G06Q 20/14* (2013.01)

(58) Field of Classification Search
CPC ........ G06Q 40/00; G06Q 20/22; G06Q 20/29; G06Q 20/341; G06Q 30/04; G06Q 20/14; G06Q 10/00
USPC ....................................................... 705/1–15
See application file for complete search history.

(56) References Cited

U.S. PATENT DOCUMENTS

| | | | |
|---|---|---|---|
| 5,216,592 A | 6/1993 | Mann et al. | |
| 5,765,140 A | 6/1998 | Knudson et al. | |
| 5,811,771 A * | 9/1998 | Dethloff | G06Q 20/341 235/375 |
| 5,893,905 A | 4/1999 | Main et al. | |
| 5,907,490 A | 5/1999 | Oliver | |
| 5,991,742 A | 11/1999 | Tran | |
| 6,247,047 B1 | 6/2001 | Wolff | |
| 6,523,027 B1 | 2/2003 | Underwood | |
| 6,601,233 B1 | 7/2003 | Underwood | |
| 6,609,128 B1 | 8/2003 | Underwood | |
| 6,629,081 B1 | 9/2003 | Cornelius et al. | |
| 6,633,878 B1 | 10/2003 | Underwood | |
| 6,804,785 B2 | 10/2004 | Steele et al. | |
| 6,882,986 B1 | 4/2005 | Heinemann et al. | |
| 6,963,885 B2 * | 11/2005 | Calkins et al. | G06F 17/30 707/202 |
| 7,013,290 B2 | 3/2006 | Ananian et al. | |
| 7,305,392 B1 | 12/2007 | Abrams et al. | |
| 7,406,427 B1 | 7/2008 | Guyan et al. | |
| 7,437,327 B2 | 10/2008 | Lam et al. | |
| 7,689,482 B2 | 3/2010 | Lam et al. | |

(Continued)

OTHER PUBLICATIONS

Gerry Blackwell, Preparing for the e-billing revolution, Canadian Lawyer Magazine Inc., web, 1-2 (Year: 2007).*

(Continued)

*Primary Examiner* — I Jung Liu

(74) *Attorney, Agent, or Firm* — Norton Rose Fulbright US LLP

(57) ABSTRACT

A facility for conveying accrual amounts through an intermediary service is described. The facility permits vendors to each upload unbilled amounts for one or more matters for a client according to vendor-specific matter identifiers. The facility maps the vendor-specific identifiers for the uploaded unbilled amounts to client-specific identifiers. When the facility receives a request from the client to be you unbilled amounts for one or more matters, the facility displays to a client user the unbilled amounts for the requested matters according to the client-specific identifiers associated with the requested matters.

78 Claims, 47 Drawing Sheets

(56) References Cited

U.S. PATENT DOCUMENTS

| | | | |
|---|---|---|---|
| 7,693,759 B2* | 4/2010 | Alberti et al. | 705/30 |
| 7,707,055 B2 | 4/2010 | Behmoiras et al. | |
| 8,121,908 B2 | 2/2012 | Oney et al. | |
| 2001/0032170 A1 | 10/2001 | Sheth | |
| 2001/0042032 A1 | 11/2001 | Crawshaw et al. | |
| 2002/0023030 A1 | 2/2002 | Prohaska et al. | |
| 2002/0040352 A1 | 4/2002 | McCormick | |
| 2002/0111897 A1 | 8/2002 | Davis | |
| 2002/0112186 A1 | 8/2002 | Ford et al. | |
| 2002/0156697 A1 | 10/2002 | Okuhara et al. | |
| 2002/0173934 A1 | 11/2002 | Potenza | |
| 2002/0178093 A1 | 11/2002 | Dean et al. | |
| 2002/0194081 A1 | 12/2002 | Perkowski | |
| 2002/0198791 A1 | 12/2002 | Perkowski | |
| 2003/0018543 A1 | 1/2003 | Alger et al. | |
| 2003/0028451 A1 | 2/2003 | Ananian | |
| 2003/0033226 A1 | 2/2003 | Anderson | |
| 2003/0046169 A1 | 3/2003 | Fraser et al. | |
| 2003/0069839 A1 | 4/2003 | Whittington et al. | |
| 2003/0097342 A1 | 5/2003 | Whittingtom | |
| 2003/0144969 A1 | 7/2003 | Coyne | |
| 2003/0212609 A1 | 11/2003 | Blair et al. | |
| 2004/0019528 A1 | 1/2004 | Broussard et al. | |
| 2004/0034578 A1 | 2/2004 | Oney et al. | |
| 2004/0059628 A1 | 3/2004 | Parker et al. | |
| 2004/0093302 A1 | 5/2004 | Baker et al. | |
| 2004/0230523 A1 | 11/2004 | Johnson | |
| 2004/0243483 A1 | 12/2004 | Baumann et al. | |
| 2005/0027586 A1 | 2/2005 | Bacon et al. | |
| 2005/0033598 A1 | 2/2005 | Knapp et al. | |
| 2005/0049966 A1 | 3/2005 | Melling et al. | |
| 2005/0065880 A1* | 3/2005 | Amato | G06Q 20/102 705/40 |
| 2005/0132048 A1 | 6/2005 | Kogan et al. | |
| 2005/0144125 A1* | 6/2005 | Erbey | G06Q 40/00 705/40 |
| 2005/0171875 A1* | 8/2005 | Seitz | G06Q 40/00 705/30 |
| 2005/0203800 A1 | 9/2005 | Sweeney et al. | |
| 2005/0203814 A1 | 9/2005 | Derry et al. | |
| 2005/0278232 A1 | 12/2005 | Bruffey et al. | |
| 2007/0061260 A1* | 3/2007 | deGroeve et al. | G06Q 40/02 705/44 |

OTHER PUBLICATIONS

DataCert Announces Availability of Cost Management and Workflow Tool; Web-Based Software Boosts ROI and Automates Invoice Management, Business Editors & High-Tech/Legal Writers, Business Wire, New York: Jun. 21, 2002, p. 1, 3 pages.
Notice of Allowance for U.S. Appl. No. 10/864,290, dated Jun. 29, 2009, 23 pages.
Final Office Action for U.S. Appl. No. 11/001,630, dated Aug. 5, 2009, 21 pages.
Non-Final Office Action for U.S. Appl. No. 10/923,606, dated Aug. 3, 2009, 31 pages.
Non-Final Office Action for U.S. Appl. No. 11/415,361, dated Mar. 3, 2010, 52 pages.
Final Office Action for U.S. Appl. No. 10/923,606, dated Apr. 1, 2010, 36 pages.
Final Office Action for U.S. Appl. No. 11/001,630, dated Jul. 9, 2010, 22 pages.
Non-Final Office Action for U.S. Appl. No. 11/001,630, dated Jan. 3, 2011, 23 pages.
Final Office Action for U.S. Appl. No. 11/415,361, dated Oct. 21, 2010, 36 pages.
Non-Final Office Action for U.S. Appl. No. 12/566,468, dated Mar. 4, 2011, 28 pages.
Non-Final Office Action for U.S. Appl. No. 12/566,468, dated Oct. 12, 2011, 17 pages.
Notice of Allowance for U.S. Appl. No. 11/001,630, dated Sep. 27, 2011, 14 pages.
U.S. Appl. No. 13/348,289, filed Jan. 11, 2012, Wencel et al.
U.S. Appl. No. 13/632,760, filed Oct. 1, 2012, Melling et al.
Non-Final Office Action for U.S. Appl. No. 10/864,290, dated Dec. 27, 2007, 19 pages.
Non-Final Office Action for U.S. Appl. No. 10/923,606, dated Jun. 11, 2008, 18 pages.
Non-Final Office Action for U.S. Appl. No. 10/864,290, dated Jul. 9, 2008, 18 pages.
Non-Final Office Action for U.S. Appl. No. 11/001,630, dated Nov. 14, 2008, 23 pages.
Non-Final Office Action for U.S. Appl. No. 10/923,606, dated Dec. 17, 2008, 20 pages.
Non-Final Office Action for U.S. Appl. No. 10/864,290, dated Jan. 6, 2009, 14 pages.
Notice of Allowance for U.S. Appl. No. 12/566,468, dated May 25, 2012, 17 pages.
Non-Final Office Action for U.S. Appl. No. 13/348,289, dated Oct. 26, 2012, 21 pages.
Non-Final Office Action for U.S. Appl. No. 13/632,780, dated Feb. 15, 2013, 14 pages.
U.S. Appl. No. 10/864,290, filed Jun. 9, 2004, Melling et al.
U.S. Appl. No. 11/001,630, filed Nov. 30, 2004, Wencel et al.
U.S. Appl. No. 11/415,361, filed May 1, 2006, Boone et al.
U.S. Appl. No. 12/566,468, filed Sep. 24, 2009, Melling et al.
Non-Final Office Action for U.S. Appl. No. 11/001,630, dated Jan. 21, 2010, 26 pages.

* cited by examiner

FIG. 2A

QUESTION 4.2: « How should Co. Matter Budgets be entered in a matter?
NOTE: This only applies if the Departmental Budget/Reforecasts are generated using Co. Matter Budgets (as opposed to Law Firm Matter Budgets)
● One consolidated budget for all law firms in a matter —— 224
○ Separate budgets for each law firm in a matter —— 225

QUESTION 4.3: « How often should a Reforecast be generated (and should users be requested to simply review data for accuracy or required to update all budgets)?

| Month | User Request Type | Completed on | ▦ Edit Dates  ▦ View calendar of events |
|---|---|---|---|
| ☐ Jan | | | |
| ☐ Feb | | | |
| ☐ Mar | | | |
| ☐ Apr | | | |
| ☐ May | | | |
| ☑ Jun | ● email bdgt review request*<br>○ require update of all bdgts | 06/07 | |
| ☐ Jul | | | |
| ☐ Aug | | | |
| ☑ Sep | ○ email bdgt review request*<br>● require update of all bdgts | 09/06 | |
| ☐ Oct | | | |
| ☐ Nov | | | |
| ☐ Dec | N/A | N/A | |

*An email will be sent on the Input Start Date and Input Reminder Date to all applicable users with instructions to review all budgets and make any necessary updates.

QUESTION 4.4: « In what month should the next year's Departmental Budget be generated? ▣ } 231
The Departmental Budget will be generated in the month specified in Question 3 above.

*FIG. 2B*

QUESTION 5: Activate the Accrual Module?
• No ○ Yes*
*If Yes, accruals can be turned off for specific law firms/vendors or matters
▪ View audit history of Law Firm Announcement Emails that have been sent QUESTION 5.1: When do you require firms to provide their unbilled amounts?
• Before the accrual period ends ⏜ 242
  How should firms enter the estimated billing for the "current month" (i.e. the month that has not been completed when unbilled amounts are entered)?
244 ⏜ ○ Require firms to enter an estimate for the entire month
245 ⏜ • Require firms to enter the unbilled amount through the date selected below, and pro rate such amount to calculate the full month estimate
     • Through Date ○ Through Day of Week
       [15th day of the month ▼]          ⏜ 246
     ⏜ 243
○ After the accrual period ends QUESTION 5.1a: Should company users be required to review and approve the firms' unbilled amounts?
○ Yes
• No (unbilled amounts auto-approved)

QUESTION 5.2: How frequently do you require firms to manually input unbilled amounts?
248 ⏜ ○ At the end of each fiscal year*
         (LF Input Due Date: 12/20) ▪ Edit date ▪ View calendar of events
249 ⏜ ○ Quarterly*
         (LF Input Due Dates: 3/31, 6/30, 9/31, 12/20) ▪ Edit dates ▪ View calendar of events
250 ⏜ • Monthly (View cautionary alert about this selection)
         (LF Input Due Dates: 1/31...12/20) ▪ Edit dates ▪ View calendar of events
*For months in which law firms do not manually input unbilled time, the Accrual Period Ending Balance is generated based on the selection in Question 5.3.

QUESTION 5.3: For months in which firms are not required to manually input unbilled amounts, do you want to generate an accrual?
○ Yes (use the Law Firm Budget to estimate the unbilled amount)  ⏜ 252
• No Financial Setup Analysis: ▪ Generate analysis of the budget and accrual selections you have made

*FIG. 2C*

CUMULATIVE BURDEN ANALYSIS

The choices you have selected have imposed a medium burden on your company users and firm users (rating of 11 out of 20, with 20 being the highest burden). The median setup score for all companies on Serengeti Tracker is 8.5. Below is an analysis of the primary settings that have affected your score, with suggestions for how you can reduce the cumulative burden.

Question 1: The fiscal year budget format is set to monthly
A majority of law departments require only a "[s]ingle budget amount for the entire fiscal year," and virtually all other law departments select the quarterly option. Below are several reasons for changing this setting to a single amount for the year or a quarterly format:
- The budgeted fees and expenses for each month are required fields. The budget formats require that each budget period be completed. For example, a quarterly budget requires both fees and expenses be entered for each quarter (i.e., 8 amounts have to be entered for each fiscal year). If your require monthly budgets, a user must fill in 24 amounts for each fiscal year (i.e., fees and expenses for each of the 12 months).
- Co. Budget format is not changeable. If company users are entering a company budget for reforecasting or departmental budgets, they will be required to enter an amount for each month. They will not have the option of entering a single amount for each quarter, or an amount for each quarter.

Question 3: The month in which users are required to enter next year's Department Budget is not during a month in which a Reforecast is entered.
Your setup of the reforecasting and departmental budgets will create inefficiencies for your users. Most law departments make sure that next year's department budget is entered by users during a month in which a reforecast is also required to be entered. Most users find it easier to assess spending for the rest of this year and the budget for next year at the same time, rather than being forced to enter those amounts at separate times.

Question 4-2: A separate Co. Budget is required to be entered for each law firm
Historically, some law departments maintained a separate budget for each law firm so that they could have more accurate accrual reports. However, this can create a significant amount of extra work for in-house users (instead of just providing a single Co. Budget for all firms in teh matter). Moreover, the new accrual functionality and reporting makes this unnecessary. In summary, changing the Co. Budget format to a single budget for the matter will save time for in-house users, and will not adversely affect accruals reporting.

Question 5-1: Law firms required to enter unbilled time before the end of the month
The accruals functionality has been set up such that law firms must enter their unbilled time before the end of the month. For example, the system might be set up such that by June 20 law firms must enter (i) time through May 31 that has not already been billed PLUS (ii) an estimate of the billings for June. This approach is considerably more burdensome for your firms than requiring the unbilled time immediately after the end of the month (i.e., immediately after the accrual period). Below is a comparison of the two approaches.

| Method | Analysis of Difficulty |
|---|---|
| Unbilled time entered after the end of the month | EASY – the law firm can generate a report directly from their time & billing system |
| Unbilled time entered before the end of the month | BURDENSOME FOR LAW FIRM USERS – the law firm cannot generate a report directly from their time & billing system, and instead must contact each attorney to provide essentially a budget estimate for the current month. Then the firm has to compile all of that data for delivery. BURDENSOME FOR COMPANY USERS – this approach is also burdensome for company users. Because the current month is an estimate, it should be reviewed by company users to make sure that the law firm has not padded its numbers. |

In many cases, the timing of when the law firms are required to submit unbilled time is dictated by the corporate finance department, and the date is not alterable. If that is the case, it is critical to try to minimize the number of times you ask your law firms to submit unbilled time (only once at the end of the year is ideal). Otherwise, the more burdens you create for your firms, the less time they will devote to providing an accurate amount.

*FIG. 3A*

| | A | B | C | D | E | F | G |
|---|---|---|---|---|---|---|---|
| 1 | Q1: What is Format for Entering Budget? | Q3 (restated): Does the company require one or more reforecasts but the month in which the require a new Dept. Bdgt is not a month in which a Reforecast is generated? | Q4.1: How do you want to generate your Departmental Budget/Reforecasts for each fiscal year? | Q4.2: How should Co. Matter Budgets be entered in a matter? | Q4.3: Are there more than 2 reforecasts required? | Q5.1: When do you require law firms to provide their unbilled time? | Q5.2: How frequently do you require law firms to manually input unbilled time? |
| 2 | Q1 = Month ⟩ 321 | Q3 = Reforecasts but Reforecast month & Dept. Bdgt not synced. | Q4-1 = Default setting is to require company users to enter a Co. Matter Budget | Q4-2 = Separate co. matter budgets for each law firm in a matter | Q4-3 = More than 2 reforecasts required for the year | Q5-1 = LFs required to enter unbilled time before the end of the month | Q5-2Qu = Quarterly ⟩ 323 |
| 3 | Burden Rating = 3 ⟩ 322 | Burden Rating = 2 | Burden Rating = 3 | Burden Rating = 3 | Burden Rating = 2 | Burden Rating = 3 ⟩ 324 | Q5-2M = Monthly ⟩ 325 |
| 4 | | | | | | | Burden Rating Quarterly = 1<br>Burden Rating Monthly = 4 ⟩ 326 |

| Answer to Q1 | Answer to Q3 (restated) | Answer to Q4.1 | Answer to Q4.2 | Answer to Q4.3 | Answer to Q5.1 | Answer to Q5.2 | Corresponding Cumulative Burden Score |
|---|---|---|---|---|---|---|---|
| Q1 :3 | Q3 :2 | Q4-1 :3 | Q4-2 :3 | Q4-3 :2 | Q5-1 :3 | Q5-2Qu :1 | 17 |
| Q1 :3 | Q3 :2 | Q4-1 :3 | Q4-2 :3 | Q4-3 :2 | Q5-1 :3 | Q5-2M :4 | 20 |
| Q1 :3 | Q3 :2 | Q4-1 :3 | Q4-2 :3 | Q4-3 :2 | Q5-1 :3 | | 16 |
| Q1 :3 | Q3 :2 | Q4-1 :3 | Q4-2 :3 | Q4-3 :2 | | Q5-2Qu :1 | 14 |
| Q1 :3 | Q3 :2 | Q4-1 :3 | Q4-2 :3 | Q4-3 :2 | | Q5-2M :4 | 17 |
| Q1 :3 | Q3 :2 | Q4-1 :3 | Q4-2 :3 | Q4-3 :2 | | | 13 |

*FIG. 3C*

| Month | LF Requirement | LF Input Start Date | Reminder Notification | LF Input Due Date | Co. Requirement | Co. Input Start Date | Reminder Notification | Co. Input Cutoff Date |
|---|---|---|---|---|---|---|---|---|
| Jan | • Status Reports<br>▪ Show Matter Types (Templates) | Jan 7 | Jan 14 | Jan 17 | N/A | | | |
| Feb | • Status Reports<br>▪ Show Matter Types (Templates) | Feb 4 | Feb 11 | Feb 14 | N/A | | | |
| Mar | • Status Reports<br>▪ Show Matter Types (Templates) | Mar 7 | Mar 14 | Mar 17 | N/A | | | |
| Apr | • Status Reports<br>▪ Show Matter Types (Templates) | Apr 6 | Apr 13 | Apr 16 | N/A | | | |
| May | • Status Reports<br>▪ Show Matter Types (Templates) | May 7 | May 14 | May 17 | N/A | | | |
| Jun | • Accruals<br>• Status Reports<br>▪ Show Matter Types (Templates) | Jun 6 | Jun 13 | Jun 16 | • Accruals | Jun 17 | Jun 18 | Jun 19 |
| Jul | • Accruals<br>• Status Reports<br>▪ Show Matter Types (Templates) | Jul 7 | Jul 14 | Jul 17 | • Accruals | Jul 18 | Jul 19 | Jul 20 |
| Aug | • Accruals<br>• Status Reports<br>▪ Show Matter Types (Templates) | Aug 7 | Aug 14 | Aug 17 | • Accruals | Aug 18 | Aug 19 | Aug 20 |
| Sep | • Accruals<br>• '07 Reforecast<br>• Status Reports<br>▪ Show Matter Types (Templates) | Sep 6 | Sep 13 | Sep 16 | • Accruals<br>• '07 Reforecast | Sep 17 | Sep 18 | Sep 19 |
| Oct | • Accruals<br>• Status Reports<br>▪ Show Matter Types (Templates) | Oct 7 | Oct 14 | Oct 17 | • Accruals | Oct 18 | Oct 19 | Oct 20 |
| Nov | • Accruals<br>• '08 Dept Bdgt<br>• '08 LF Bdgt<br>• Status Reports<br>▪ Show Matter Types (Templates) | Nov 6 | Nov 13 | Nov 16 | • Accruals<br>• '08 Dept Bdgt | Nov 17 | Nov 18 | Nov 19 |
| Dec | • Accruals<br>• Status Reports<br>▪ Show Matter Types (Templates) | Nov 23 | Nov 30 | Dec 3 | • Accruals | Dec 4 | Dec 5 | Dec 6 |

*FIG. 4*

Edit Dates/Reminders for Calendar of Events — 500

501 — January - November Dates

| Event | Date |
|---|---|
| 504 — LF Input Start Date: « | [10] days before "LF Input Due Date" |
| 505 — LF Reminder Email: « | [3] days before "LF Input Due Date" |
| 503 — LF Input Due Date: « | ○ By Date  ● By Day of Week<br>[1st ▼] [Mon ▼] of the month |
| 507 — Co. Input Start Date: « | 1 day after the "LF Input Due Date" |
| 508 — Co. Reminder Email: « | [1] days before the "Co. Input Cutoff Date" |
| 506 — Co. Input Cutoff Date: « | [3] days after the "LF Input Due Date" |

502 — December Dates

| Event | Date |
|---|---|
| LF Input Start Date: « | [10] days before "LF Input Due Date" |
| LF Reminder Email: « | [3] days before "LF Input Due Date" |
| LF Input Due Date: « | ○ By Date  ● By Day of Week<br>[1st ▼] [Mon ▼] of the month |
| Co. Input Start Date: « | 1 day after the "LF Input Due Date" |
| Co. Reminder Email: « | [1] days before the "Co. Input Cutoff Date" |
| Co. Input Cutoff Date: « | [3] days after the "LF Input Due Date" |

Matter Options

Internal or External Matter: ⁎ ○ Internal (no law firm retained)
● External (law firm(s) retained)
  ● One firm (or multiple firms with a coordinating counsel)
  ○ Multiple firms with no coordinating counsel
  Firm(s) are : Live (users connected to Tracker) ▼
  Can the lead firm see other firms' data (e.g. invoices)? ● No ○ Yes Matter Type (Template): ⁎  • Litigation/Dispute > Litigation  [?]

Does this matter belong to a Matter Group?: ⁎ ● No ○ Yes  [?]
            708

Law Firm Matter Budget Options

Are Law Firm Matter Budgets Required?: ⁎ ○ No
            709        ○ Yes - From Lead Firm Only
                       ● Yes - From all Firms/Vendors (but not if access is billing only) ▣View list of Firms/Vendors that are not required to enter budgets [?]

Law Firm Matter Budget Type: ⁎ ● Fiscal Year (monthly)  ○ Phased - Litigation  ○ Phased - Patent  [?]

When are budget updates required?: Update required with every Dept. Budget and Reforecast
▣ View calendar of events

Departmental Budget/Reforecasts Options
                701
Are Dept. Budgets/Reforecasts required?: ⁎ ○ No ● Yes  [?]

How are Dept. Budgets/Reforecasts generated?: ⁎ ● Use law firm matter budget(s)
                                                         702
                                              ○ Company users will enter separate Co. Dept Budget [?]
                                                                                    703
▣ View calendar of events
            704

Accrual Options

Generate an accrual for this matter?: ⁎ ○ No ● Yes  [?]
                                                         707
Are Firms/Vendors required to manually ○ No (Dept. Budget/Reforecasts are used to generate accrual)
enter unbilled time for this matter?: ⁎  ○ From Lead Firm Only                           706
                                         ● From all Law Firms/Vendors (but not if access is billing only) ▣View list of Firms/Vendors that are not required to post unbilled time [?]

▣ View calendar of events

*FIG. 7A*

Matter Group Options

LEGEND: « = Required Field

Matter Group Options

Internal or External Matter:   Internal (no law firm retained) ⑦

Departmental Budgets / Reforecasts and Accruals

Where is data entered: « — 712
○ Departmental budgets / accruals are entered in each Matter
● Departmental budgets / accruals are entered in this Matter Group only ⑦

Are Dept. Budgets/Reforecasts required?: «   ○ No  ● Yes ⑦ — 714

Generate an accrual for this matter?: «   ○ No  ● Yes ⑦
● Firms/Vendors can be required to enter unbilled time in each matter — 715
○ Firms/Vendors are not required to enter unbilled time in each matter (use budgets to generate unbilled time estimate)

▣ View calendar of events 710, 711, 713

*FIG. 7B*

| View Invoices | Post Invoices | Set Matter #s | Post Accruals |

Set Matter Numbers

| Acme - Demo Patent ⁓ 901 | 23456 ⁓ 902 | 73089 ⁓ 903 | Lawyer, Greg | Casemanager, Don |
| 200500029 | 23456 ⁓ 904 | 00001 | | |
| | ■Add Additional - Client # \| Matter # | | | |

| Acme Pipeline ⁓ 901 | 109 | 1 | Lawyer, Greg | Casemanager, Rob |
| 200400004 | ■Add Additional - Client # \| Matter # | | | |

| Acme v. Walker ⁓ 901 | | | Lawyer, Greg | Casemanager, Don |
| 200500030 | ■Add Additional - Client # \| Matter # | | | |

| AM Anti Trust ⁓ 901 | 23456 | 23456 | Lawyer, Greg | Casemanager, Jeff |
| 200600016 | ■Add Additional - Client # \| Matter # | | | |

*FIG. 9*

| View Invoices | Post Invoices | Set Matter #s | Post Accruals |

Post Accruals (Unbilled Amounts) ~1200

Select Posting Method for Unbilled Amounts
- ● Manual Input (enter unbilled amounts for individual matters using an input form) ~1202
- ○ SpeedPost™ (upload unbilled amounts for multiple matters using a flat file) ~1203

} ~1201

Status & Instructions

Due Date: 7/17/2007 (4 days remaining)   ▪ View Calendar of dates

What to Enter: Enter separate amounts for the following:
1. unbilled amounts for services rendered from JANUARY 1, 2007 - JUNE 30, 2007, and
2. estimated billing for services to be rendered in JULY 2007

☒ Do NOT enter unbilled amounts for services rendered prior to January 1, 2007. Acme's fiscal year started January 1, 2007. Accordingly, enter unbilled amounts only for services rendered on or after January 1, 2007.

☒ Do NOT enter unbilled amounts for any submitted invoices or invoices with "Delivery is on Hold." Tracker will automatically include amounts from any invoices with "Delivery on Hold" in the company's financial reports.

NOTE: The estimated billing for July 2007 (#2 above) can be automatically generated using the matter budgets entered by attorneys.

Incomplete Unbilled Amounts     [ Change View ▸ ]

| Matter Name ▲<br>Lead Outside Counsel | Client # \| Matter # | Prior Months<br>Unbilled Amt.<br>(01/01/07 - 06/30/07) ~1204 ~1205 | Current Month<br>Estimated Billing<br>(07/01/07 - 07/31/07) ~1206 ~1207 | Internal Notes |
|---|---|---|---|---|
| AM Anti Trust ~1208<br>Lawyer, Greg | 23456 \| 23456 | Not Posted<br>▪ edit | Not Posted<br>▪ edit | Not displayed to client<br>▪ edit |
| Horsecare ~1208<br>Lawyer, Greg | -- \| -- | Not Posted<br>▪ edit | Not Posted<br>▪ edit | ▪ edit |
| Short Fuse ~1208<br>Lawyer, Greg | 109 \| 37765 | Not Posted<br>▪ edit | Not Posted<br>▪ edit | |
| SOC ~1208<br>Lawyer, Greg | 123445 \| 7876 | Not Posted<br>▪ edit | Not Posted<br>▪ edit | ▪ edit |

| | A | B | C | D |
|---|---|---|---|---|
| 1 | CLIENT_ID | LAW_FIRM_MATTER_ID | UNBILLED_THRULASTMONTH | CURRENT_MONTH_ESTIMATE |
| 2 | 24323 | 2 | $54,834.32 | $22,000.00 |
| 3 | 24323 | 10 | $0.00 | $50,000.00 |
| 4 | 24323 | 23 | $23,039.34 | $0.00 |

FIG. 13B

| Invoice No. | Total | Matter Name | Client No. | Matter No. | Lead Attorney | Audit(s) Displayed to Company |
|---|---|---|---|---|---|---|
| 1981-330 | $ 235.16 | Dearborne Project | 21374 | 21374.0178 | Rich Price | |
| 1982-331 | $25,676.66 | Elton Shipping | 21374 | 21374.0172 | Mindy Alred | |

⚠ An unbilled amount of $30,434 was previously posted for the period 1/1/2007 - 8/31/2007. If that unbilled amount includes this invoice, you should immediately edit and reduce the unbilled amount. ≡ edit unbilled amount

STATUS: Delivery Complete
The following invoice(s) have been successfully posted and delivered.

*Invoices Successfully Posted*

| Matters List | Data Updates |

Matter Data Updates

All My Matters ▼ [Change View]

Instructions

Below each matter are the categories of data that require an update. For each category, click No change or View/Edit (and update the data). Once you have clicked the appropriate update action, the data category will be removed from the list upon your next page visit (or you can click the Hide Completed Updates button).

[Hide Completed Updates]

| Matter Name — 1401 | Lead Firm<br>Lead OC | Updated On<br>Updated By | Co. File #<br>Lead Co. Person | Current Data<br>(to be Updated) — 1403 | Matter Type (Template)<br>Substantive Law |
|---|---|---|---|---|---|
| Acme – Business Matter | Shriber & Handy<br>David, James | 7/31/2006<br>Lawyer, Sally | 200500002<br>Casemanager, Don | | Regulatory<br>Tax – International |

BUDGET — 1402     Jul '06 Budget:     Hours/Amount to Date for July '06
- No change ▪ View/Edit    $15,000     23.4 hours / $7,343 — 1407
                Aug-Dec '06 Budget: — 1406
    1408    1409     $135,000 — 1404
                '07 Budget: — 1405
     1410

STATUS REPORT     6/28/2006     Status Report Content:
- No change ▪ View/Edit    Lawyer, Jeff     We need to gear up for accelerated discovery and trial.
    1412    1411     Material Change:
                Under the circumstances, we are probably in for a long haul. My partner, ✓ MATTER PROFILE DUE     1/17/2007     Incomplete Fields: None
              Lawyer, Jeff
- View/Edit

*FIG. 14*

| Home | Matters | Financial | Documents | Reports | Users/Firms |

Home > Matters > Acme Pipeline > Edit Current Budget

| Matter Profile | Status & Notes | Events & Diary | Budget | Invoices | Documents | Participants |

Edit Current Budget - Shriber & Handy Budget

Budget 2007 Alert

The Billed + Unbilled amount ($45,134) is greater than the budget through June 2007 ($0). ⸺ 1701

Would you like Tracker to prefill the budget edit form with the billed and unbilled amounts? ⸺ 1702

- ⦿ Yes, prefill with approved, unapproved, and unbilled invoice amounts ⸺ 1703
- ○ Yes, prefill with approved and unapproved invoice amounts only ⸺ 1704
- ○ Yes, prefill with approved invoice amounts only ⸺ 1705
- ○ No, I will manually update the current budget ⸺ 1706

Should the FY 2007 budget total remain the same? ⸺ 1708

- ⦿ Yes, keep the current FY 2007 budget total ⸺ 1709
- ○ No, adjust the FY 2007 budget total based on the variance above ⸺ 1710

| Time Period<br>Description of Budgeted Activities | CURRENT BUDGET 1720<br>1723 Budget 1723 Budget 1723 Budget<br>Total Fees Expenses | | |
|---|---|---|---|
| ⊟ FY 2007 | $62,600 | $59,000 | $3,600 |
| Jan 2007<br>Trial | $10,000 | 10000 | 0 |
| Feb 2007<br>Trial | $5,200 | 5000 | 200 |
| Mar 2007<br>Trial, and post trial appeal | $11,000 | 10000 | 1000 |
| Apr 2007<br>waiting for appeal | -- | 0 | 0 |
| May 2007<br>waiting for appeal | $2,000 | 0 | 2000 |
| Jun 2007<br>waiting for appeal | -- | 0 | 0 |
| Jul 2007<br>waiting for appeal | -- | 0 | 0 |
| Aug 2007<br>draft appeal briefs | $5,100 | 5000 | 100 |
| Sep 2007<br>draft appeal briefs | $5,100 | 5000 | 100 |
| Oct 2007<br>waiting period | -- | 0 | 0 |
| Nov 2007<br>preparation for oral arguments to court of appeals | $20,100 | 20000 | 100 |
| Dec 2007<br>oral argumetns to court of appeals | $4,100 | 4000 | 100 |

Budget Spreadsheet
LEGEND: $) = Amount is pre-filled with Billed and/or Unbilled Amount

[ Add Prior Fiscal Year ]  [ Add Next Fiscal Year ]

| Time Period / Description of Budgeted Activities | CURRENT BUDGET | | | ANALYSIS | | |
|---|---|---|---|---|---|---|
| | Budget Total | Budget Fees | Budget Expenses | Prior Budget | Billed + Unbilled | Variance = Prior − (Billed+Unbilled) |
| Spreadsheet Total | $98,696 | $72,307 | $9,900 | $45,000 | $55,312 | -$10,312 / -23% |
| FY 07 Total | $56,132 | $39,643 | $0 | $45,000 | $12,748 | $32,252 / 28% |
| Jan 07 - Jul 07 / See description below | $) $12,748 | $ 12,748 | $ 0 | $10,000 | $12,748 | -$2,748 / 127% |
| Aug 07 - Dec 07 / Trial or Post Settlement Activities | $43,384 | $ 43,384 | $ 0 | $35,000 | — | $35,000 |
| FY 06 Total | $42,564 | $32,664 | $9,900 | — | $42,564 | -$42,564 |
| Jan 06 - Dec 06 / Prepare pretrial motions | $) $42,564 | $32,664 | $9,900 | — | $42,564 | -$42,564 |

[ Add Prior Fiscal Year ]  [ Add Next Fiscal Year ]

| | | 2250 |
|---|---|---|

What You Can Do
- SAVE & Close  ◾ CANCEL
- Additional Actions & Help

Acme "Boom" Marks   2251

| Unbilled Time (Accrual) | Matter Budget |
|---|---|

NOTE: The budget form below has been pre-filled with current spending and unbilled amounts

| Law Firm (Office): | Trademark Associates LLC | Total Matter Budget: | $75,500 |
|---|---|---|---|
| Matter Name: | Acme "Boom" Marks | FY07 Matter Budget: | $30,000 |
| Budget Type: | Vendor entered | FY07 Budget Remaining: | $16,587 |

[LF Budget - Trademark Associates LLC ▼] [Change View]

Total Matter Budget
Estimated Total Fees and Expenses (Total Matter Budget): «   $ [100,000] ⑦
Amount Allocated in Budget Spreadsheet(s) below:   $98,696
Amount not Allocated in Budget Spreadsheet(s) below:   $1,304

Explanation/Comments about Modifications
Provide an explanation of your changes to the budget «
[                                                                          ]

◾ View prior budget comment

Budget Spreadsheet
LEGEND: $⧉ = Amount is pre-filled with Billed and/or Unbilled Amount

[Add Prior Fiscal Year]  [Add Next Fiscal Year]  — 2252

| | CURRENT BUDGET | | |
|---|---|---|---|
| Time Period<br>Description of Budgeted Activities | Budget<br>Total | Budget<br>Fees | Budget<br>Expenses |
| FY 07 Total | $56,132 | $39,643 | $9,151 |
| Jan 07 - Jul 07<br>*See description below* | $⧉ $12,748 | $ 12,748 | $ 0 |
| Aug 07 - Dec 07<br>Trial or Post Settlement Activities | $8,384 | $ 8,384 | $ 0 |
| FY 06 Total | $42,564 | $32,664 | $9,976 |
| Jan 08 - Dec 08<br>Prepare pretrial motions | $⧉ $42,564 | $32,664 | $9,976 |

[Add Prior Fiscal Year]  [Add Next Fiscal Year]  — 2252

*FIG. 22B*

System Setup

New AP Extract Format

« indicates a required field

General Setup

Name: «

File Format: «  ⦿ Comma Separated Value (.csv)  ○ Pipe Delimited

File Extension: «  csv

Standard Rows

Include Column Header Row: «  ⦿ No  ○ Yes

| Column | Column Name/Data | Custom Column Name (optional) |
|---|---|---|
| A | AP Extract Unique ID — 2401 | |
| B | Total - All Invoices - Approved | |
| C | Vendor Name | |
| D | Invoice Number | |
| E | Total Approved | |
| F | Accrual Period End Date — 2402 | |
| G | Accrual Period Law Firm — 2403 | |
| H | Accrual Period Ending Balance — 2404 | |
| I | Remaining Accrual Balance Prior to AP Extract — 2405 | |
| J | Remaining Accrual Balance After AP Extract — 2406 | |

*FIG. 24*

| C | D | E | F | G | H | I | J |
|---|---|---|---|---|---|---|---|
| Vendor Name | Invoice Number | Total Approved | Accrual Period End Date | Accrual Period Law Firm | Accrual Period Ending Balance | Remaining Accrual Balance Prior to AP Extract | Remaining Accrual Balance After AP Extract |
| Harper & McCord | 370308069-0688 | $1,704.79 | 3/31/2007 | Harper & McCord | $10,000.00 | $7,588.23 | $5,883.44 |
| Coleridge & Keats | 364792-36107.02A | $1,373.54 | 3/31/2007 | Coleridge & Keats | $2,000.00 | $2,000.00 | $626.46 |
| Harper & McCord | 370308069-0703 | $1,051.30 | 3/31/2007 | Harper & McCord | $12,384.00 | $598.43 | -$452.87 |

*FIG. 25*

![Audit Exceptions dialog - 2700]

Audit Exceptions for Invoice 823970-8

Vendor: Shriber & Handy (Bellevue)    Invoice #: 823970-8    Inv. Date: 6/13/2007
Matter: AM Anti Trust    Period: 5/1/2007 - 5/31/2007    Posted: 6/13/2007

|  | Total | Fees | Expenses |
|---|---|---|---|
| Original Amount: | $5,255.90 | $5,220.50 | $35.40 |
| Audit Adjustments *: | ($876.00) | ($876.00) | -- |

* Audit adjustment amounts do not reflect company line item adjustments.

☐ Accept all rates for this invoice only    ☐ Approve all rates for this matter    ☐ Approve all rates for all matter

New Timekeepers

| Action | Name | Rate | Hours | Firm Adj. | Fees |
|---|---|---|---|---|---|
| ↓ REDUCE rate for all matters | Flack, Roberta | ~~$130.00~~ | 29.2 | -- | ~~$3,796.00~~ |
| Action taken by Jeff Casemanager on 12/18/2006 $ 100 | | | | | $2,920.00 |
| Hold | Taft, Robert | $185.00 | 7.7 | -- | $1,424.50 |

Timekeeper Rate Changes
There are no rate changes to report.

Expense Rate Violations

| Action | Expense Item | Net Rate | Guideline | Units | Expense |
|---|---|---|---|---|---|
| Hold | Copying | $0.15 | $0.10 | 32.0 | $4.80 |
| Hold | Facsimile | $0.50 | $0.10 | 22.0 | $11.00 |

Expense Total Violations
There are no expense total violations to report. — 2701    — 2703

Accrual Alerts

ACCRUAL: 6/30/2007    LF Unbilled 1/1/07 - 5/31/07    [view accrual profile]

| Action | — 2702 Unbilled Amt | Spending Amt | Variance (as posted) |
|---|---|---|---|
| Hold — 2707 | $33,500.00 — 2704 | $167,778.00 — 2705 | -$134,278 — 2706 |

[ Print ]   [ Save ]   [ Cancel ]

*FIG. 27*

ACCRUALS PROCESSING WITHIN AN ELECTRONIC INVOICING AND BUDGETING SYSTEM

TECHNICAL FIELD

The described technology is directed to the field of automated project planning and billing tools.

BACKGROUND

Many companies and businesses use accrual basis accounting. With respect to accrued expenses (as opposed to accrued revenue), the process for obtaining and preparing the data needed to determine the amount of accrued expenses can be burdensome for both the company and its vendors.

For example, some vendors (e.g., law firms providing legal services) typically bill for their work on an hourly basis. Consequently, neither the law firm nor the company authorizing the legal work will know the exact amount of expenses incurred by the law firm on the company's behalf until (i) all the outside lawyers and the law firm's staff have entered their time in the law firm's time & billing system, (ii) the responsible users at the law firm have reviewed the time and made any appropriate corrections, and (iii) the law firm has actually generated an invoice for the work performed. Consequently, corporations rarely receive the actual invoice for worked performed until many days after the end of the month, and in some situations the company may not receive its invoices until months after the work was performed. However, the company's finance department may need information about accrued expenses before the end of the month (or very soon after the end of them month) to timely prepare the company's financial statements. In this situation, the company must contact its law firms before having received any invoices. Moreover, if data must be provided before the end of the month, the law firm will not know the exact amount of billing and can provide only an estimate as to the future amount of time its users will incur through the end of the month.

Below are descriptions of three typical processes used by corporate law departments for obtaining and providing accrual expense amounts to their finance departments. The first approach requires each law firm or vendor (collectively referred to as "firms" or "vendors") to submit unbilled amounts in a spreadsheet at the end of the fiscal year. During the year, a corporate law department using this approach uses its internal company budget ("Departmental Budget") for the fiscal year to provide an accrual amount to the company's finance department at the end of each month. For example, assume the Departmental Budget contains $10,000 each month for spending by Firm A in Matter X. Consequently, each month the law department sends $10,000 as the accrual amount for Firm A in Matter X.

The second approach uses a multicolumn spreadsheet containing three columns for each month: one column for the original Departmental Budget estimate for the month, a second column for the firm's estimate of its invoice amounts for the month, and the third column for the actual spending. Each row in the spreadsheet is a matter on which the firm is working. Before the end of each month, firms are required to submit their estimate of the amount to be billed for the month for each matter, which the company then enters into the master-multicolumn spreadsheet. At the same time the company will update the spending for each applicable month (assuming invoices have been received since the last time the spreadsheet was updated). Then, at the end of each month the company will produce an accrual amount by summing up the firm estimate of the invoice amounts for the current month and all prior months in the fiscal year, and subtract from that the sum of all actual spending. The accrual amount at the end of each month is determined by (i) adding all of the firms' billing estimates for each month through the end of the current month and (ii) subtracting the sum of all the actual amounts invoiced from each month. The purpose of the Departmental Budget column is to provide a reality check each month when the firms submit their billing estimate for each month, but it is not actually used in the calculation of the accrual.

The third approach requires each law firm or vendor to submit a final invoice for the fiscal year before the end of the fiscal year, and such invoice must include an extra line-item for the amount that the firm or vendor expects to bill for the remainder of the year. For example, assume that December is the final month in the fiscal year. The law department will instruct its firms to submit a final invoice for the year by December 20, and the invoice must include all actual time through December 15 and a separate line item for an estimate of billing from December 16-31. The law department will then actually pay the full amount of the invoice. The law firm will be instructed to then submit its actual invoice for December 16-31 time in January. If the firm overestimated, then the excess amounts will be deducted from future invoices in the next year (and if the amount is too large, then the firm will issue a reimbursement check). If the firm underestimated, then the company will pay the excess amount.

BRIEF DESCRIPTION OF THE DRAWINGS

FIGS. 2A-2C are display diagrams showing a typical user interface for configuring the budgeting and accrual capabilities.

FIG. 3A is a display diagram showing a typical cumulative burden analysis of the budget and accrual setup options displayed by the facility to an end user.

FIGS. 3B and 3C are sample table diagrams relating to FIG. 3A showing how the facility determines the cumulative burden analysis.

FIG. 4 is a display diagram showing how the facility displays dates applicable to entering unbilled amounts (and other required events) to users in some embodiments.

FIG. 5 is a display diagram showing how the facility supports editing of dates in FIG. 4.

FIG. 6A is a display diagram showing how the facility supports configuration of a firm profile by company users so that the firm is not required to enter unbilled amounts or budget amounts.

FIG. 6B is a display diagram showing how the facility supports the configuration of a firm profile by firm users so that the firm can designate the Primary and Backup Billing Managers, as well as whether attorneys or billing managers enter unbilled amounts for the "Current Month Estimate."

FIG. 7A is a display diagram showing how the facility enables users to set up accrual and budget options for individual matters in some embodiments.

FIG. 7B is a display diagram showing how the facility enables users to set up accrual and budget options for a group of matters in some embodiments.

FIG. 9 is a display diagram showing how the facility enables firms to enter their own matter numbers, to create a cross-reference table to the company's matters.

FIGS. 12A and 12B are display diagrams showing how the facility enables firm users to manually enter unbilled amounts in some embodiments.

FIG. 13A is a display diagram showing how the facility enables firm users to upload a spreadsheet of unbilled amounts in some embodiments.

FIG. 13B is a display diagram showing a sample spreadsheet of unbilled amounts to be uploaded by a firm user.

FIG. 13C is a display diagram of a typical warning provided by the facility to a firm user who has posted an invoice to a matter prior to the Unbilled Amounts Input Due Date for which unbilled amounts have already been entered.

FIG. 14 is a display diagram showing how the facility enables firm attorneys responsible for the estimated billing for the current month to view the budget estimate and the time entered for the current month and to edit the current month budget estimate, in some embodiments.

FIGS. 17A and 17B are display diagrams showing how the facility enables a user editing a budget to prefill prior budget months with the spending and unbilled amounts.

FIGS. 17C-17G are display diagrams showing various budget input formats as displayed by the facility to the end user.

FIGS. 22A and 22B are display diagrams showing how the facility enables a company user to review and approve all pending financial data with a single click, or edit any such amounts, in some embodiments.

FIG. 24 is a display diagram showing how the facility enables a company user to configure the facility to send accrual data to its finance department with each invoice, to allow the finance department to verify that the accrual balances maintained by the finance department match the accrual balances in the facility.

FIG. 25 is a table diagram showing a sample file to be sent by the facility to a company's accounts payable department with approved invoice data and the related accrual data.

FIG. 27 is a display diagram of a sample invoice alert displayed by the facility because the invoice amount exceeds the accrual remaining balance.

DETAILED DESCRIPTION

Figure 1:
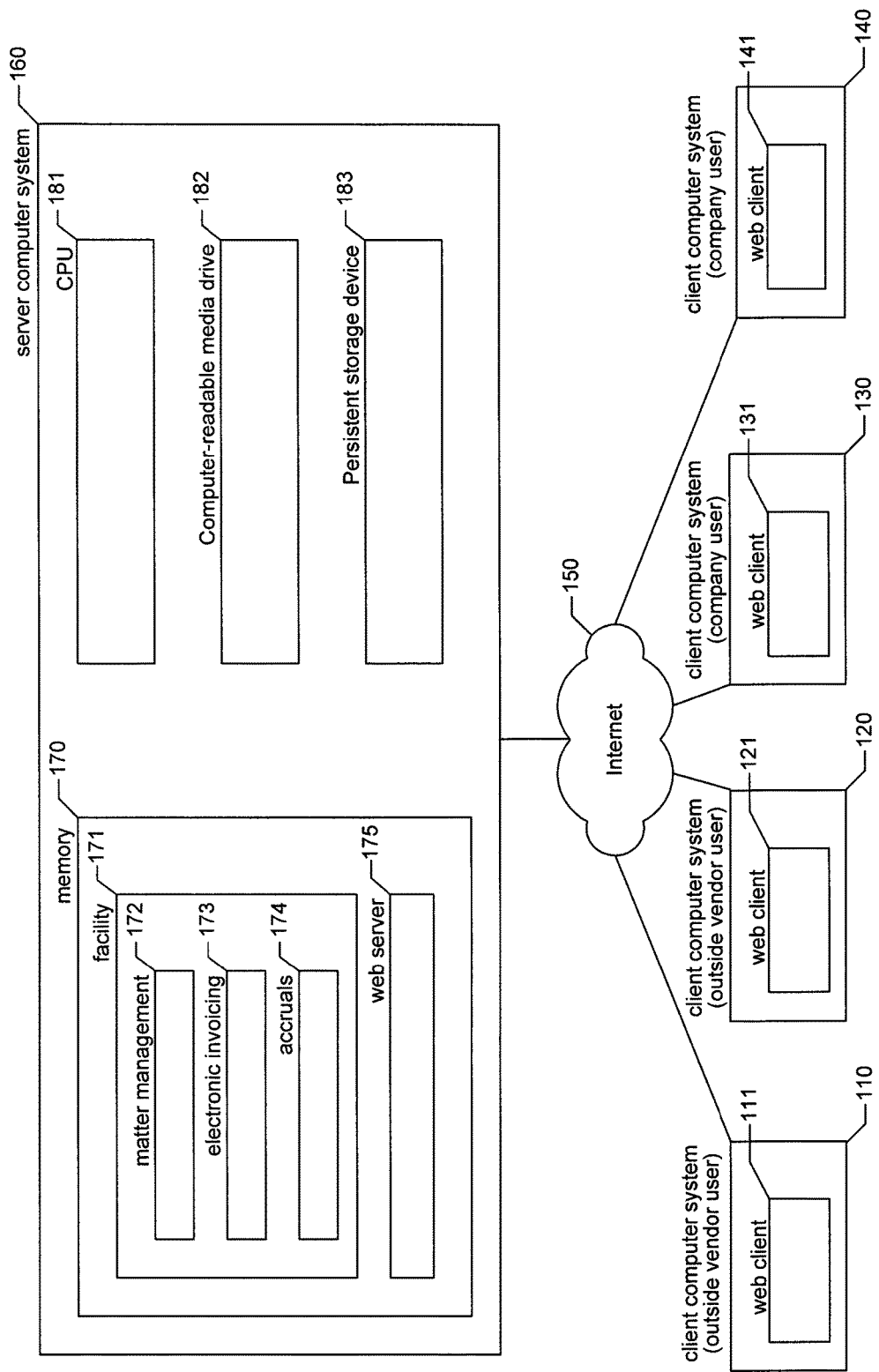
FIG. 1 is a high-level block diagram showing a typical environment in which the facility operates.

There are several disadvantages to the processes described above that are typically used by corporate law departments to obtain and provide accrual expense amounts to their finance departments.

There are several problems with first approach, in which each firm is required to submit unbilled amounts in a spreadsheet at the end of the fiscal year, and the corporate law department uses its internal Departmental Budget to provide an accrual amount to the finance department for earlier accrual periods in the year. First, this method of deriving each accrual amount prior to the end of the year from the Departmental Budget may not be accurate. For example, assume the budget amount for January is $10,000 and the budget amount for February is $10,000. At the end of February, if the firm has not submitted its invoice for January for $10,000, then using the February budget of $10,000 as the accrual will not be accurate because the actual accrued expense should be $20,000. Second, at the end of the fiscal year when the firms submit unbilled amounts, the company must manually keep track of whether it has received unbilled amount for all matters for which each firm should be submitting unbilled amounts. This is a time-consuming and error-prone process because firms sometimes don't provide this information as requested. Third, the data submitted by the firms in the spreadsheets may not match the data needed by the law department. For example, the firms may have a different matter organizational structure than the law department, so the law department has to manually-cross correlate the list of matters each firm has submitted.

The second approach, in which the corporate law department uses a multicolumn spreadsheet, is intended to create more accurate accruals than the process used by the first approach. However, this approach has several problems as well. First, it is a burdensome process for firms every month to provide an estimate of billing prior to the end of the month. Second, because it is a burdensome process for firms, they do not always timely provide the data, which creates a burden for the corporate law department to monitor and remind firms about the deadlines. Third, it is also burdensome for companies to incorporate the firm's data as well as actual spending data into the spreadsheet. Someone must manually copy and paste the firm data into the master-multicolumn spreadsheet. Moreover, the list of matters can change and the firm's matters may not match the law department's matters on the spreadsheet. In addition to the firm data, the actual invoice amounts must also be entered into the proper monthly column (i.e., the invoice may have been received by the company in May but it is for services rendered in February, and consequently the spending needs to be entered in the February spending column in the spreadsheet). Fourth, if the spending entered for a month does not match the firm's estimate for the month, the company may not know whether all invoice amounts have been submitted, or whether additional invoices will be submitted, and therefore the difference between the actual spending and the firm estimate needs to be carried forward for future accruals (and if not, then the firm's estimate amount needs to be manually changed to the actual spending so that the accrual balance is $0). As a work around, this approach sometimes provides for prohibiting law firms from submitting invoices more than one month in arrears. Such prohibitions meet with limited success. Fifth, the purpose of including the Departmental Budget amount in the spreadsheet is to create a cost control system for spending, but since the firms do not have access to the company's spreadsheet, the budget data in the spreadsheet is not available to the firms when they are preparing the spending estimates.

In addition, there are several problems with the third approach, in which each vendor is required to submit an extra line-item in its final invoice for the amount the firm expects to bill for the rest of the fiscal year. First, the law department is paying the firm before it is necessary, so the firm is receiving the benefit of the early payment. Second, the law department still has a manual process to track the future invoices against the line-item that was paid in the December invoice. Finally, if it is necessary to obtain a reimbursement from the firm, that can be a burdensome process to monitor that the firm has in fact provided a reimbursement check.

In addition to the disadvantages that these processes are burdensome and are not necessarily accurate, there are still other problems relating to the generation of accrual data. Company users responsible for accruals must maintain and update contact lists, and send out emails and other correspondence for each accrual period. Frequently, these contact lists will become out of date, which complicates the notification process.

Moreover, the accrual amounts sent to the company's finance department must not only include unbilled amounts of firms, they must also include invoices that firms have already sent to the company but which have not yet been sent to the company's finance department or been paid. For example, in June 2006, the Calgon Carbon Corp. fired its General Counsel because "certain invoices for legal services . . . were not reported in a timely fashion . . . [or] were not reported in the correct quarter, in some cases." Thus, if a company does not have a process for logging the receipt of invoices, and determining if they have actually been sent to the finance department, it cannot generate accurate accrual data. Moreover, even if the company has a system, it is a manual and burdensome process to combine the pending invoice data with the unbilled amounts received from firms. Finally, many finance departments also require a special firm ID or code be provided with the accrual data, which is also a manual process for the user or department preparing the accruals.

Finally, other than providing an accrual amount at the end of each month to the finance department, the foregoing processes (and other variations of the foregoing) do not have a reliable and automated means to provide alerts to invoice reviewers that the invoice amount exceeds the accrual that has been recorded, or to the finance department when an invoice is sent to accounts payable (AP) for payment. Similarly, unless the accrual processing is built into a budgeting and electronic invoicing system, company users who are responsible for generating spending reforecasts for the remainder of the year will not have the ability to automatically view the firm unbilled amounts together with the actual billed amounts to get a true budget v. spending comparison. Also, if the company does not have integrated systems, users may not be able to review and approve all pending financial data at one time (e.g., they can't review law firm unbilled amounts at the same time that they are reviewing budget forecast data for the rest of the fiscal year).

Accordingly, a software facility that overcame some or all of the aforementioned shortcomings relating to the gathering of accrual data, the accuracy of accrual data, interactions with budget data, and use of the unbilled amounts and accrual data in an electronic invoicing and Departmental Budgeting system would have significant utility to corporate law departments, claims departments of insurance companies, and other entities managing projects involving third party service providers such as law firms.

A software facility for receiving and processing data necessary to generate monthly accruals within an electronic invoicing and budgeting system (the "facility") is described. In some embodiments, the facility provides to both company users (such as corporate law department users or insurance claims department users) and outside vendors (such as law firms, consulting firms, or other submitters of invoices, collectively referred to as "firms" or "vendors") access to one or more matters or projects. Firms use the facility to post invoices for their work for the company. In some embodiments, firm or company users will enter the firm's matter numbers from its financial system(s) into the matters that have been created in the company's system to create a matter cross-reference table. In some embodiments, firms will also enter budgets in advance of providing the services for the company. The facility also provides an interface for the firms to directly enter unbilled amounts. In some embodiments, the firms select a matter and manually enter the unbilled amounts. In some embodiments, the firms can upload a spreadsheet or file of the firm's unbilled amounts. The facility assigns the unbilled amounts to the proper matters in the company's system using the cross reference table of the firm's matter numbers.

This approach has several advantages. First, if firms are required to input the cross reference of the firm's matter numbers for uploading electronic invoices, the cross reference table will already exist for uploading the firm's unbilled amounts, and therefore they have to create such a cross reference table only once for multiple functions. Furthermore, firms can easily generate reports of unbilled amounts from their time & billing system with the firm's own matter numbers, and using that data they can upload the unbilled amounts into the company's system without manually selecting each matter to which the unbilled amounts must be assigned.

In some embodiments, the facility includes functionality to ensure that the firms timely enter the unbilled amounts. In some embodiments, the facility does not allow the firm to post invoices unless the unbilled amounts have been entered. In some embodiments, company users can configure the system to automatically send email alerts to firms when unbilled amounts are due, and if the unbilled amounts have not been timely entered, the facility (i) sends email alerts to the applicable users at the firm, (ii) displays on-screen alerts to the applicable users, and/or (iii) provides a report by which either company users or firm users can identify which firms and which users have not provided unbilled amounts.

The facility may have functionality to ensure that unbilled amounts and posted invoices are not double-counted. For example, if the due date for posting unbilled amounts is June 20, and if the firm posts unbilled amounts on June 17 and then later posts invoices on June 20, if those invoice amounts were included in the unbilled amounts, there is a risk that the unbilled amount is duplicative of the invoice amount. Accordingly, in some embodiments, the facility causes some or all of the following to occur: (i) provide a warning to firm and/or company users if a firm posts an invoice after the unbilled amounts for the matter have been posted but before the unbilled amounts posting due date; (ii) prevent the firm from posting invoices to any matter after the unbilled amounts for the matter have been posted but before the unbilled amounts posting due date; (iii) prevent the firm from posting any invoices during the unbilled amounts posting period (regardless of whether unbilled amounts have been posted during the period); (iv) allow the firm to upload invoices into the facility but omit to deliver them or make them available to the company; and/or (v) automatically reduce the unbilled amount by the amount of the posted invoice (and provide an alert and/or email notification to the applicable firm users that the unbilled amount has automatically been reduced). The facility might use the same methods to ensure that unbilled amounts and posted invoices are not double-counted if the company reviews the unbilled amounts and the firm posts an invoice during the period in which the company reviews the unbilled amounts (which would be after the unbilled amounts posting due date).

Also, where company users review and approve unbilled amounts prior to the end of the accrual period, in some embodiments, the facility includes functionality to ensure that the accrual amounts do not include invoice amounts that are sent to AP after the accrual amounts are delivered to the company's finance department. For example, if the accrual amounts are sent to the company's finance department on the 25$^{th}$ of the month, but if the law department sends an approved invoice to AP after the accrual amounts have been delivered to the finance department but before the end of the month, then there is a risk that the unapproved amounts should not have included the invoice amount sent to AP. In some embodiments, the facility (i) prevents the law department from sending such approved invoices to AP or (ii) provides a warning to the law department before sending such approved invoices to AP.

In some cases, the company requires the firms to provide unbilled amounts prior to the end of the accrual period. In such cases, the facility may require the firms to provide two unbilled amounts: all unbilled amounts for the current fiscal year through the last full calendar month and the estimated billing for the current month. In some embodiments, the facility provides the ability for a firm user to upload the amounts already incurred for the current month (the "WIP," or "work in progress," for the current month), which can be displayed to the firm users responsible for the unbilled amounts, but such amounts will not be shown to company users (because the firm may not want the company to view its WIP for the current month). In some embodiments, the facility displays to the firm users responsible for approving the estimated billing for the current month the current month budget estimate and the WIP in the same screen, with the ability to easily approve the existing budget amounts as the estimated billing for the current month or to edit the amounts. In some embodiments, the facility does not require the firm to enter an estimated billing for the current month because the facility will prorate the WIP to generate an estimated billing amount for the entire month.

In some embodiments, the facility automatically estimates the unbilled amount from a budget for the matter, which when combined with the pending invoices that have not been sent to AP is the accrual. This approach typically provides the benefit of reducing the burdens on law firms. For example, firms can be required to manually enter unbilled amounts only at the end of the fiscal year. During the other months, the facility automatically generates the accrual by summing (i) the amount of invoices pending in the facility that have not been sent to AP for payment plus (ii) the firm unbilled amount that is calculated from a budget. This approach creates the least burden on firms, yet still allows a company to send materially accurate accruals to its finance department every month. Alternatively, in some embodiments, the facility requires firms to manually enter unbilled amounts only at the end of each quarter. This is a greater burden on firms, but still does not require the firms to manually enter unbilled amounts each month. Using budgets to estimate only the unbilled amounts is also typically superior to using budgets to estimate the entire accrual, because the pending invoice data is actually known and determinable, and only the unbilled amount is estimated.

In some embodiments, the company can choose whether to activate a Departmental Budgeting module. If activated, the module allows the company to create processes for obtaining a fiscal year budget for the law department (called the "Departmental Budget"), and for obtaining periodic reforecasts of the total year spending, so that the law department can assess spending against the original Departmental Budget. When setting up the module, the company can select for all matters, or for individual matters, whether the firms' budgets will be used for the Departmental Budget and Reforecasts, or whether the company will enter a separate Departmental Budget and Reforecast (in which case the company-entered budget amount will not be visible by the firm users). If the Departmental Budgeting module is activated, for any month in which firms' unbilled amounts are calculated from a budget, the budget that is used is the most recent Departmental Budget or Reforecast. On the other hand, if the Departmental Budgeting module is not activated, then the firms' budget, if any, would always be used to estimate the unbilled amounts for an accrual.

In some embodiments, the facility can be set up to include accrual information with approved invoice data that is sent to the company's AP department for payment. For example, the invoice payment file can be configured to include the accrual against which the invoice applies, the original accrual amounts, the balance prior to the invoice, and the balance after the invoice is paid.

In some embodiments, the facility uses the unbilled amounts for other purposes besides just calculating the accrual amount. For example, when a user edits a budget, the facility presents a user interface for prefilling prior spending and unbilled amounts as the budget amount for those months. In some embodiments, spending reports and actual-to-budget reports include an option to include unbilled amounts in the spending totals. In some embodiments, the user interface presented to company users when reviewing spending amounts to determine reforecasts for the year includes unbilled amounts. In some embodiments, when a firm user posts an invoice to a matter prior to the unbilled amounts posting due date and unbilled amounts were previously entered for the matter, the system provides a warning to the firm user that unbilled amounts have already been posted and should be modified if the unbilled amounts include the amount of this invoice. In some embodiments, when a company user is reviewing a pending invoice, the system displays an alert if the invoice amounts against the applicable accrual exceed the unbilled amounts of the accrual.

In some embodiments, if the facility has both budget and accrual capabilities, the facility provides a cumulative analysis of the financial workflows created and the burdens imposed by the company's system setup. In addition, in some embodiments, the facility makes it possible for a company user to review unbilled amounts, pending budgets, and pending reforecasts on one screen, with an option for one-click approval so long as all of the conditions for approving unbilled amounts, pending budgets, and pending reforecasts have been satisfied. In such a case, the facility has setup options to ensure that data becomes due on the same date, so that users can review all pending data at the same time.

Details of how the facility may be implemented are described below in conjunction with FIGS. 1-27.

FIG. 1 is a high-level block diagram showing a typical environment in which the facility operates. The block diagram shows several shows several client computer systems (which are company users and outside firm users), such as client computer systems 110, 120, 130, and 140. Each of the client computer systems has a web client computer program for browsing the World Wide Web, such as web clients 111, 121, 131, and 141. The client computer systems are connected via the Internet 150 to a server computer system 160 hosting the facility. Those skilled in the art will recognize that client computer systems could be connected to the server computer system by networks other than the Internet, however. To be able to connect to the server computer system, each client computer system must properly authenticate itself to the server computer system, such as by providing user ID and password, or using other authentication technology.

The server computer system 160 contains a memory 170. The memory 170 preferably contains the facility 171, incorporating matter management functionality 172, electronic invoicing functionality 173, and accruals functionality 174 typically used by the facility. The memory preferably further contains a web server computer program 175 for delivering web pages in response to requests from web clients. While items 171-175 are preferably stored in memory while being used, those skilled in the art will appreciate that these items, or portions of them, may be transferred between memory and a persistent storage device 183 for purposes of performing memory management and maintaining data integrity. The server computer system further contains one or more central processing units (CPU) 181 for executing programs, such as programs 171-175, and a computer-readable media drive 182 for reading information or installing programs such as the facility from computer-readable media, such as a floppy disk, a CD-ROM, or a DVD.

While various embodiments are described in terms of the environment described above, those skilled in the art will appreciate that the facility may be implemented in a variety of other environments including a single, monolithic computer system, as well as various other combinations of computer systems or similar devices connected in various ways. Additionally, those skilled in the art will appreciate that the facility may be implemented using various software configurations, such as configurations in which the matter management, electronic invoicing, and/or accruals software are merged, or other configurations in which their functionality is divided across a larger number of modules, and/or distributed over multiple computer systems.

Figure 2A:
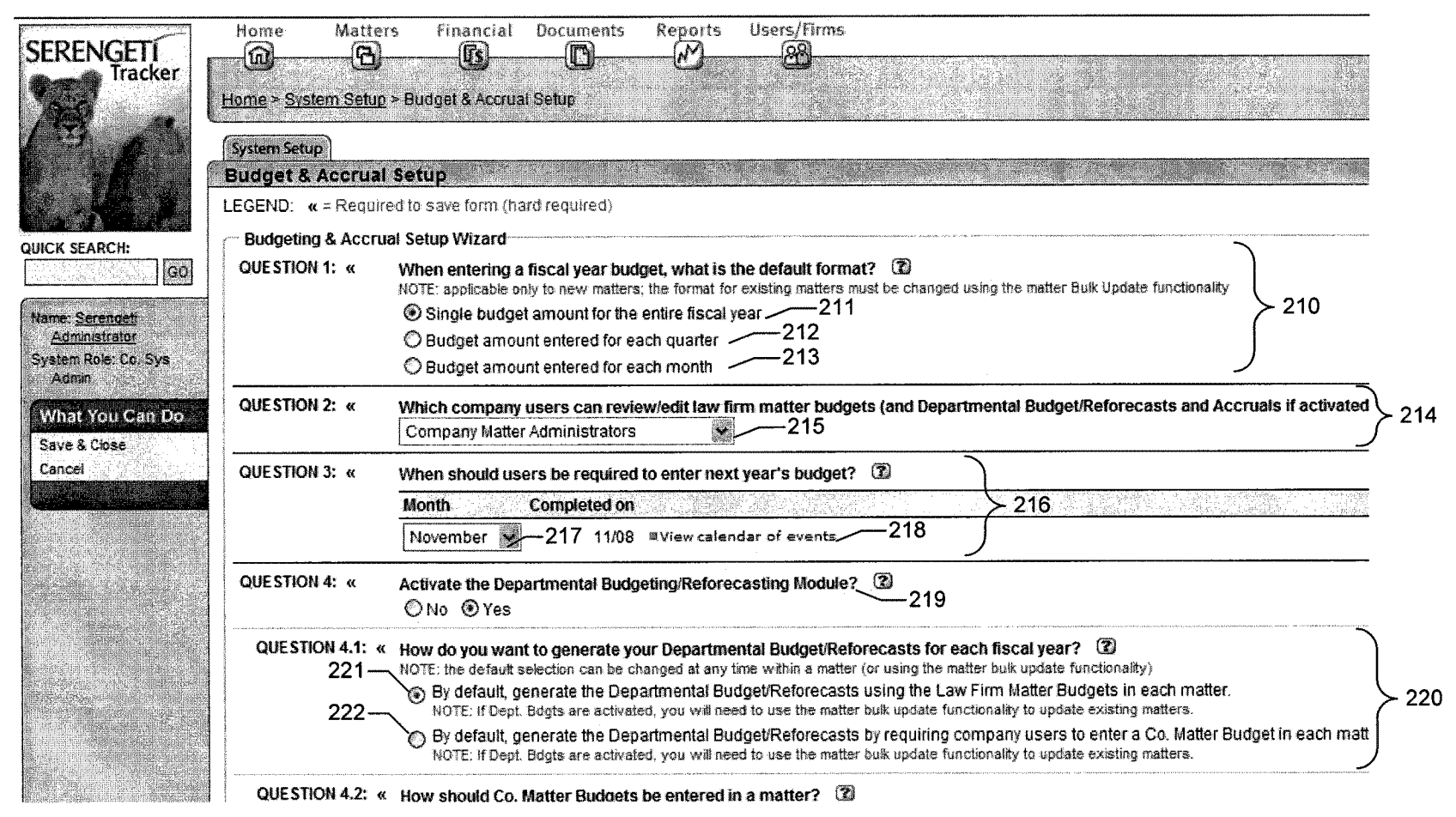

FIGS. 2A, 2B, and 2C are portions of a typical user interface presented by the facility to enable the user to configure the use of budgets and accruals. In these figures, the configuration options of budgets and accruals are shown on a single web page because of the interrelationship of many of the settings; however, a person skilled in the art will recognize that these configuration options could be divided into two or more web pages, or could be configured through database settings rather than a web page in the application interface. In some embodiments, the facility provides a control 210 for specifying the default format for entering a fiscal year budget. The control 210 includes an option 211 to enter a single budget amount for the entire fiscal year, an option 212 to enter a budget amount for each quarter, and an option 213 to enter a budget amount for each month. In some embodiments, this setting will apply to all matters, while in other embodiments this setting might be a default setting which can be changed in the individual matters. (See, for example, 709 in FIG. 7A.) In some embodiments, the facility provides a security setting control 214 for specifying which users have authority to edit and approve budgets and accrual amounts. The control 214 includes an option 215 to limit the users that have editing and approval privileges to company matter administrators or to other users or groups of users. A person skilled in the art will recognize that other embodiments may have a different security configuration such that budgets and accruals are set up separately, by matter or by groups of matters, or by the amount of the budget or accrual to be approved. In some embodiments the facility provides a control 216 for specifying the deadline for entry of next year's fiscal year budget. The control 216 includes an option 217 to select the deadline month and an option 218 to view a calendar of events. The deadline selected in control 216 will also be set in control 231 as shown in FIG. 2B as the deadline for any Departmental Budgets if the Departmental Budgeting/Reforecasting Module is activated in control 219.

In some embodiments, a company user can activate a special module in control 219 to require a "Departmental Budget" and Reforecasts throughout the year. A Departmental Budget is a budget for the upcoming fiscal year that is created by or imposed on a company or department within the company for planning purposes and tracking spending throughout the fiscal year. Reforecasts are estimates of spending that may be obtained one or more times throughout the fiscal year to determine the progress of spending against the Departmental Budget for the fiscal year. If activated, there may be several additional configuration options. In some embodiments, the facility provides a control 220 to specify the default method for generating Departmental Budgets and Reforecasts for each fiscal year. The control 220 includes an option 221 to use specific firm budgets from each matter to create the total Departmental Budget (as well as for Reforecasts), and an option 222 to require company users to enter a "company matter budget" for each matter, which cannot be edited or viewed by firms. In the embodiments shown in FIG. 2A, these are default settings that can be changed within individual matters. However, a person skilled in the art will recognize that there could be other configuration controls and options, such as a setting that specifies the configuration for all matters or groups of matters in the system, rather than merely being a default setting.

In the embodiments shown in FIG. 2B, if a company matter budget is to be used for the Departmental Budget and/or Reforecasts, a company user uses control 223 to specify how company matter budgets should be entered in each matter. A company user may select an option 224 to specify that a single company budget is entered for all firms in each matter, or an option 225 to specify that a separate company budget is entered for each firm in each matter. A person skilled in the art will recognize that this configuration option could be instead specified for groups of matters or in each individual matter. In some embodiments, the facility provides a control 225 for specifying how often a Reforecast should be generated. The control may include an option 226 to specify in which months a Reforecast is to be prepared; an option 227 to merely alert users to review budget amounts for the Reforecast and an alternate option 228 to require users to take an action to update or approve the current budget amounts; an option 229 to specify the date by which the update/approval must occur; and an option 230 that provides the user with the ability to edit such dates.

Figure 13A:
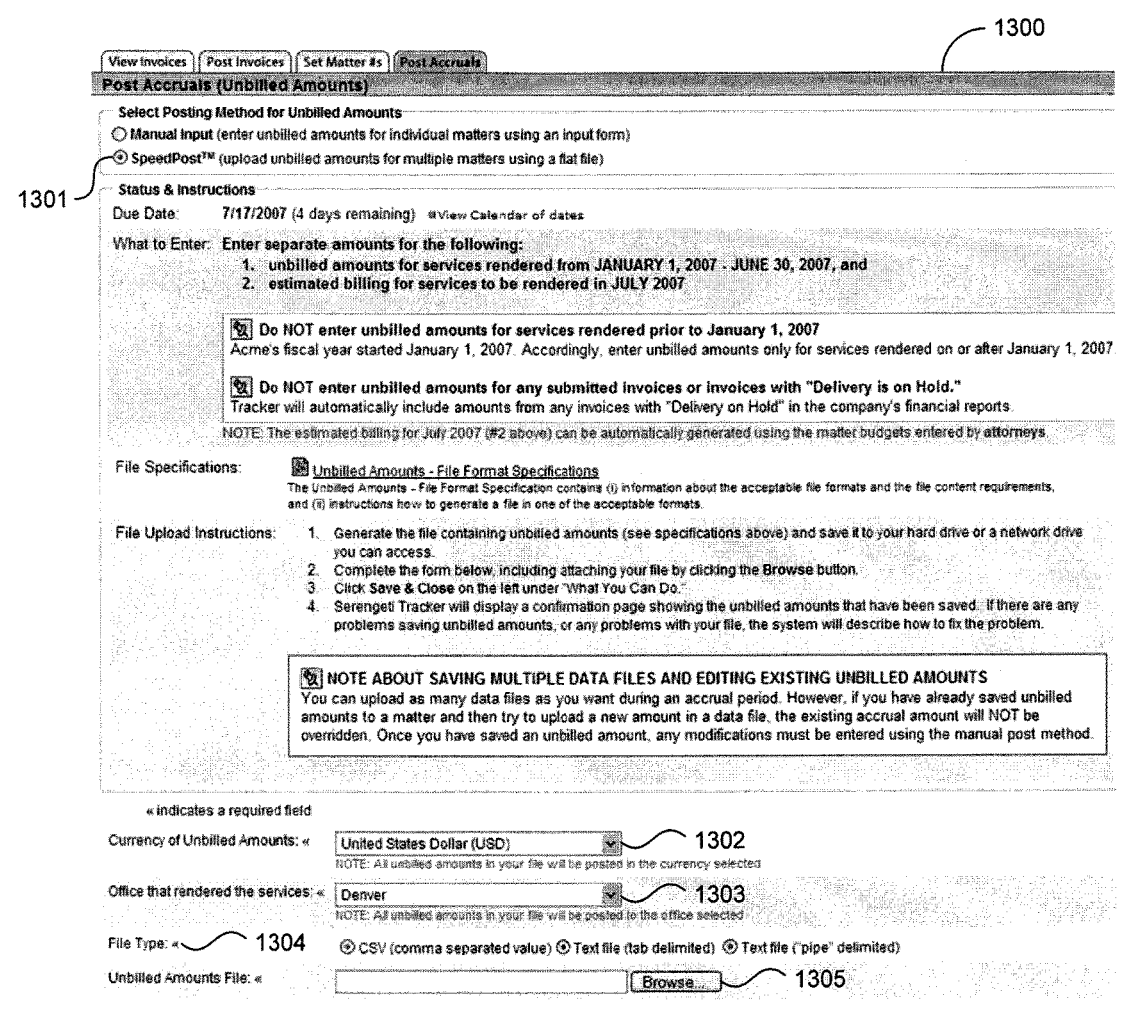

Turning to FIG. 2C, in some embodiments, the facility displays a control 240 that the user can manipulate to activate a special accrual functionality module. If activated, there may be several additional configuration options. In some embodiments, the facility provides a control 241 to specify when firms will be required to provide unbilled amounts. A company user can choose an option 242 to receive unbilled amounts from firms before the accrual period ends or, alternatively, an option 243 to receive unbilled amounts after the end of the accrual period. In some embodiments, if unbilled amounts are to be entered before the end of the accrual period, the facility provides other options, such as an option 244 to require firms to enter a billing estimate for the entire month (even though the month is only partially completed), or, alternatively, an option 245 to require firms to enter the unbilled amounts through a specified date in the current month and the facility will estimate the entire month amount by prorating the partial month amount. A person skilled in the art will recognize that some embodiments may not require a specified date, and instead the firms, when posting unbilled amounts, enter the date through which unbilled amounts are being entered (the entry of such a date would be on a page for uploading a spreadsheet of unbilled amounts such as shown in FIG. 13A). Other "before-the-end-of-the-month" options could include an option 246 to require company users to review and approve firms' unbilled amounts (because the current month amount will be an estimate). In some embodiments, the facility provides a control 247 to specify how frequently firms will be required to manually input unbilled amounts. A company user can choose an option 248 to receive unbilled amounts from firms once at the end of the fiscal year, an option 249 to receive unbilled amounts quarterly, or an option 250 to receive unbilled amounts each month. A person skilled in the art will recognize that there could be different configuration options. For example, the facility may provide a list of all months in the fiscal year and enable a company user to select specific months for receiving unbilled amounts. In some embodiments, if a company user does not select to receive unbilled amounts from firms every month, the user can select an option 251 to specify that, during months in which firms do not enter unbilled amounts, an accrual will nevertheless be generated from budget data (i.e., the budget is used to estimate the unbilled amounts).

In some embodiments, the facility has a button or link 252 that the user can click to view an analysis of the cumulative burdens imposed by the selected budget and accrual setup options. A person skilled in the art will recognize that such button or link could be located elsewhere in the application interface, and such analysis may include other financial factors besides budgets and accruals.

FIG. 3A is a typical user interface presented by the facility to display a cumulative burden analysis of the budget and accrual setup options. When the user clicks the button or link (e.g., button or link 252 in FIG. 2C) to view the cumulative burden analysis, a web page 300 is displayed. In some embodiments the cumulative analysis includes a graphical representation 301 of the relative cumulative burden, as well as an explanation 302 of the comparison to the average law department (the average cumulative burden is established using data from the setup configurations of all companies or similarly situated companies using the facility). In some embodiments, the facility displays other comparative information, such as a display of a graphical representation of the other law departments and the law department's location on the graph. In addition, the cumulative analysis page provides an analysis 303 of the settings that create the most burdens, with suggestions regarding how to reduce the burdens.

FIGS. 3B and 3C are sample table diagrams relating to FIG. 3A showing how the facility determines the cumulative burden analysis. In some embodiments, a ranking is given to each answer to the configuration options shown in FIGS. 2A, 2B, and 2C, and in other embodiments a weighting may be given to only certain question and answers. The table 320 shown in FIG. 3B contains the burden rating for selected questions and answers. For example, if the answer to Question 1 in FIG. 2A is Monthly, as indicated in cell 321, then a burden rating of 3 is assigned, as indicated in cell 322. If the answer to Question 5.2 in FIG. 2C is Quarterly, as indicated in cell 323, then the rating is 1, as indicated by element 324, but if the answer is Monthly, as indicated in cell 325, then the rating is 4, as indicated by element 326. If the table 320 does not specify a burden rating for a question or answer, the burden rating is zero.

The table 330 shown in FIG. 3C shows how the facility determines the cumulative burden using the values from the prior table 320 shown in FIG. 3B. In each column 331, the table shows the answer selected for each of the relevant questions and its corresponding point value. The facility sums the point values for all of the relevant questions to generate a cumulative burden score, as depicted in each cell 332. This cumulative burden score is then displayed to the company user as shown in FIG. 3A.

FIG. 4 is a typical user interface presented by the facility to display the dates applicable to entering unbilled amounts (and other required events). For each month 401, the display shows a column 402 of the events that will become due of law firm users and a column 403 of the events that will become due of company users, and columns 404 of the various dates relating to those events. This display shows how the events for a month are synchronized to occur at the same time. A person skilled in the art will recognize that there may be other types of events that are not shown in this example, and that there may be some situations where some events will have a unique set of dates that are not synchronized with the other events for the month.

FIG. 5 is a typical user interface presented by the facility to enable the user to view and edit the unbilled amount due dates and the review dates. In some embodiments, the company user can set due dates for each individual month. In other embodiments, the facility consolidates certain months to reduce the amount of data entry. For example, the dates entered in section 501 for January-November will apply to each month from January through November, and the dates entered in section 502 for December will apply only to December. There may be multiple dates relating to each event. For example, the facility may require a firm input due date 503, from which an earlier notification date 504 and reminder date 505 can also be specified. The facility may also require a company input due date 506, a company notification date 507, and a company reminder date 508. Such dates may apply to all events that become due for the applicable month. For example, if a company required firms to provide accruals and a status report in August and the year was 2007, then according to the sample values in FIG. 5, the facility would send an initial notification on Jul. 24, 2007, a reminder notification (if the status report and accrual had not been provided for the matter) on August 3, and the last day for entering the status report and accrual would be August 6. In the embodiments shown in FIG. 5, the dates apply to all events that have been specified for the month. However, a person skilled in the art will recognize that the facility could enable the company to specify the events to which the calendar dates apply. Moreover, if firms are required to enter unbilled amounts after the end of the month (as shown by option 242 in FIG. 2C), there may be a separate calendar of events for events that become due before the month and after the month.

Figure 6A:
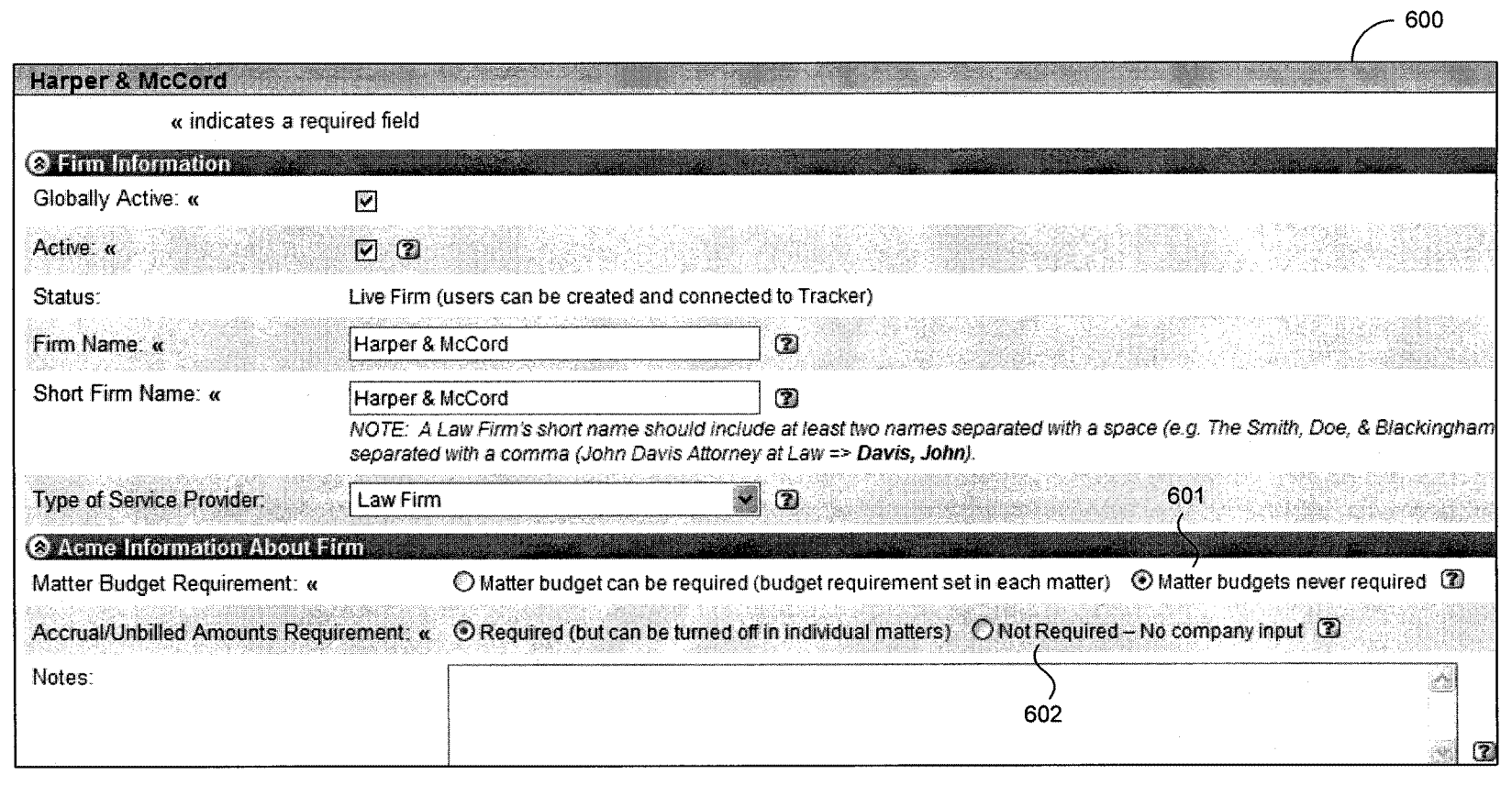

FIG. 6A is a typical user interface presented by the facility to a company user to enable the user to configure a firm profile so that the firm is not required to enter unbilled amounts or budget amounts. In some embodiments, the administrative page 600 for a firm contains a global setting 601 to specify that the firm is never required to enter budgets and a global setting 602 to specify that the firm is never required to enter unbilled amounts.

Figure 6B:
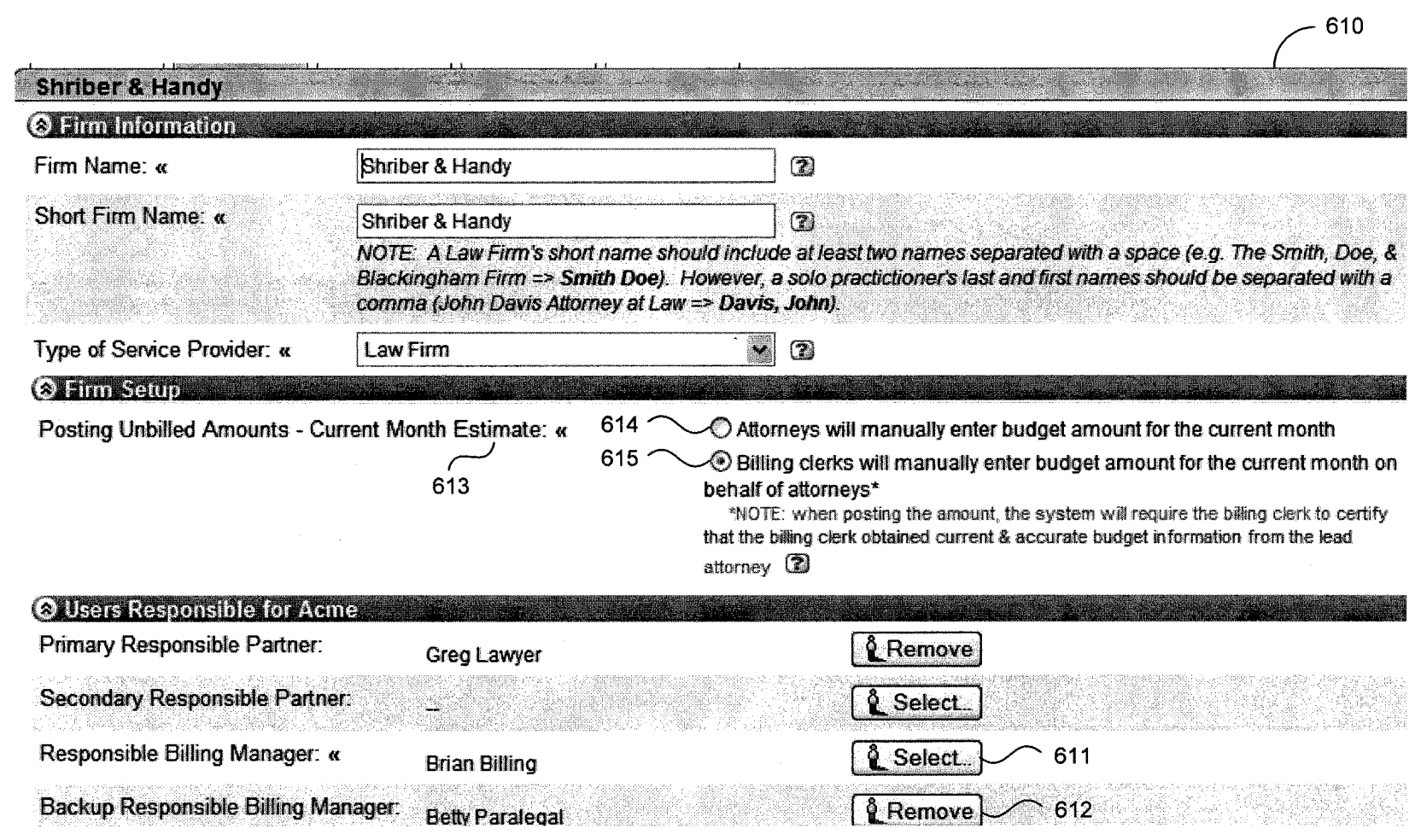

FIG. 6B is a typical user interface presented by the facility to a firm user to enable the user to configure a firm profile 610 so that the firm user can specify the billing managers who will be responsible for receiving notices about unbilled amounts that are due. The firm user can select a link or button 611 to specify a primary billing manager and a link or button 612 to specify a backup billing manager. In addition, the firm profile contains a control 613 to specify who is to manually enter the current month estimate if unbilled amounts are required to be entered before the end of the month (as in option 242 in FIG. 2C). A firm user may select an option 614 to specify that attorneys are to enter budget amounts or an alternative option 615 to specify that billing clerks are to enter budget amounts on behalf of attorneys.

FIGS. 7A and 7B are typical user interfaces presented by the facility to enable the user to configure accrual and budget options for individual matters and for groups of matters. For each matter created in the system, the facility presents a display 700 for specifying matter options affecting workflows and other information about the matter. In some embodiments, if the Departmental Budgeting module has been activated (e.g., control 219 in FIG. 2A), the matter options include an option 701 that specifies whether a Departmental Budget and Reforecasts are required. In some embodiments, an option 702 allows the user to select to use the firm matter budget, and an alternative option 703 allows the user to select to use a separate company budget. A person skilled in the art will recognize that the option to turn on or off the requirement may be affected by the configuration options for the entire facility (such as the options shown in FIGS. 2A-2C). In some embodiments, the matter options include an option 704 that specifies whether to generate accruals for the matter. If accruals are to be generated, in some embodiments the facility provides a control 705 that enables the company user to specify whether to require firms to enter unbilled amounts. A person skilled in the art will recognize that the facility may display each firm with access to the matter, and allow the company user to specify the requirement with respect to each firm. In addition, the option to turn on or off the requirement may be affected by the configuration options for the entire facility (such as the options shown in FIGS. 2A-2C). Moreover, as indicated by option 706, companies may give firms access to the matter in a manner that will not require entry of unbilled amounts. If a company user selects an option 707 specifying that the facility is to generate unbilled amounts from budgets, then the user must either select an option 701 to activate the Departmental Budget feature for the matter, or select an option 708 requiring firm budgets for the matter.

Turning to FIG. 7B, in some embodiments, matters are assigned to a matter group, and the facility presents a display 710 for specifying matter group options. The matter group options contain a control 711 for specifying whether budgets and accruals are generated at the matter group level or for individual matters. If the user selects the option specifying that budget and accruals are to be generated at the matter group level, then, similar to the options presented for individual matters, the facility presents an option 712 specifying whether to require a Departmental Budget and Reforecasts for the matter group, and a control 713 specifying whether to generate an accrual for the matter group (both of which will be amounts for all matters assigned to the matter group). If an accrual is to be generated, in some embodiments the facility presents a secondary selection between an option 714 specifying that firms are required to input unbilled amounts in each matter and an option 715 specifying that firms are not required to enter unbilled amounts. In such embodiments, the matter group functionality is such that a firm is not given access to a matter group and therefore cannot enter unbilled time directly into the matter group, but a person skilled in the art will recognize that the matter group functionality could be altered so that firms could enter unbilled amounts directly into the matter group.

Figure 8:
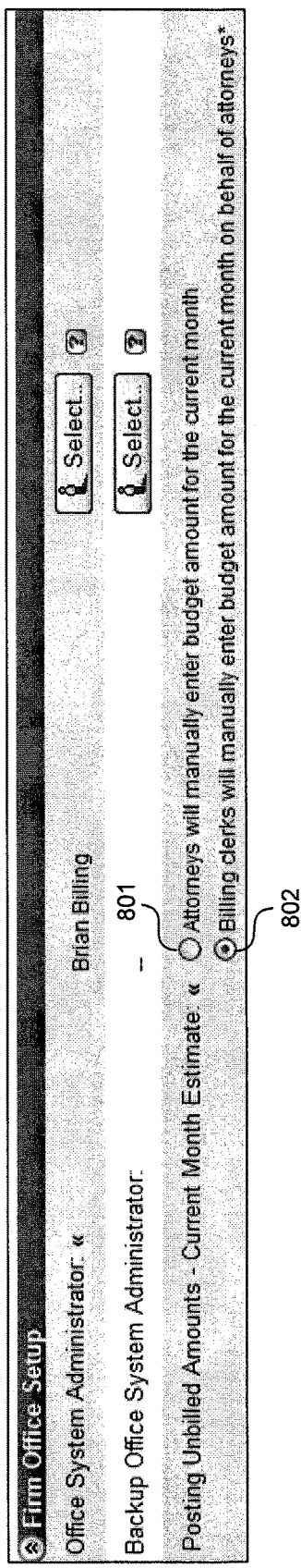
FIG. 8 is a display diagram showing how firms can configure the facility to specify which type of user is responsible for entering the estimated billing for the current month.

FIG. 8 is a typical user interface presented by the facility to enable a firm user to configure the facility to specify which type of firm user is responsible for entering the estimated billing for the current month. (The estimated billing for the current month can arise if the company has set up its system so that the firms just enter unbilled amounts before the end of the accrual period—see FIG. 2C.) If the firm user selects an option 801 specifying that attorneys will manually enter the amount, then the attorneys will receive the dashboard alerts that the estimated billing for the current month is due (see FIG. 11). If, on the other hand, the firm selects an option 802 specifying that the billing clerks will enter the amount, the then billing clerks will be responsible for obtaining that information from attorneys and entering the information with the other unbilled amounts from their time and billing system. A person skilled in the art will recognize that in some embodiments, the firm makes this selection once for all clients, while in other embodiments the firm is required to make this selection for each client's system. In addition, in some embodiments, this selection applies to the entire firm, while in other embodiments the selection is made for each office of the firm (for those firms who have different operating structures for each office).

FIG. 9 is a typical user interface presented by the facility to enable firms to enter their own matter numbers, to create a cross-reference table to the company's matters. The facility displays each matter 901 that the company has created for which the firm has been assigned to bill work. For each such matter, the firm can enter the client number 902 and matter number 903 from its time and billing system. The facility also enables the firm to enter more than one series of numbers 904 for each company matter. Those skilled in the art will recognize that in other embodiments, company users enter this information on behalf of firm users.

Figure 10:
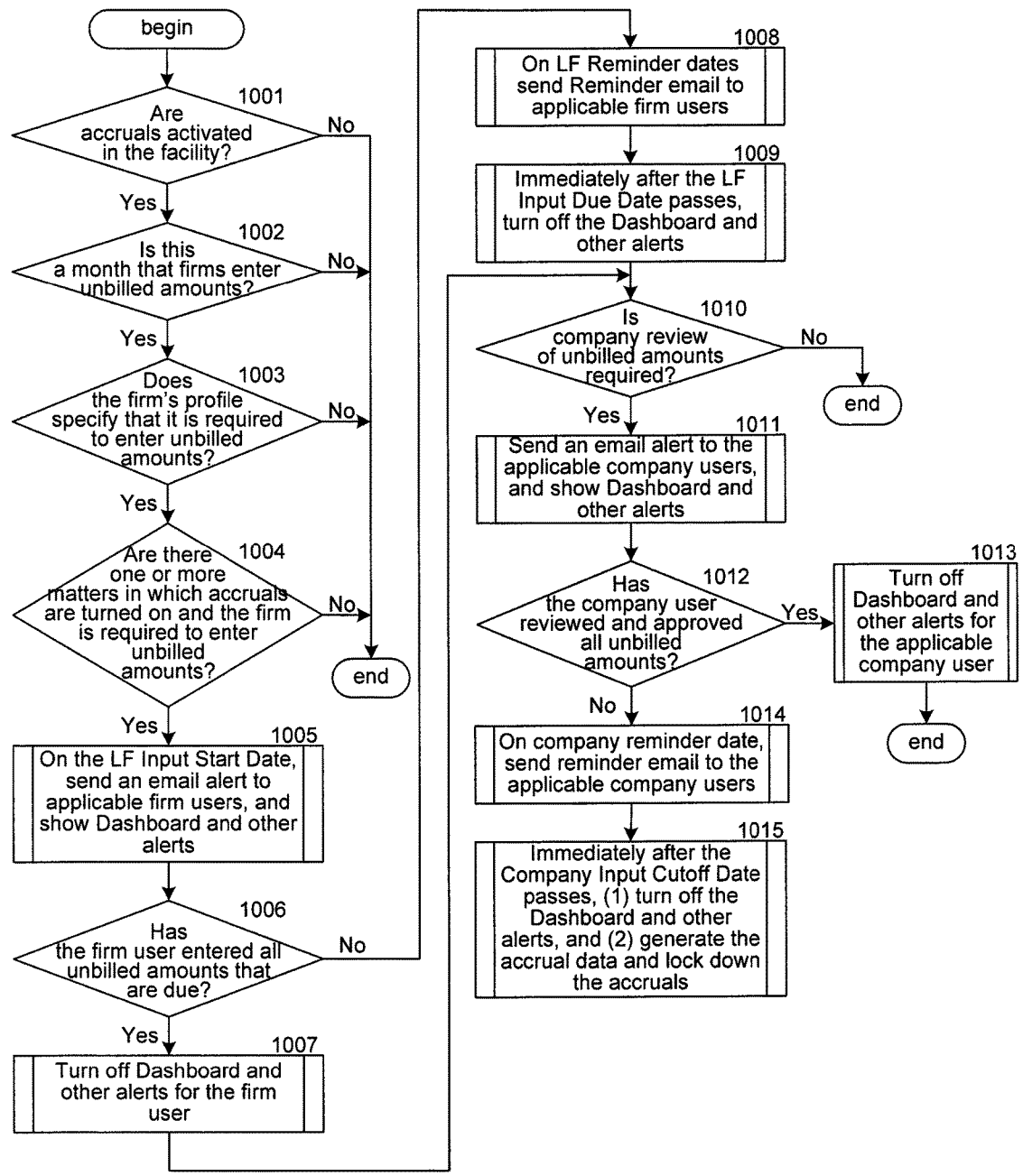
FIG. 10 is a flow diagram showing steps typically performed by the facility to ensure compliance with the accruals process specified by a company.
Figure 23:
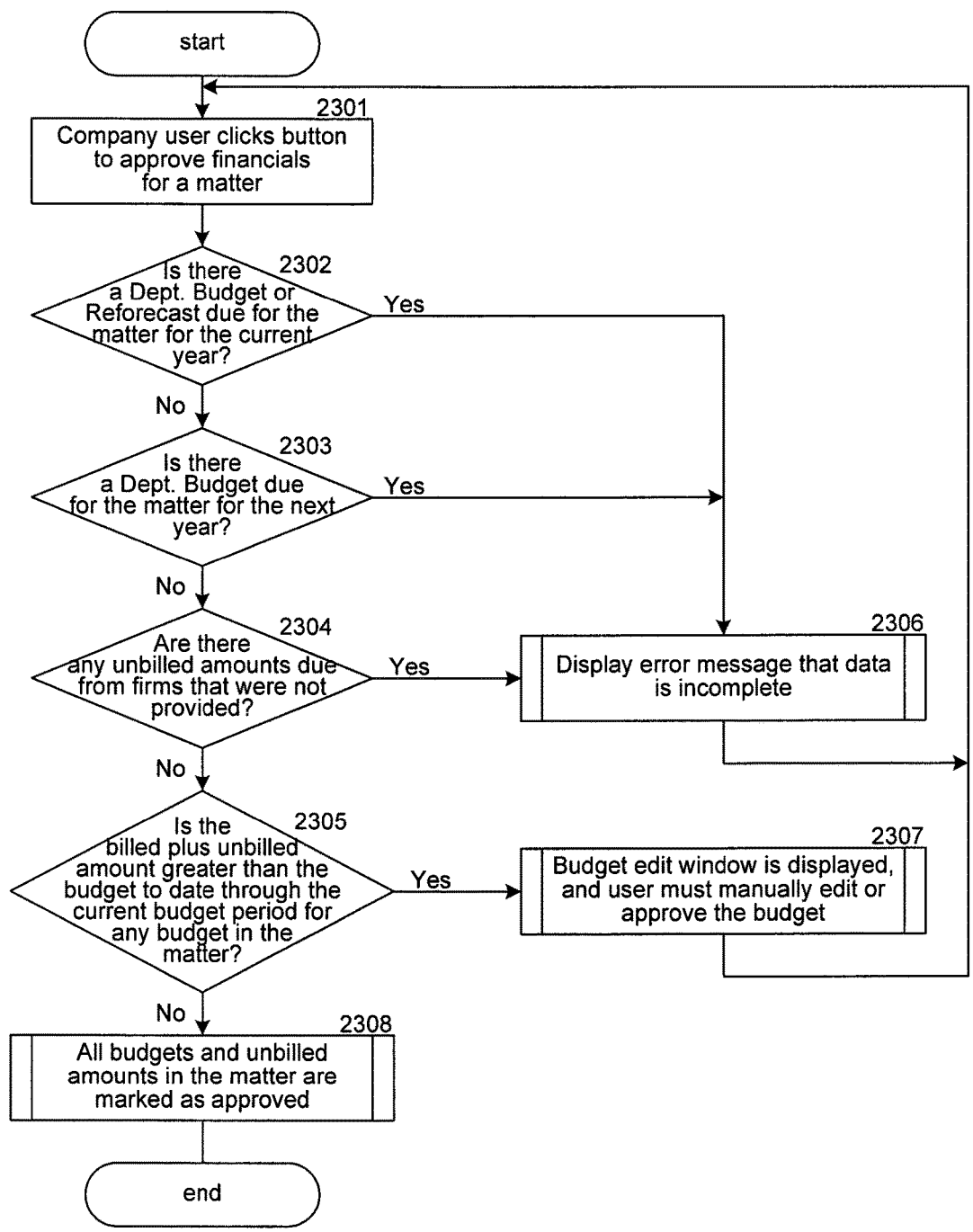
FIG. 23 is a flow diagram showing steps typically performed by the facility to determine whether financial amounts for a matter can be approved by company users with one click.

FIG. 10 is a flow diagram showing steps typically performed by the facility to ensure compliance with the accruals process specified by a company. The facility determines whether the company has imposed an accruals process, reminds firm users when unbilled amounts are due, and alerts company users to review such unbilled amounts as necessary. If at a decision block 1001 an accruals module has been activated, at a decision block 1002 the company setup specifies that the current month is one in which firms are required to input unbilled amounts, at a decision block 1003 the company requires the firm to enter unbilled amounts, and at a decision block 1004 there are one or more matters set up for which the firm is required to enter unbilled amounts, then at a block 1005 the facility sends an email to the firm users on the Law Firm Input Start Date (as specified in the calendar of events—see FIG. 4), and displays alerts within the system to the firm users. These users could include the Responsible Billing Manager or the Backup Responsible Billing Manager as designated by the firm user via buttons 611 and 612 in FIG. 6B. In some embodiments, emails and alerts could also be sent to any firm user that has posted an invoice in a recent time period, or any firm user that has access to the firm matters. Because these users are automatically maintained by the firm and/or are based on data and actions in the system, company users no longer have to maintain a manual list of contacts for sending accrual notifications. If at a decision block 1006 the firm user has entered all the unbilled amounts, at a block 1007 the facility turns off the dashboard and other alerts for the user. Alternatively, if at block 1006 a firm user has not entered all unbilled amounts due, at a block 1008 the facility sends a Law Firm Reminder Email to each firm user on the date specified in the calendar of events. Once the Law Firm Due Date passes, at a block 1009 the facility turns off all alerts for firm users. If at a decision block 1010 the facility is configured to require company user review of the unbilled amounts, then at a block 1011 the facility sends an email to the company users on the Company Input Start Date, and displays alerts to company users. If at a decision block 1012 the company user has reviewed and/or updated the unbilled amounts, at a block 1013 facility turns off the dashboard and other alerts for the user. Alternatively, if at block 1012 the company user has not reviewed and/or updated the unbilled amounts, at a block 1014 the facility sends a Company Reminder Email to each company user on the date specified in the calendar of events. Once the Company Input Cutoff Date passes, at a block 1015 the facility turns off the alerts and generates the accrual, as shown in FIG. 23.

Figure 11:
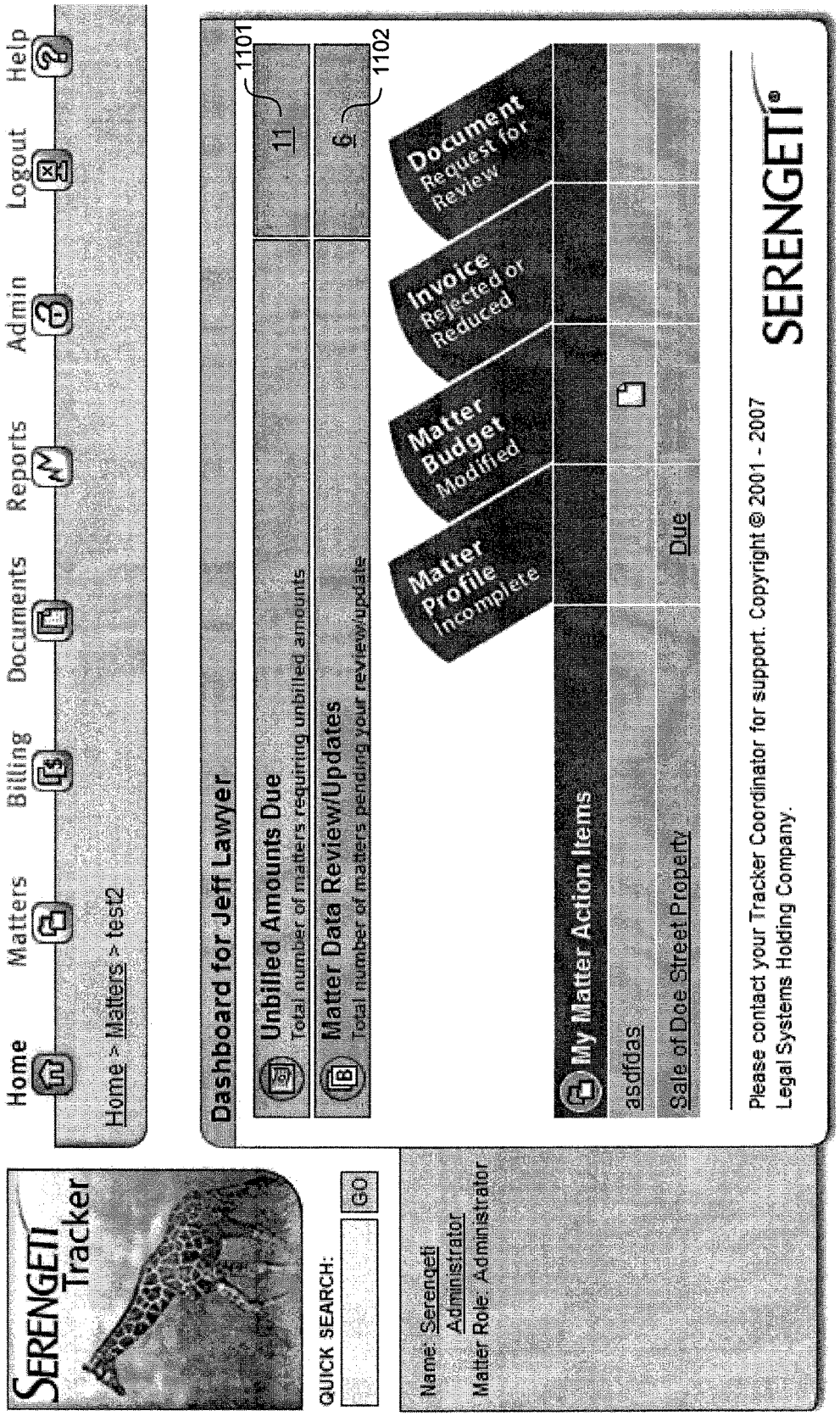
FIG. 11 is a display diagram showing how the facility alerts firm users that unbilled amounts are due in some embodiments.

FIG. 11 is a typical user interface presented by the facility to alert firm users that unbilled amounts are due. For those users that are identified as firm billing clerks and have unbilled amounts that are due, the dashboard displays an alert 1101 of the number of company matters for which such unbilled amounts are due. If firm attorneys are set up to enter the estimated billing for the current month (as shown in FIG. 6B) (which in some embodiments is used in the calculation of the total unbilled amount), the firm attorneys will see a separate alert 1102 of the number of matters for which such amount is due. (On the other hand, if the firm has been set up so that the billing clerks enter the estimated billing for the current month (as shown in FIG. 6B), then in this particular embodiment the alert for the estimated billing will be made part of the alert 1101 for the unbilled amounts.)

Figure 12B:
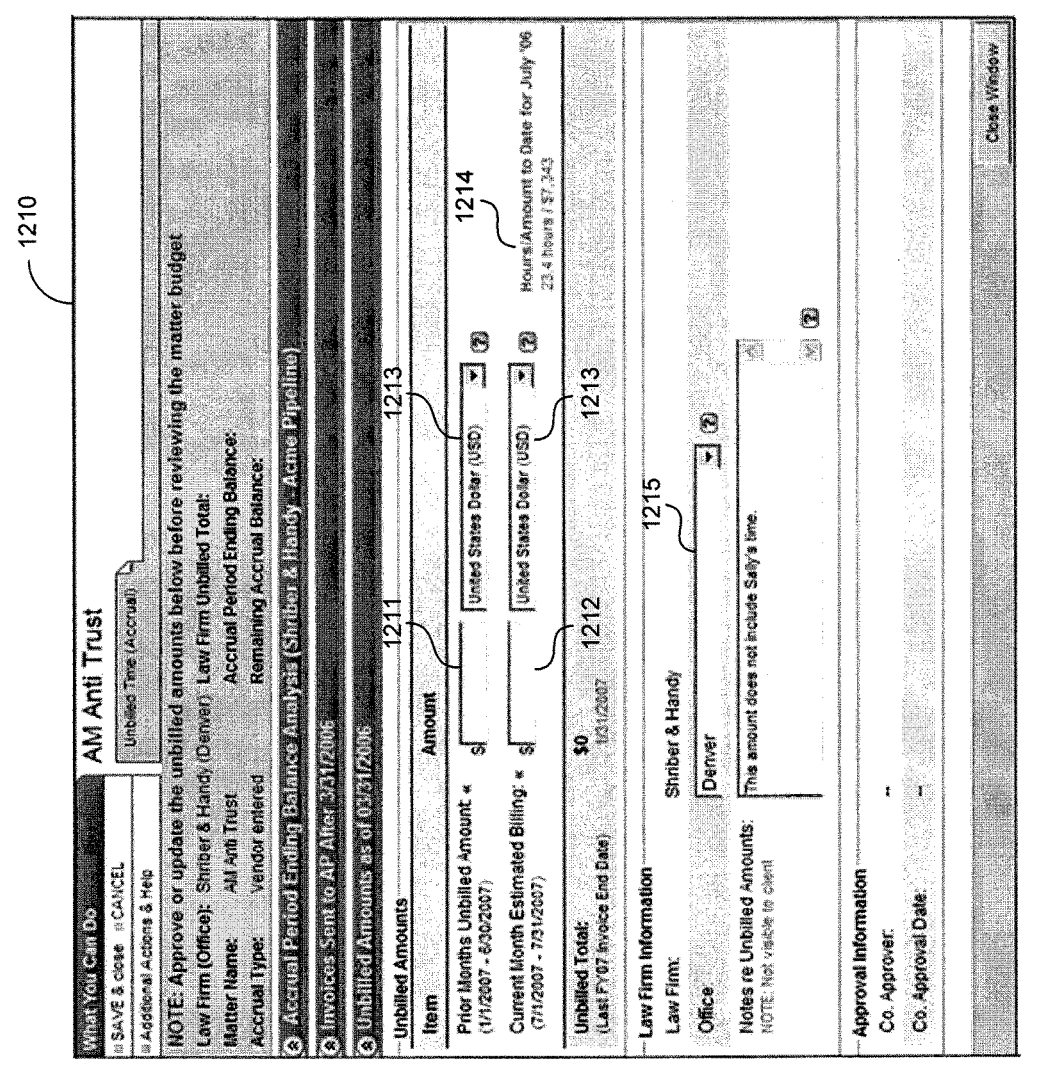

FIGS. 12A and 12B are typical user interfaces presented by the facility to enable firm billing clerk users to manually enter unbilled amounts. The display 1200 shows each matter 1208 in a company's system for which the firm is required to enter unbilled amounts. The facility provides a control 1201 for specifying the posting method for unbilled amounts. The firm user selects an option 1202 to manually input the amounts, or an alternative option 1203 to upload amounts from a spreadsheet. The billing clerk is always responsible for entering the prior months' unbilled amounts in column 1204 (which it can obtain directly from the firm's time and billing system). The firm user accesses the edit form by clicking the edit action 1205, which opens the dialog window displayed in FIG. 12B. A person skilled in the art will recognize that the facility could provide an edit box on this page rather than a dialog window. If the billing clerk has also been set up to enter the estimated billing for the current month, column 1206 is also displayed to the firm user, and the firm user can click the edit action 1207 to access the edit form.

FIG. 12B shows a typical user interface displayed by the facility to enable the firm user to edit the unbilled amount in a field 1211 (and if responsible for the estimated billing for the current month, a field 1212 is also editable). In some embodiments, the facility provides a control 1213 for the firm user to specify the currency of the amounts being entered. In some embodiments, the firm also uploads and displays hours and amount to date for the current month, which the facility displays as element 1214, so that the user entering the estimated billing for the current month has easy access to the most recent data regarding work that has been incurred for the current month. In some embodiments, the input form includes a control 1215 that requires the firm to select the office (which is important data for passing to the company's finance department, because many times the firm ID in the firm's AP systems is based on the firm office). In some embodiments, the dialog window displayed to firm users does not show accrual data (e.g., the accrual period ending balance); instead it only shows data relevant to the law firm, which includes unbilled amounts, invoices posted against the unbilled amounts, and the remaining balance of the unbilled amounts.

FIG. 13A is a typical user interface presented by the facility to enable a firm user to upload a spreadsheet of unbilled amounts. If the user selects an option 1301 to upload a spreadsheet of unbilled amounts (which is the same selection as option 1202 in FIG. 12A), then the facility adjusts the rest of web page 1300 to display the fields for uploading a spreadsheet. The facility provides a control 1302 for the firm user to select the currency of the unbilled amounts being uploaded. A person skilled in the art will recognize that the currency could instead be contained in the spreadsheet that is uploaded. In some embodiments, the input form includes a control 1303 that requires the firm to select the office (which is important data for passing to the company's finance department, because many times the firm ID in the firm's AP systems is based on the firm office). In some embodiments, the web page includes a control 1304 that allows the firm user to specify the form of the data being uploaded, or the structure of the data being uploaded (for example, in some embodiments the upload option could be XML, or a flat file with a different column organization). The web page also contains a control 1305 to attach the file of unbilled amounts to be uploaded. If the company has required unbilled amounts to be posted before the end of the month, and if the company allows the firm to upload unbilled amounts for a partial amount of the current month (as shown in option 245 in FIG. 2C), then the user interface displays a date through which unbilled time must be entered as specified by the company, or, if no such date has been specified, then the user interface provides a field for the firm user to enter a date through which unbilled amounts will be entered. When such partial month amounts are uploaded, the facility automatically calculates the "Current Month Estimated Billing" (as shown at 1504*a* in FIG. 15) by prorating the partial month amount entered by the firm.

FIG. 13B is a display diagram showing a sample spreadsheet 1310 of unbilled amounts to be uploaded by a firm user. The spreadsheet contains a column 1311 for the firm's CLIENT_ID and a column 1312 for the firm's LAW_FIRM_MATTER_ID, which can be obtained from its time and billing system. The spreadsheet contains a column 1313 for the UNBILLED_THRULASTMONTH. If the firm is required to enter unbilled amounts before the end of the accrual period, the spreadsheet also contains a column 1314 for the CURRENT_MONTH_ESTIMATE. When the firm uploads the spreadsheet, the facility matches the CLIENT_ID and LAW_FIRM_MATTER_ID to the client and matter table that has been entered into the facility as shown in FIG. 9, and posts the unbilled amounts from column 1313 and, if applicable, from column 1314. If the firm has more than one matter number applicable to a matter in the facility (see, for example 904 in FIG. 9), then the facility automatically totals the unbilled amounts for each matter. This auto-totaling typically saves effort on the part of firm employees because it enables the firm to generate a spreadsheet directly from its time and billing system without worrying about having to consolidate unbilled amounts based on how the company's matters are set up in the facility. In addition, if the company has required unbilled amounts to be posted before the end of the month, and if the company allows the firm to upload unbilled amounts for a partial amount of the current month (as shown in option 245 in FIG. 2C), then amount contained in column 1314 for the CURRENT_MONTH_ESTIMATE_is a partial amount for the month, and the facility will prorate the partial month amount to calculate an estimate for the full month.

FIG. 13C is a typical user interface presented by the facility to ensure that a firm user does not enter an amount during an accrual period that was already entered as an unbilled amount (i.e., a method to ensure that an amount isn't double entered both in the unbilled amount and as an invoice). If the firm has entered an unbilled amount for the applicable accrual period, and then posts an invoice to the same matter before the unbilled amounts due date (i.e., before the unbilled amounts are delivered to the company for review), then the facility displays an alert or warning message to the firm user posting the invoice (in FIG. 13C, the alert 1351 is displayed for invoice number 1982-331 1350. If the firm user posts the invoice after the unbilled amounts due date but before the company has completed its review (i.e., before the accrual is generated), in various embodiments, the facility (i) does not allow the invoice to be posted (so that the pending invoice amount will not be included in the accrual amount), (ii) automatically reduces the unbilled amount from the currently pending unbilled amount previously posted by the firm, or (iii) allows the invoice to be uploaded by the firm, but does not deliver the invoice to the company or include it in any unbilled amounts that comprise the accrual. In the example of (iii), the facility automatically delivers the invoice for the firm after the company review period has expired and the facility has generated the accrual amounts for the accrual period. Techniques for delivering, omitting to deliver, and delaying delivery of the invoice to the company are further described in U.S. patent application Ser. No. 10/923,606, filed on Aug. 20, 2004, which is herein incorporated by reference in its entirety.

FIG. 14 is a typical user interface presented by the facility to enable firm attorneys responsible for the estimated billing for the current month to view the budget estimate and the time entered (if uploaded by a firm for the estimated billing for the current month) for the current month and to edit the current month budget estimate. The web page 1400 shows all of the matter-related data that an attorney needs to review and/or update. The user can access this page by clicking on the alert 1102 shown in FIG. 11, or the user can navigate to the page using other navigation links. In the example in FIG. 14, there is only one matter with matter that requires review and/or update—Acme—Business Matter 1401. With respect to budget data 1402, the user must approve or update the estimated billing amount 1403 for the current month, the forecast amount 1404 for the rest of the year, and a budget amount 1405 for the next fiscal year. In some cases, the firm may have already uploaded partial billing data for the current month. For example, if the firm user was viewing this web page on July 20, the facility may display data previously uploaded by the firm's billing clerks from the firm's time and billing system, including the total number of hours 1406 billed to date in July, as well as the amount of fees 1407 for those hours. In some embodiments, the facility also shows expenses. This data is useful for the attorney reviewing the estimated billing for the current month (in this case $15,000 for July). If the budget data is correct as displayed, the user can click the "No change" action 1408. However, because the 2007 fiscal year budget has not been provided, the facility displays an error message if the user clicks "No change" which explains that the 2007 fiscal year budget must be provided. The user can edit any of the budget data by clicking the "View/Edit" action 1409, which in some embodiments causes the facility to display a new dialog window (as shown in FIG. 12B) and in other embodiments causes the facility to display an edit box directly on the web page 1400. Other types of matter data that may be shown on this web page 1400 are the current matter status 1410, other matter profile data 1411, documents needing review/approval, and any other data maintained by the system. If the user reviewing the data has either clicked the action for "No change" or "View/Edit" and has made changes in the edit form, then in some embodiments, a green checkmark 1412 is displayed showing that this data has been approved or updated. If all of the data for a matter has been approved or updated, then the facility removes the matter from the web page.

Figure 15:
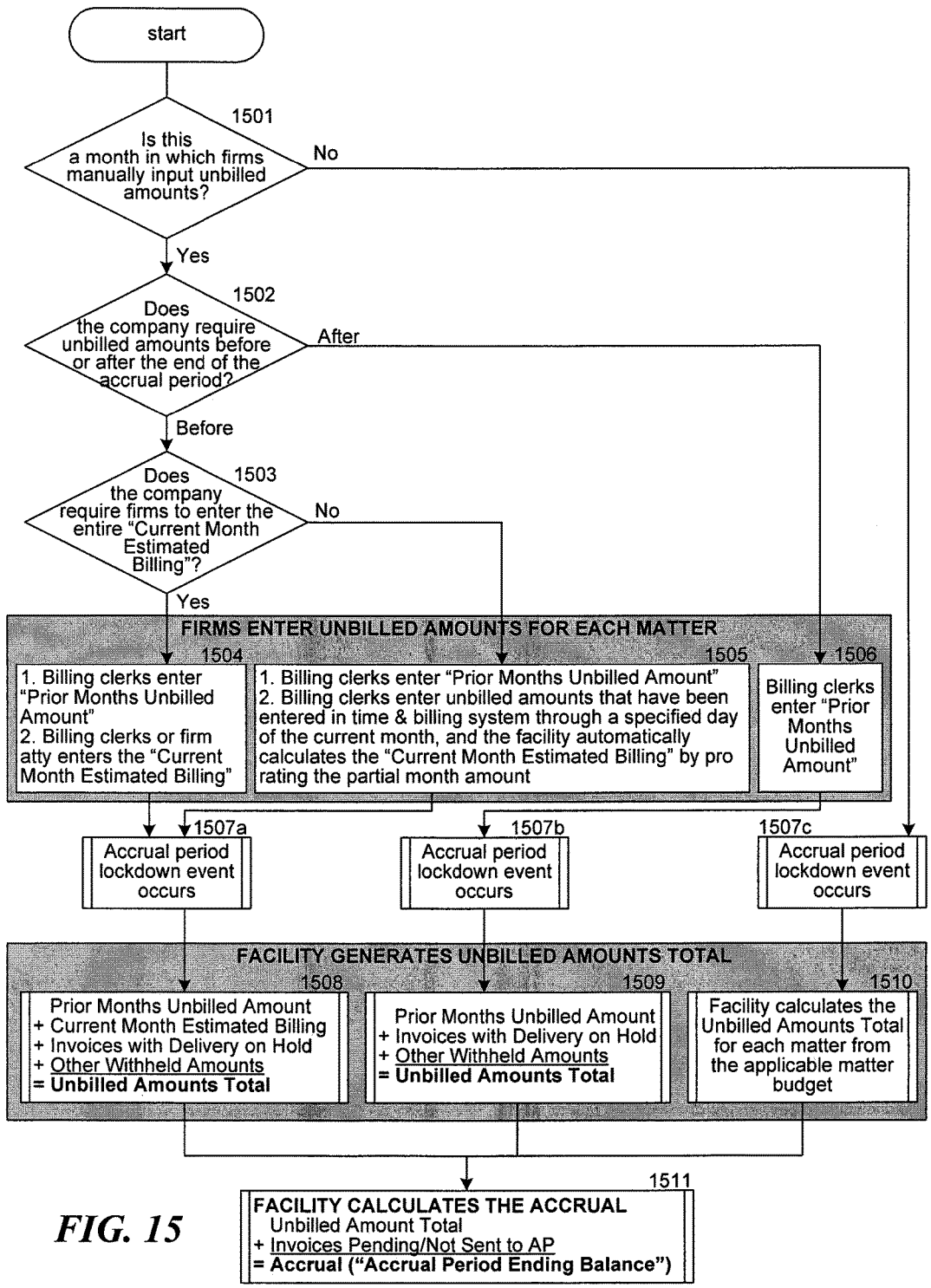
FIG. 15 is a flow diagram showing steps typically performed by the facility to calculate the accrual amounts.

FIG. 15 is a flow diagram showing steps typically performed by the facility to calculate the accrual with respect to a matter (which is also called the "accrual period ending balance"). The accrual period ending balance calculated at a block 1511 is the sum of the Unbilled Amounts Total calculated at one of blocks 1508, 1509, or 1510 plus the Invoices that have been delivered by the firm but have not been approved or delivered to the company's AP department for payment. In various embodiments, the facility obtains the Unbilled Amounts Total in different ways. If at a decision block 1501 this is a month in which firms do not input unbilled amounts, then when the lockdown event occurs at a block 1507*c*, the facility estimates the Unbilled Amounts Total from the applicable budget at a block 1510. For example, if a firm has entered a budget for the matter, the facility estimates the Unbilled Amount Total from that firm budget. Or, if the company has entered a Departmental Budget and/or Reforecast for the matter, then the facility calculates the Unbilled Amount Total for all firms in the matter from that budget. In some embodiments, the facility compares the calculated Unbilled Amounts Total to the sum of the Invoices with Delivery on Hold and Other Withheld Amounts, and uses the greater of the two values. If at block

1501 this is a month in which firms input unbilled amount, and if at a decision block 1502 the company has configured the facility to require unbilled amounts after the end of the accrual period, then the firms' billing clerks generate the "Prior Months Unbilled Amount" for each matter directly from their time and billing system, and enter or upload the data into the facility at a block 1506. After the accrual period lockdown event occurs at a block 1507*b*, the facility generates the Unbilled Amounts Total at a block 1509 by summing the Prior Months Unbilled Amount entered at block 1506, Invoices with Delivery on Hold (i.e., invoices that the firm has saved into the facility, but which have not been delivered to the client for review and payment), and other withheld amounts. Alternatively, if at block 1502 the company has configured the facility to require unbilled amounts before the end of the accrual period, at a decision block 1503 the facility determines whether the company requires firms to upload unbilled amounts for the entire month or, alternatively, whether firms are allowed to upload unbilled amounts for only a portion of the month. If at block 1503 the company requires firms to enter the entire "Current Month Estimated Billing," then, as in the prior situation, the firms' billing clerks generate the "Prior Months Unbilled Amount" for each matter directly from their time and billing system and enter or upload the data into the facility at a block 1504. In addition, either the firms' billing clerks or the firm attorneys also enter the "Current Month Estimated Billing" into the facility at block 1504. On the other hand, if at block 1503 the company allows the firm to upload unbilled amounts for a partial amount of the current month, then, as in the prior situation, the firms' billing clerks generate the "Prior Months Unbilled Amount" for each matter directly from their time and billing system and enter or upload the data into the facility at a block 1505. In addition, at block 1505, the firms' billing clerks also enter into the facility unbilled amounts from their time and billing system through a specified day of the current month, and the facility automatically calculates the "Current Month Estimate Billing" by prorating the unbilled amounts entered for the partial month. Whether firms upload unbilled amounts for the entire month or for a portion of the month, after the accrual period lockdown event occurs at a block 1507*a*, the facility generates the Unbilled Amounts Total at a block 1508 by summing the Prior Months Unbilled Amount entered at block 1504 or 1505, the Current Month Estimated Billing entered at block 1504 or calculated at block 1505, Invoices with Delivery on Hold (i.e., invoices that the firm has saved into the facility, but which have not been delivered to the client for review and payment), and other withheld amounts. The facility then generates the accrual at a block 1511 by summing the Unbilled Amounts Total calculated at one of blocks 1508, 1509, or 1510 and the Invoices Pending/Not Sent to AP.

Figure 16:
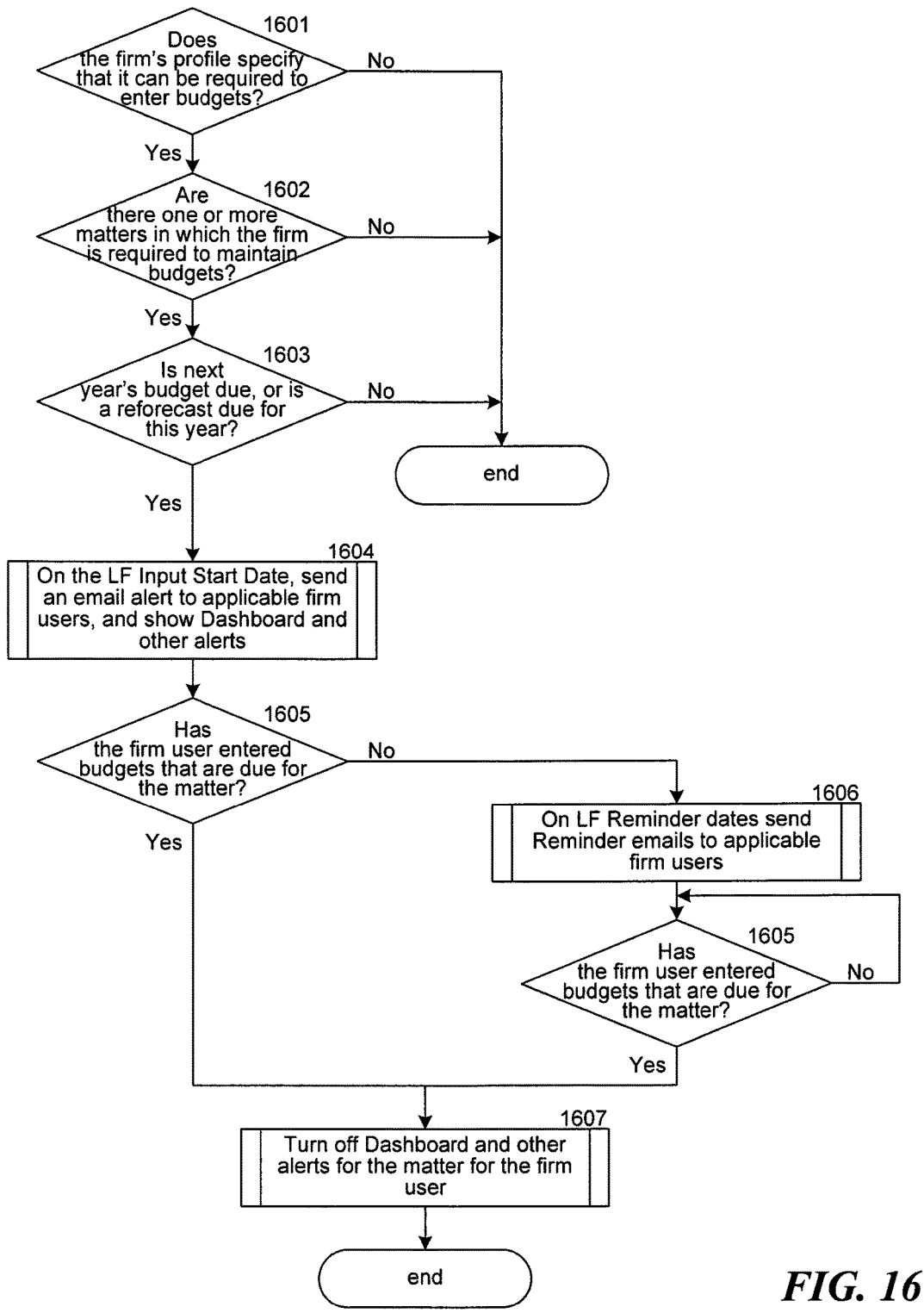
FIG. 16 is a flow diagram showing steps typically performed by the facility to determine whether a firm user is required to enter budgets for a matter.

FIG. 16 is a flow diagram showing steps typically performed by the facility to determine whether a firm user is required to enter budgets for a matter. The facility verifies at a decision block 1601 that the firm profile in the facility is set up so that the firm can be required to enter budgets, at a decision block 1602 that there are one or more matters in which the firm is required to maintain budgets, and at a decision block 1603 that next year's budget is due or a reforecast is due for this year. If all of those conditions are satisfied, then on the Law Firm Input Start Date for the applicable month, at a block 1604 the facility sends an email alert to the firm and also shows alerts to the appropriate firm users. If at a decision block 1605 a firm user then enters or updates the budget for a matter, then at a block 1607 the facility removes the dashboard alert for the matter. In some embodiments, if at block 1605 the firm has not entered or updated the budget due for a matter, at a block 1606 the facility will send one or more email reminder alerts. In the embodiments shown in FIG. 16, the facility does not remove the alert at a block 1607 until the firm has entered or updated the budget for the applicable matter. There are many different types of alerts that can be shown to firm users. One example an alert is a dashboard alert of matter data updates as shown in 1102 of FIG. 11.

Figure 17B:
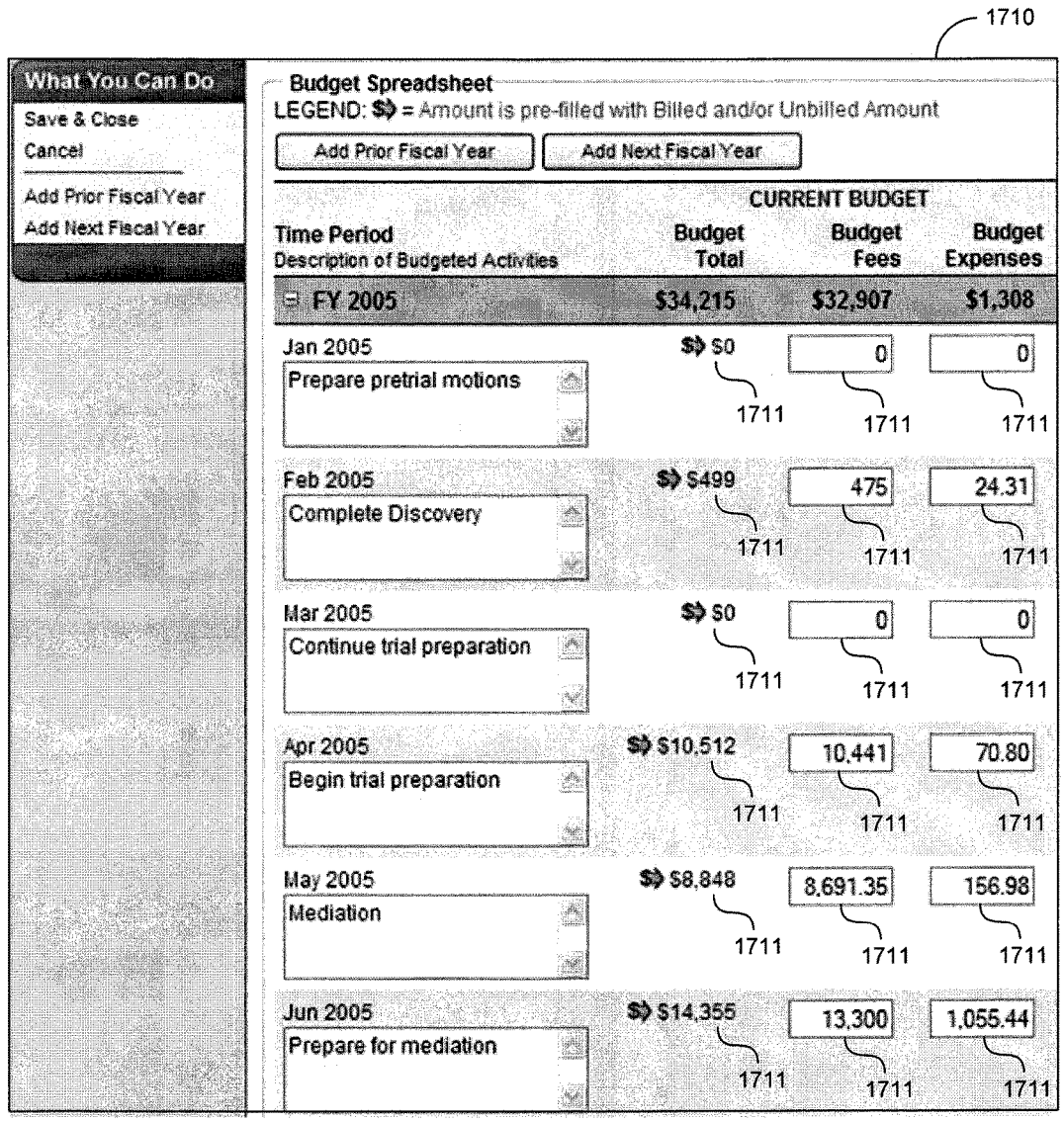

FIGS. 17A and 17B are typical user interfaces presented by the facility to enable the user to prefill prior budget months with the spending and unbilled amounts. In some embodiments, if a user is editing a budget in which the billed plus unbilled amounts do not match the existing budget amount relating to the existing budget period, the facility displays web page 1700 in FIG. 17A to the user and notifies the user with an alert 1701 that the billed plus unbilled amount does not match the existing budget. The facility presents a control 1702 for specifying whether to prefill the budget edit amount. The user can choose an option 1706 not to prefill the budget, or select from a variety of options 1703-1705 to prefill the budget. If the user elects to prefill the budget page, then the facility presents the a second control 1707 that allows the user to choose between an option 1709 to keep the same fiscal year total amount for the budget, and an alternative option 1710 to adjust the fiscal year total budget based on the variance of the billed plus unbilled amount through the current date. However, the facility does not allow the user to select option 1709 if the billed plus unbilled amount is already greater than the current budget. When the user clicks the Continue button 1711, the facility opens the budget edit form 1710 in FIG. 17B, with the applicable spending amounts prefilled in the budget form fields 1711. (In various embodiments, the facility presents the budget edit form in any of the formats specified in FIGS. 17C-F.) In the embodiments shown in FIG. 17B, the user can edit the prefilled amounts, while in other embodiments the web page displays the prefilled amounts as read only. In some embodiments, the facility does not present a budget prefill options page, but instead automatically prefills prior billed and, in some cases, unbilled amounts, and does not allow users to change such prefilled amounts when editing the budget.

FIGS. 17C-17G are various typical user interfaces presented by the facility to enable the user to input a budget. The budget entry form 1720 in FIG. 17C is an example of a monthly budget form, which contains fields 1721 into which the user can enter budget amounts for each month in the fiscal year, as well as a field 1722 into which the user can enter a comment for each month. The facility also displays the fiscal year total 1723 of the budget amounts entered for all of the months.

Figure 17D:
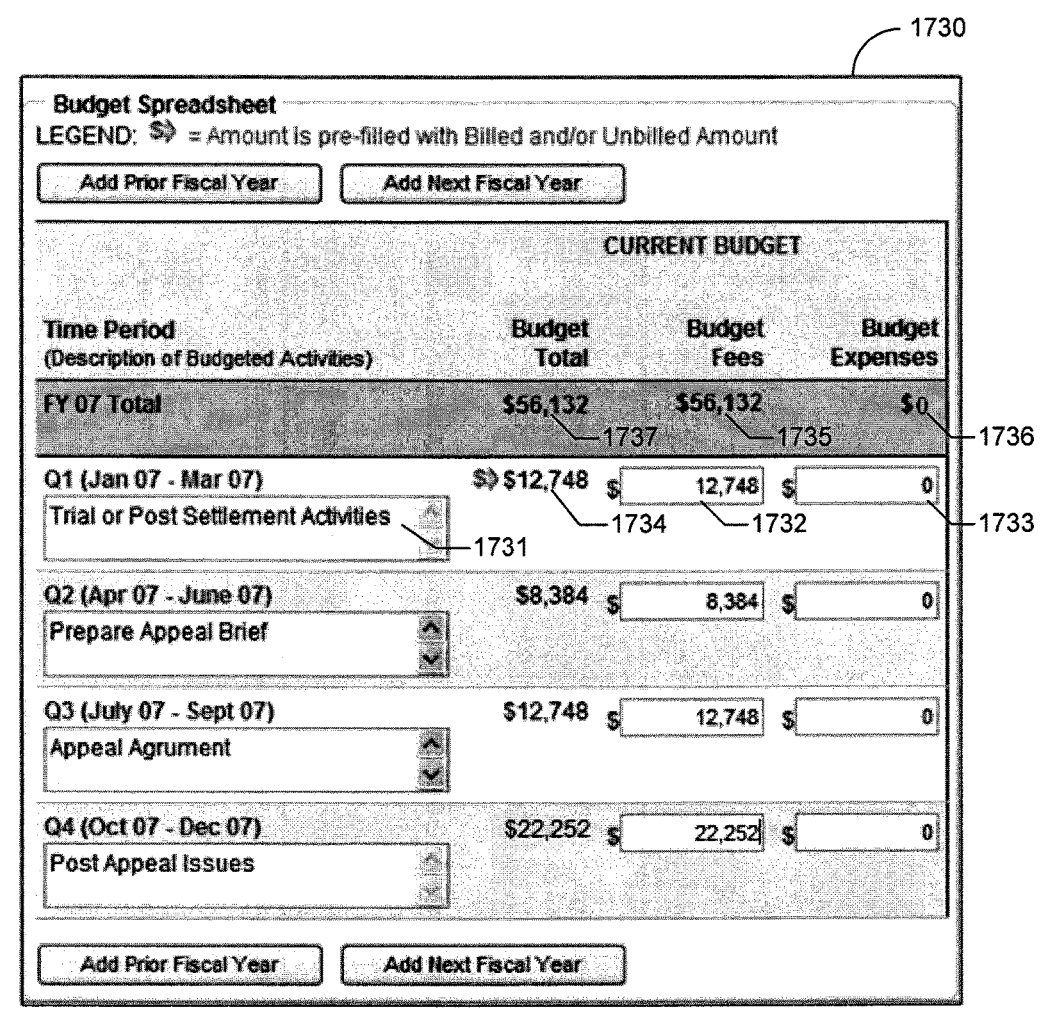

The budget entry form 1730 in FIG. 17D is an example of a quarterly budget form, which includes a field 1732 into which the user enters a budget fees amount and a field 1733 into which the user enters a budget expenses amount for each quarter in the fiscal year, as well as a field 1731 into which the user can enter a comment for each quarter. The facility displays a budget total 1734 for each quarter, which is the sum of the amounts entered by the user in fields 1732 and 1733. The facility displays the total budget fees amount 1735, budget expenses amount 1736, and budget amount 1737 for the fiscal year.

Figure 17E:
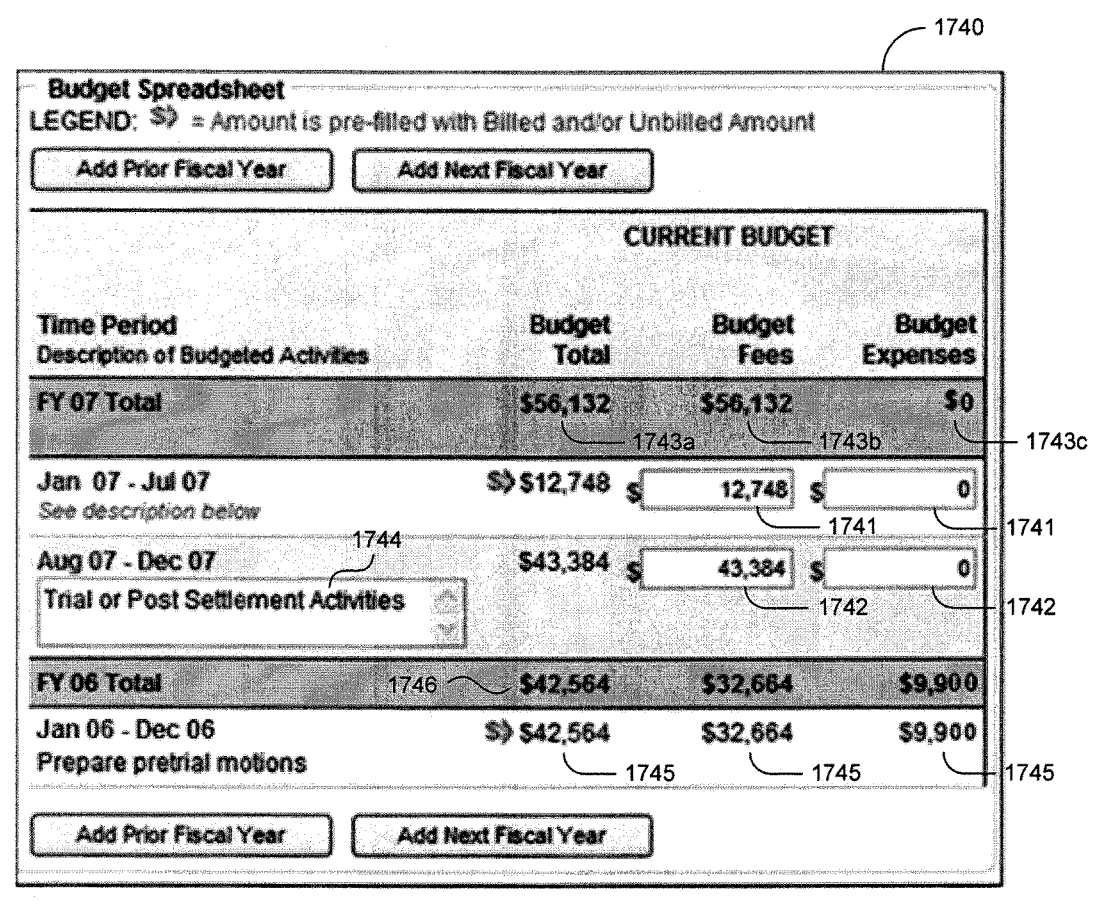

The budget entry form 1740 in FIG. 17E is an example of an annual budget form. In the embodiments shown in FIG. 17E, the form includes fields 1741 into which the user enters the amounts through the month to date, and fields 1742 into which the user enters amounts for the remaining months. The facility also displays the total budget amount 1743*a*, budget fees amount 1743*b*, and budget expenses amount 1743*c* for the fiscal year. In some embodiments, the annual form only includes an amount for the total year. The facility provides a field 1744 into which a single comment or description of activities can be entered for each year. For prior fiscal years, only a single amount 1745 is shown for the year (as is the case for a future fiscal year, which is not shown in FIG. 17E).

Figure 17F:
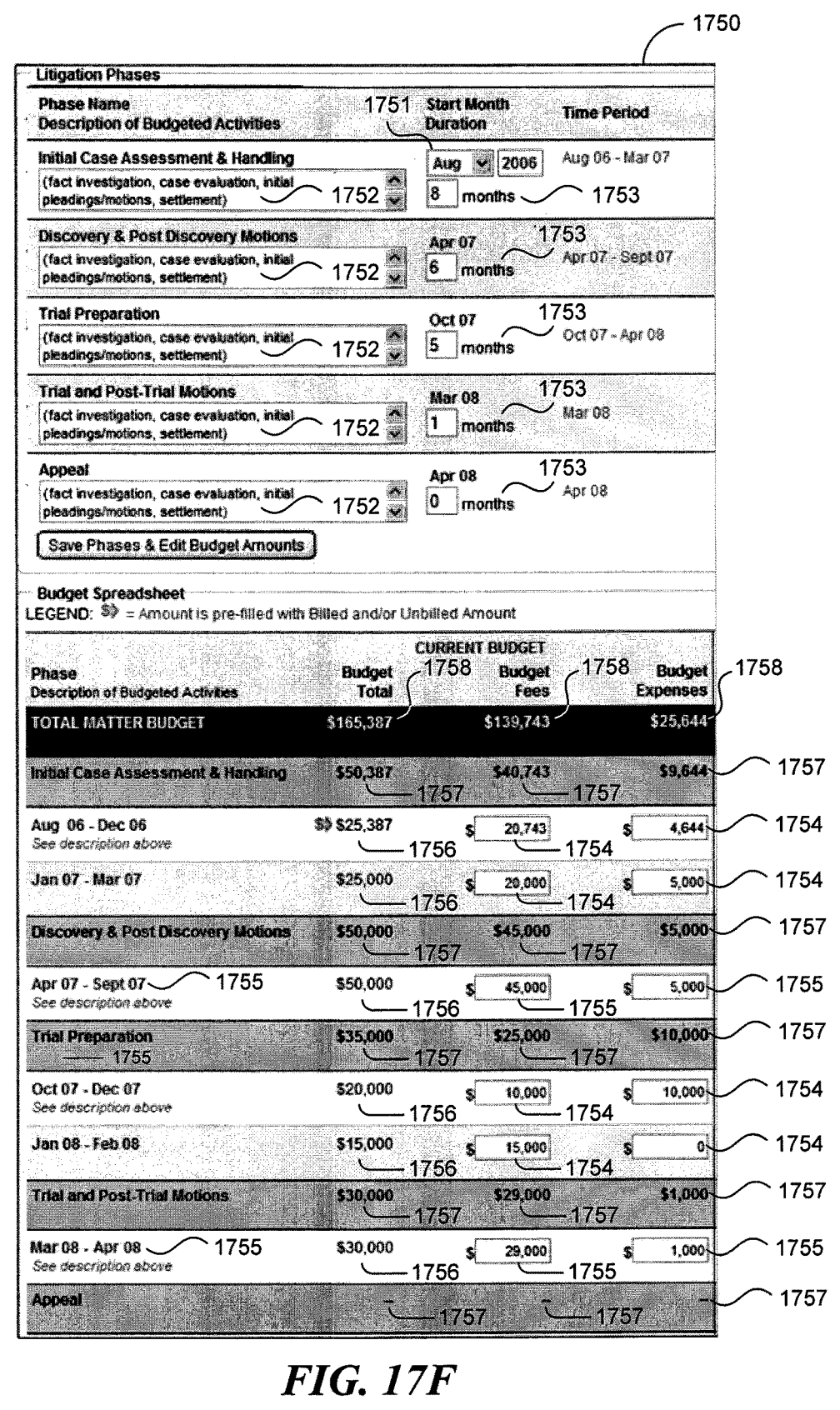

The budget entry form 1750 in FIG. 17F is an example of a phased budget form, into which a user can enter a budget amount for each phase of a matter. The facility provides a control 1751 that allows a user to specify the start month for the first phase. In the embodiments shown in FIG. 17F, the number and title of the phases are fixed, but in other embodiments the number and titles of the phases are editable. The form provides fields 1752 that allow the user to specify the activities in each phase, as well as fields 1753 that allow the user to specify the duration of each phase. The fields for entering the amounts for each phase can vary depending on their timing with respect to the company's fiscal year. If the phase spans fiscal years, the facility includes data entry fields 1754 for each fiscal year. If the phase is all within the same fiscal year, the facility includes data entry fields 1755 only for that fiscal year. The facility automatically sums and displays the total 1756 of each data entry phase. The facility shows totals 1757 for each phase, as well as totals 1758 for the entire matter.

In some embodiments, all of the examples shown in FIGS. 17C-F are augmented with an additional display of "analysis" information. For example, FIG. 17G shows the annual budget form 1760 with an analysis section 1761 shown to the right of the budget entry form. The facility provides a control 1762 that enables the user to select to view various budget and spending information, such as the Prior Budget amount 1763 minus the Billed+Unbilled amount 1764 to view the variance 1765 against the prior budget. Alternative views include (i) the current budget (as entered in the budget form) minus the Billed+Unbilled to view the variance against the existing data as entered, (ii) the Departmental Budget minus the Billed+Unbilled to view the variance against the original budget for the year, or (iii) the Departmental Budget minus the current budget (as entered in the budget form) to view the variance of the current budget against the original budget for the year.

Figure 18A:
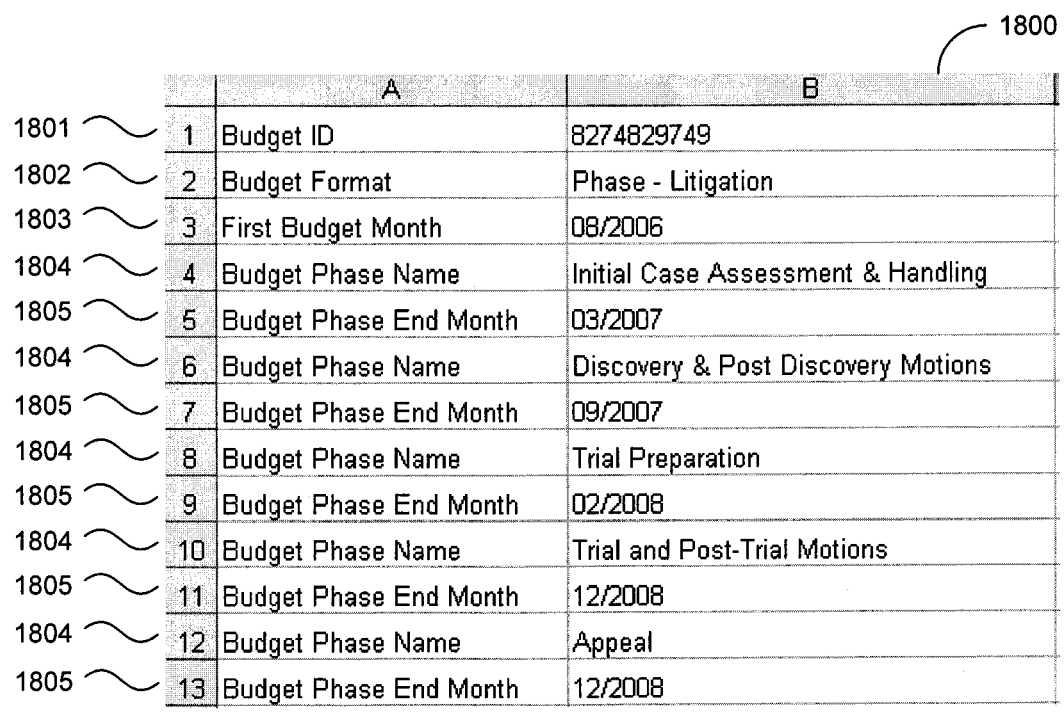
FIGS. 18A and 18B are sample table diagrams showing how the facility defines budget periods and stores monthly budget amounts.
Figure 18B:
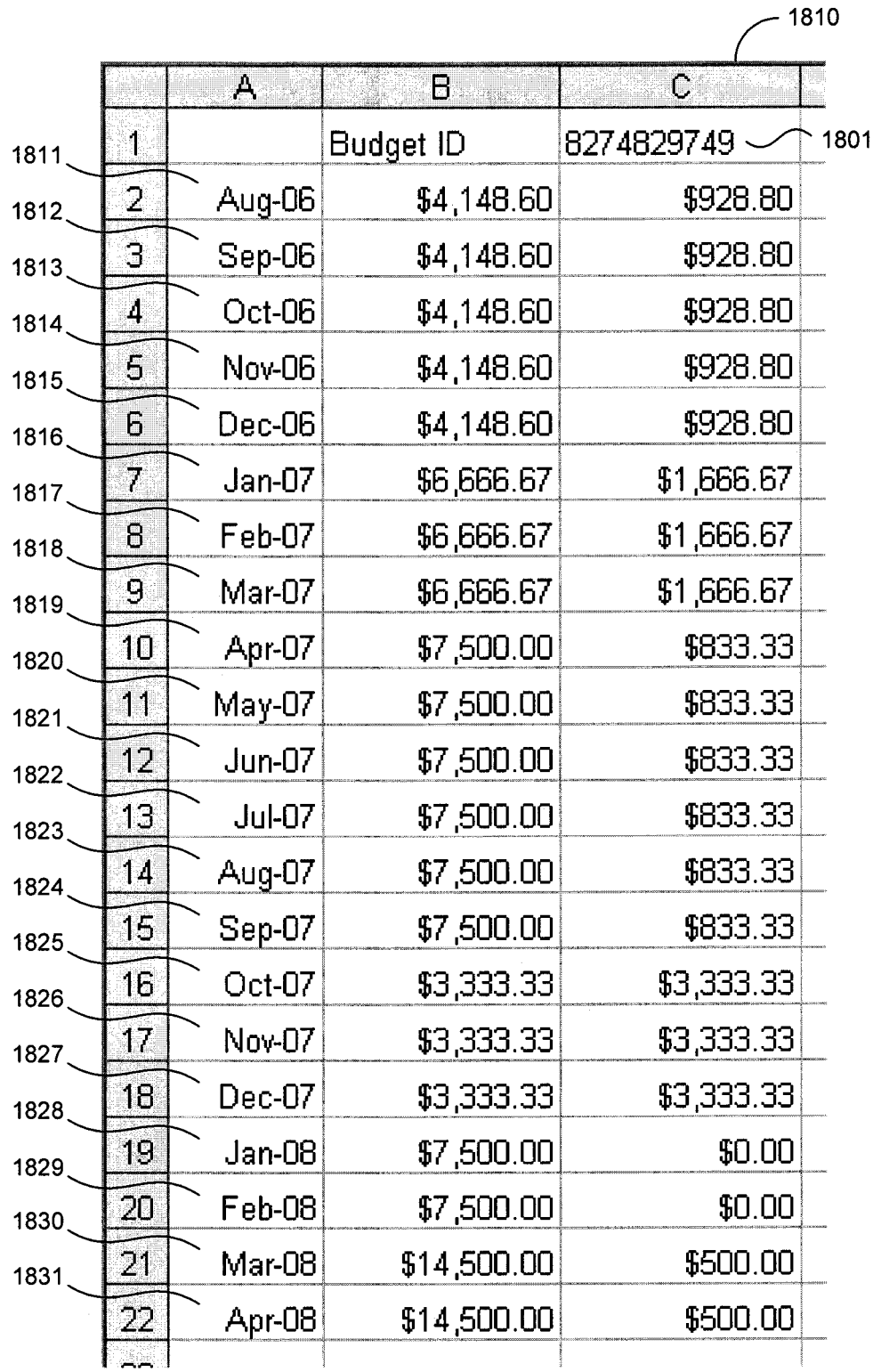

FIGS. 18A and 18B are sample table diagrams showing how the facility defines budget periods and stores monthly budget amounts. Table 1800 in FIG. 18A contains a Budget ID cell 1801, a budget format cell 1802 (which could be monthly, quarterly, annual, a phased budget, or any other format used by the facility), and a cell 1803 for the first budget month. If the budget format is a type that has budget phases or periods, then the facility fills out the rest of the table with a succession of cells 1804 indicating the phase names followed by cells 1805 indicating the end months of the phases for every phase or budget period for the budget.

Table 1810 in FIG. 18B contains a cell 1801 for the Budget ID so that the data can be linked to Table 1800. Each successive row 1811-1831 then contains the fees and expenses for each month in the budget, starting with the first budget month (e.g., 1751 in FIG. 17F). Regardless of the budget format, the data is stored in a monthly format (the method for determining the amount for each month is described in FIG. 19). For any budget format other than a monthly format, when the budget data is displayed to an end user in an edit form or in read mode on a web page, the facility sums up the months for the applicable phase or period, to generate the budget amounts for the period. For example, the total budget for the Initial Case Assessment & Handling Phase in FIG. 17F is $50,387 (1757 in FIG. 17F). This amount is obtained by adding the monthly budget data applicable to that phase in rows 1811-1818 (the first number for each row is the amount of budgeted fees, and the second number in each row is the budgeted expenses). In addition, if the phase covers more that one fiscal year, the facility calculates the subtotal of a phase for each fiscal year (1756 in FIG. 17F) by summing up the applicable rows. In FIG. 17F, the Initial Case Assessment & Handling Phase budget for fiscal year 2006 is $25,387, obtained by summing up rows 1811-1815. While FIGS. 18A and 18B demonstrate one possible method for storing budget data, those skilled in the art will recognize that there could be alternative data and table structures for the storing of budget data necessary to render the different budget formats.

Figure 19:
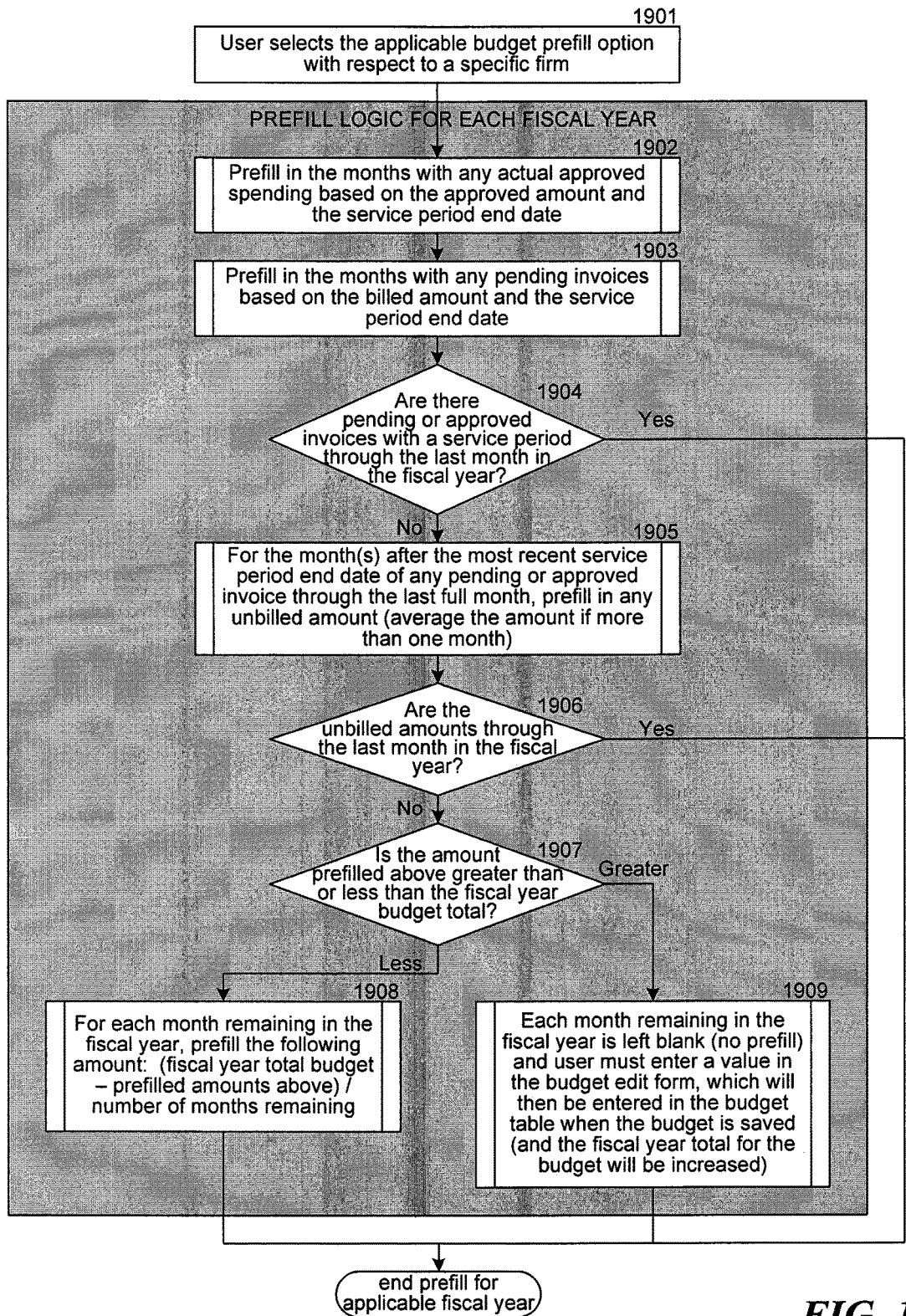
FIG. 19 is a flow diagram showing steps typically performed by the facility to determine monthly budget amounts.

FIG. 19 is a flow diagram showing typical steps performed by the facility to prefill spending data and to store budget data in the monthly budget tables in FIG. 18B. In particular, FIG. 19 shows an example of the steps followed to prefill budget data in monthly amounts for a user that is filling out an annual budget form such as in FIG. 17E. If at a block 1901 a user selects to use the prefill options as illustrated in FIG. 17A, for each fiscal year, at a block 1902 the facility first fills in months with any actual approved spending based on the approved amount of the invoices and the service period end date of the invoices. Next, at a block 1903 the facility fills in months with any pending invoices using the billed amount of the invoices and the service period end date of the invoices. Next, at a decision block 1904 if the firm has entered unbilled amounts into the facility covering a service period after the last posted invoice, at a block 1905 the facility fills in months with the unbilled amounts (and if the period for the unbilled time is greater than one month, then the facility will enter an straight-line average for each month). Finally, with respect to the remaining months for the fiscal year, as determined at a decision block 1906, if at a decision block 1907 the amounts that have already been entered are less than the fiscal year total, at a block 1908 the facility will take the total fiscal year budget less amounts that have already been entered, and fill in the remaining months with a straight-line average for each month. On the other hand, if at block 1907 the amounts that have already been entered exceed the prior budget version fiscal year total, then at a block 1909 the facility omits to prefill the remaining months, and the user must enter a value in the budget edit form to save the budget (the amount for each month in the budget table will be calculated from a straight-line average over the number of months remaining in the fiscal year, and the fiscal year total budget amount will have been increased). This analysis is performed for each fiscal year of the budget. If the service period for approved or pending invoices is through the end of the fiscal year, the prefill process stops at that point regardless of whether at block 1904 the facility determined that there were any unbilled amounts entered.

The following example relating to FIG. 17E illustrates the steps described in FIG. 19 when a user is editing an annual budget in August. For example, assume that the firm had submitted invoices, and the company had approved such invoices, in the amount of $3,500 for the months of January-November 2006, and that the firm had submitted an invoice for $564 for December 2006 (which is still pending), and that it had also submitted unbilled time in the amount of $3,500 for December for 2006. The facility prefills budget months of January-November 2006 with $3,500 each, and the facility prefills budget month for December 2006 with $564, for a total budget prefilled for fiscal year 2006 of $42,564 (1746 of FIG. 17E). With respect to Fiscal Year 2007, assume that the firm had submitted invoices, and the company had approved such invoices, in the amount of $1,000 for the months of January-April 2007, and that the firm had submitted an invoice for $5,748 for May 2007 (which is still pending), and that it had also submitted unbilled time in the amount of $3,000. The facility prefills budget months of January-April 2007 with $1,000 each, the budget month for May 2007 with $5,748, the budget months of June and July 2007 with $1,500 each (which is the straight-line average of $3,000 split over two months), and the budget months of August-December 2007 with $8676.80 each (which is the straight-line average of $43,384 split over five months; $43,384 is the budget amounts remaining for the fiscal year after subtracting the budget amounts for months January-July 2007), for a total budget prefilled for fiscal year 2007 of $56,132 (1743a of FIG. 17E). The foregoing describes how the budget edit page was prefilled based on the user's selection from the budget prefill option page in FIG. 17A. However, if the user changes one of the prefilled edit values and then saves the budget form, the facility ignores the prefill options for the value that has been edited, and calculates monthly budget amounts for the budget table using straight-line averages.

Those skilled in the art will recognize that there may be a variety of prefill steps that a facility could use with respect to approved invoice amounts, pending invoice amounts, and unbilled amounts. For example, if a company has set up a matter such that a single accrual is stored for all firms in a matter, then the facility applies a different formula. The facility uses such a formula to generate a sum of all approved and pending invoices and the unbilled amounts and store in the budget table the straight-line average for each month. For example, assume that a user is editing a budget form in August 2007 and the approved invoices for the 2007 fiscal year are $20,000, the pending invoices are $15,000, and the unbilled amounts are $10,000 for all firms in the matter. The facility prefills the budget months of January-August 2007 with $6,428.57. The facility prefills the remaining months for the fiscal year are filled with the straight-line average amount of the total fiscal year budget minus $45,000 spread over five months. The facility uses this formula, which is less accurate than the prior formula, because the approved and pending invoices for the different firms may have different service periods, making it impossible to know for which months the unbilled amounts should be applied.

Figure 20A:
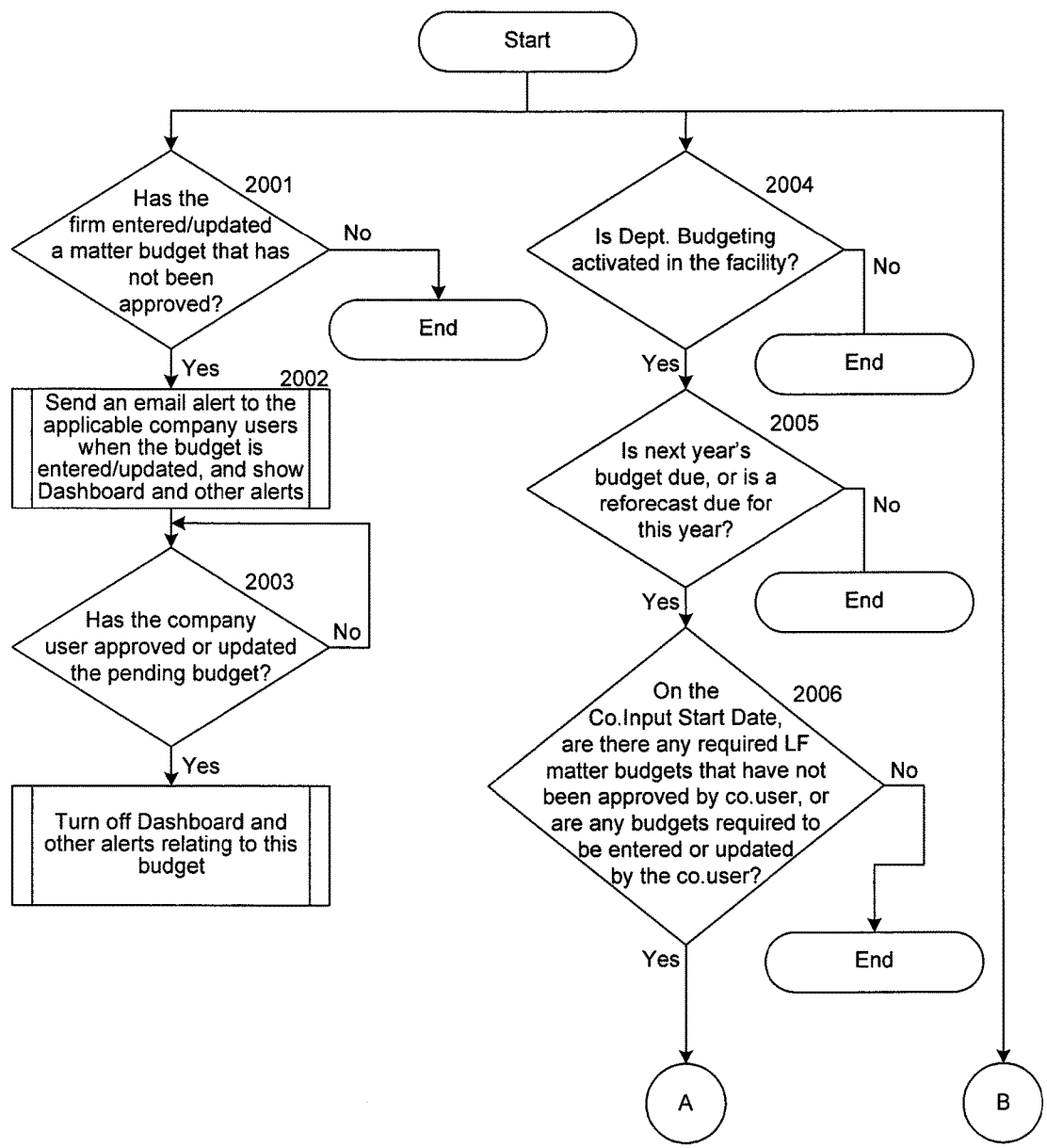
FIGS. 20A-20C are a flow diagram showing steps typically performed by the facility to determine whether the facility shows dashboard alerts, sends email alerts, and displays matters on a "Company Financial Review Page" (i.e., a page that allows a company user to review and approve all pending financial data other than invoices).
Figure 20B:
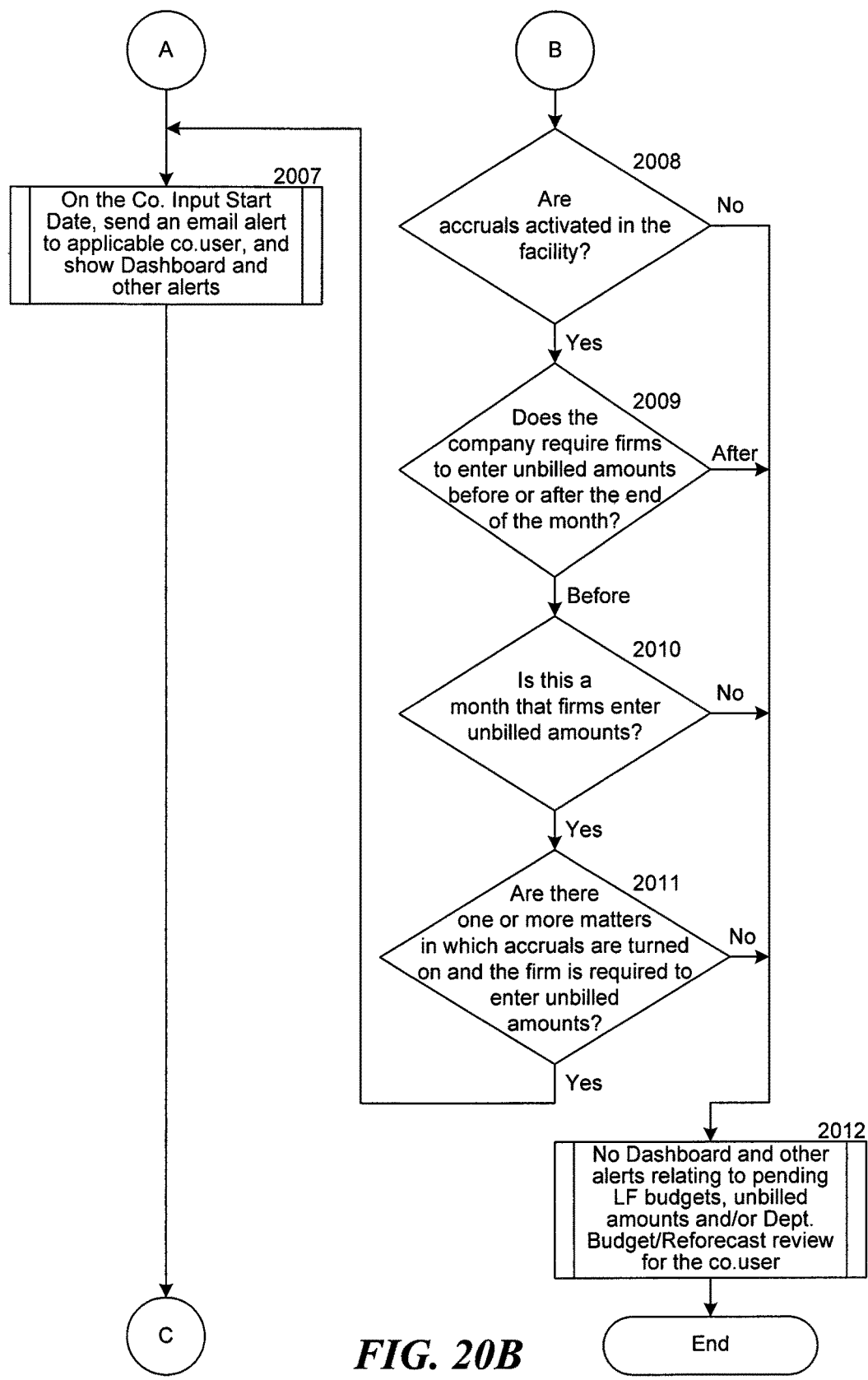
Figure 20C:
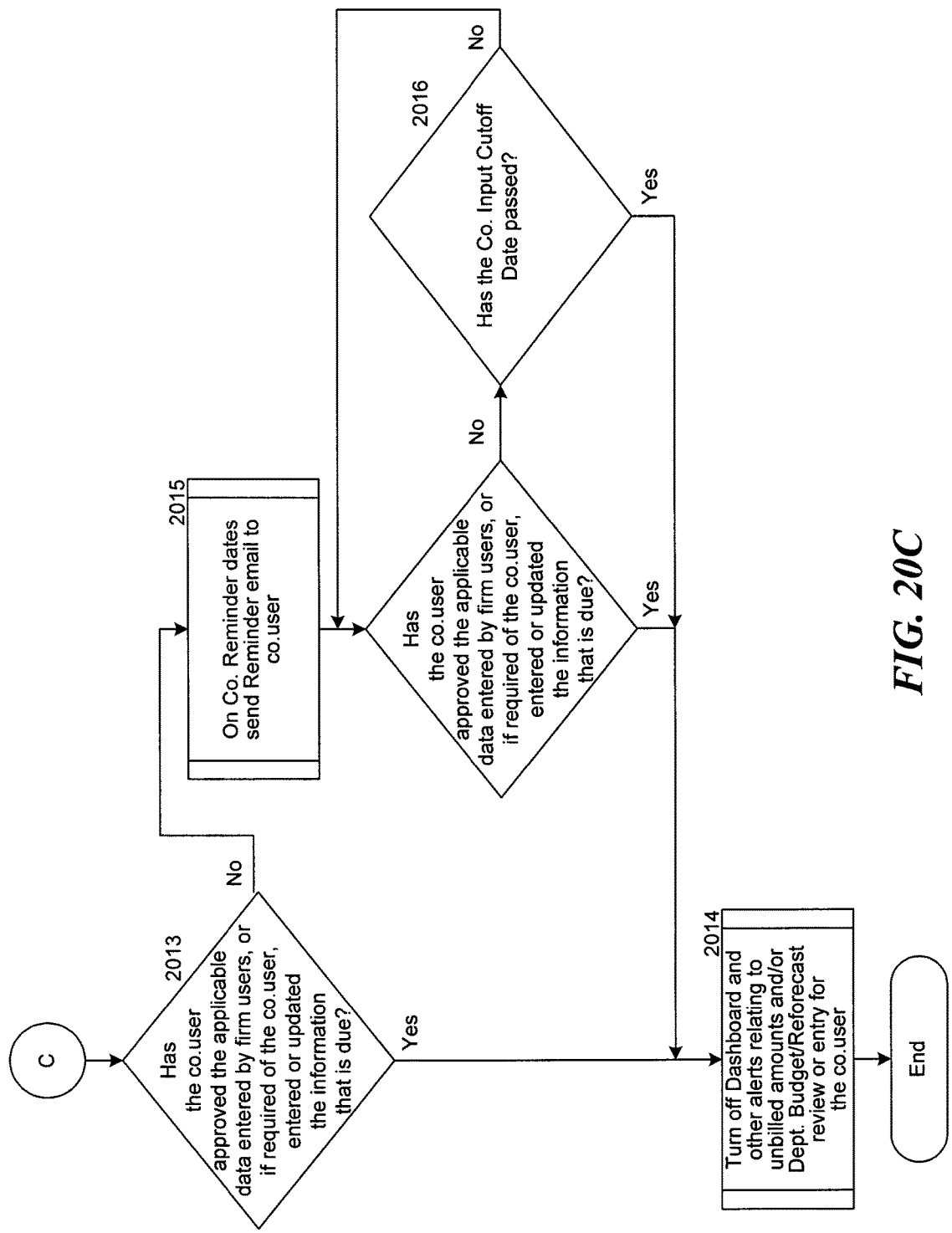

FIGS. 20A-20C are a flow diagram showing steps typically performed by the facility to determine whether the facility shows dashboard alerts, sends email alerts, and displays matters on a "Company Financial Review Page" (i.e., a page that allows a company user to review and approve all pending financial data other than invoices). Beginning with FIG. 20A, the default rule is that if at a decision block 2001 a law firm has entered or updated a matter budget, at a block 2002 the facility sends an email to the applicable company user(s) and shows dashboard alerts. Even if the budget is also used as the Departmental Budget or Reforecast, the facility continues to display the dashboard alerts until at a decision block 2003 the company user has approved or updated the budget. However, in addition to these budget alerts, if at a decision block 2004 the Departmental Budgeting module has been activated, if at a decision block 2005 a Departmental Budget or Reforecast is due, and if at a decision block 2006 the company has not entered or updated a required budget or if a law firm has entered or updated a budget but the company has not approved or if the company is responsible for the budget on any particular matter, then on the Co. Input Start Date, at a block 2007 in FIG. 20B the facility sends an email alert to the company user and shows dashboard and other alerts. The facility performs the same analysis with respect to unbilled amounts. If at a decision block 2008 the accruals module is activated, if at a decision block 2009 the company requires firms to enter unbilled amounts before the end of the month (which will require review), if at a decision block 2010 this is a month in which the firms enter unbilled amounts, and if at a decision block 2011 there are one or more matters in which accruals are turned on and the firm is required to enter unbilled amounts, then on the Co. Input Start Date, at block 2007 the facility sends an email alert to the company user and shows dashboard and other alerts. If the Departmental Budgeting/Reforecasting or accruals requirements are not satisfied, then at a block 2012 the facility sends no dashboard alerts or emails (except, however, if the alert relates to a budget entered or updated by the firm, in which case the facility continues to display the alert until approved or updated by the company user). Turning to FIG. 20C, once the company user enters or approves the applicable data at a decision block 2013, then at a block 2014 the facility turns off the dashboard alerts. If the company user has not entered or updated the applicable data by the Co. Reminder Date, then at a block 2015 the facility sends a reminder email to the company user. If at a decision block 2016 the company user has not entered or updated the applicable data by the Co. Input Cutoff Date, then at block 2014 the facility turns off the dashboard alerts, except, however, if the alert relates to a budget entered or updated by the firm, in which case the facility continues to display the alert until approved or updated by the company user.

Figure 21:
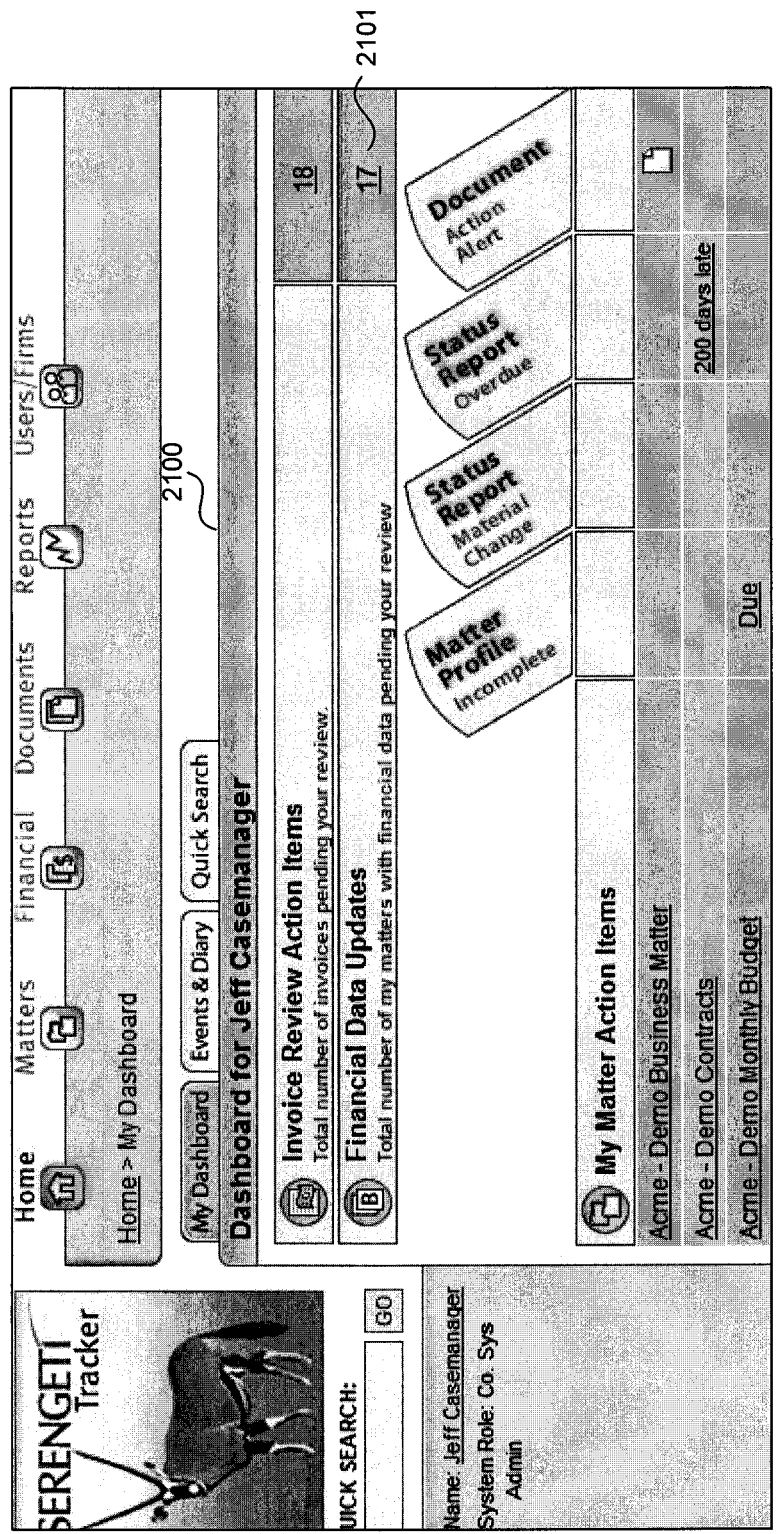
FIG. 21 is a display diagram showing how the facility alerts company users if a Departmental Budget or Reforecast is due, or review of a law firm budget is required in some embodiments.

FIG. 21 is a typical user interface presented by the facility to alert company users if a Departmental Budget or Reforecast is due, review of a law firm budget is required, or review of unbilled amounts is required. If a company user is responsible for the financial data in a matter (see option 213 in FIG. 2A), and if a law firm has a pending matter budget, or if the company is required to review or update any departmental budget or reforecast, then the user's dashboard 2100 displays an alert 2101 indicating the number of matters for which one of these financial data updates is required.

Figure 22A:
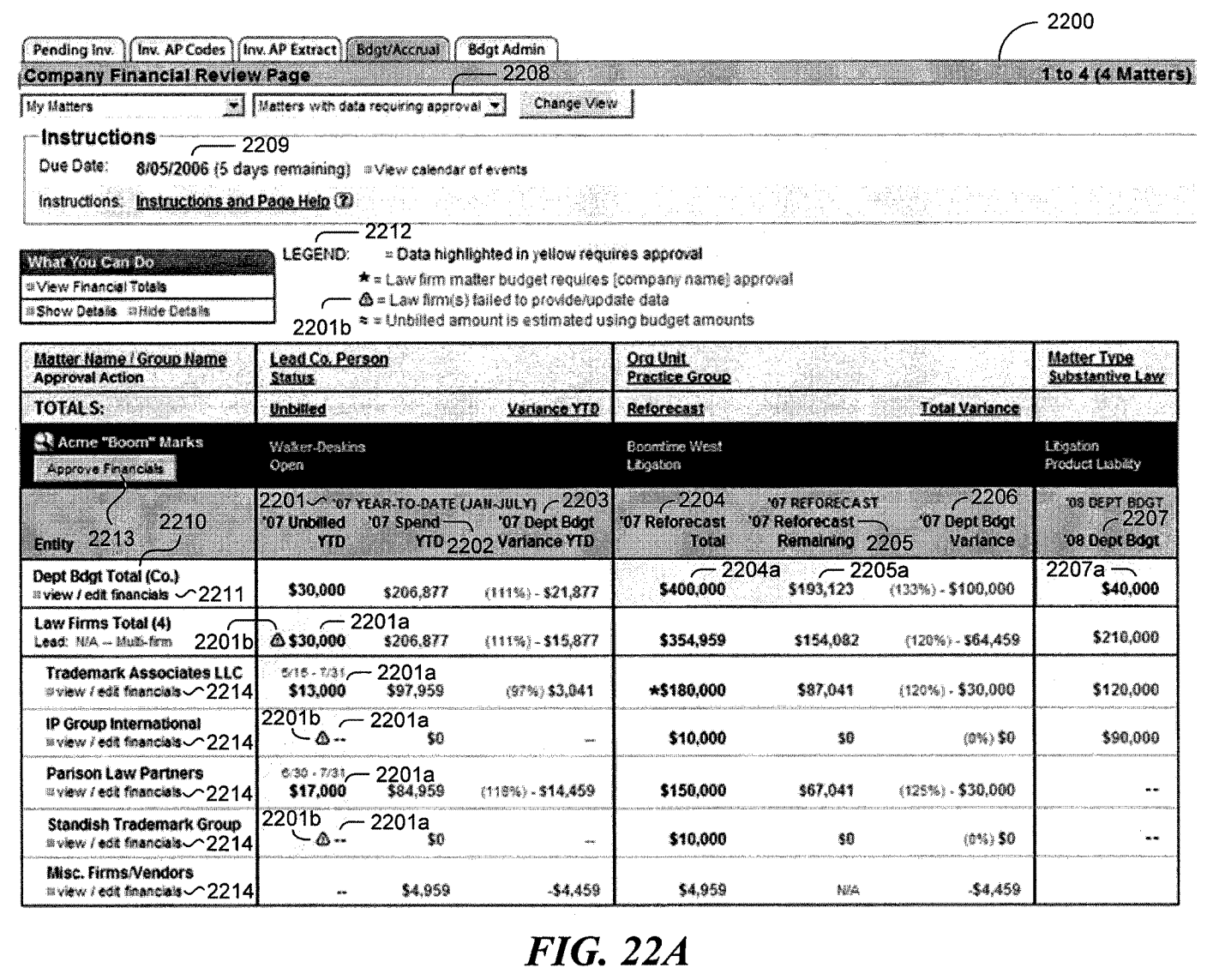

FIGS. 22A and 22B are typical user interfaces presented by the facility to enable a company user to review and approve all pending financial data with a single click, or edit any such amounts. Web page 2200 (called the Company Financial Review Page) is a financial data review page displayed to a company user, which shows financial data relating to the fiscal year-to-date, including unbilled amount 2201, spending amount 2202, and budget variance 2203. The facility also displays financial data relating to reforecasts of spending for the fiscal year, including a reforecast amount 2204 for the entire fiscal year, budget amount 2205 remaining for the fiscal year, and variance 2206 from the original budget for the fiscal year. In addition, the facility displays next year's budget amount 2207. The facility provides a control 2208 to enable users to configure the web page to view only those matters with pending financial data or to view all matters. Although FIG. 22A shows an example of only one matter, the web page shows as many matters as have been selected by the user. If there is a due date for the review and approval of certain data, the facility displays that due date 2209 on the page. For each matter, a row 2210 contains data for the original Departmental Budget for the fiscal year. In the example shown in FIG. 22A, the Departmental Budget is derived from a budget entered by the company, and is editable as a separate budget by selecting action 2211. Matters may be set up in such a way that the Departmental Budget is specified to be the law firm budget, in which case the facility displays a different indication for the Departmental Budget (in this example, ("LF") rather than ("Co.")). The Legend 2212 for the web page shows which of the data on the page requires review and approval or updating. For example, if unbilled amounts that have been entered by firms are required to be reviewed and approved (option 246 in FIG. 2C), unbilled cells 2201a for the applicable firms are highlighted in yellow. If the firm failed to provide an unbilled amount, it is indicated by an alert 2201b, and the company user must enter an amount before being able to approve the matter. If a Reforecast is due for the current fiscal year, reforecast cells 2204a and 2205a for the applicable matter are highlighted in yellow. If next year's Departmental Budget is due, a cell 2207a for the applicable matter is highlighted in yellow.

If all of the data is correct or acceptable, the user can click an "Approve Financials" button 2213 to approve all the data for that matter with one click. (See FIG. 23 for the algorithm used by the facility to determine whether to allow one click approval of the data for a matter). If one click approval is not required, or if the user wants to edit data, the user can click a "view/edit financials" action (2211 or 2214) for the applicable row, which opens a dialog window, such as window 1210 shown in FIG. 12B. This page enables the company user to enter or edit the unbilled amounts. Turning to FIG. 22B, if the user clicks a tab 2251 to edit the budget amounts, the facility presents the user with a budget edit page 2250 (or a budget prefill options page such as that depicted in FIG. 18A if the data meets the test to show the prefill options page). This budget page enables the user to update the current budget. If the applicable budget being edited is also the Reforecast budget for the current fiscal year and next year's Departmental Budget, this budget edit form also updates those amounts. In some situations, the web page may only show current and prior fiscal years, in which case the user can click a button 2252 to Add Next Fiscal Year. If the user edits a row (such as by selecting action 2214 in FIG. 22A), the data for the row will be marked as approved with a green checkmark.

FIG. 23 is a flow diagram showing steps typically performed by the facility to determine whether financial amounts for a matter can be approved by company users with one click. When a company user clicks the "Approve Financials" button for a matter at a block 2301, the system checks the data for the matter to make sure there is no incomplete data and that the data can be marked as approved. The facility verifies at a decision block 2302 that a Departmental Budget or Reforecast is not due for the current fiscal year, verifies at a decision block 2303 that a Departmental Budget is not due for the next fiscal year, verifies at a decision block 2304 that there are not any unbilled amounts due from firms, and verifies at a decision block 2305 that the billed plus the unbilled amount is not greater than the budget to date through the current budget period for any budget in the matter. If any of these conditions is not satisfied, the facility either displays an error message that explains what data is incomplete at a block 2306, or shows the budget prefill options page (for editing the budget) with a message that the billed plus unbilled amount is greater than the budget for the applicable period at a block 2307. If all of the conditions 2302-2305 are satisfied, then at a block 2308 the facility marks all budgets and unbilled amounts for the matter as approved. Those skilled in the art will recognize that there may be other data verifications that the facility may complete before allowing a one-click approval.

FIG. 24 is a typical user interface presented by the facility to enable a company user to configure the facility to send accrual data to its finance department with each invoice, to allow the finance department to verify that the accrual balances maintained by the finance department match the accrual balances in the facility. The format of the data that is delivered to AP is configured in a web page 2400. In the embodiment displayed in FIG. 24, the data is sent in the form of a text file (called the "AP Extract"), but other data formats could be used. In column 2401, the facility provides a series of controls that enable the user to select the columns of data to be included in the text file. The data options include the Accrual Period End Date 2402, the Accrual Period Law Firm 2403, the Accrual Period Ending Balance 2404, the Remaining Accrual Balance Prior to the AP Extract 2405, and the Remaining Accrual Balance After the AP Extract 2406. With this data, a person in the company's finance department can associate the spending of an invoice with a recorded accrual, and make sure that the invoice has not exceeded the accrual. For example, the Accrual Period End Date is the end date of the accrual period that is applicable to this invoice. The Accrual Period Law Firm is the accrual against which the invoice is applied (if a matter has been setup so that there are generic accruals applicable to multiple firms, the "law firm" would be identified as the applicable generic accrual). The Accrual Period Ending Balance is the original accrual amount from the applicable accrual. The Remaining Accrual Balance Prior to the AP Extract can be used to verify the current accrual balance maintained by the finance department for the applicable accrual. The Remaining Accrual Balance After the AP Extract can be used to verify that accrual balance after payment of the invoices in the AP extract matches the accrual balance by the finance department.

FIG. 25 is a table diagram showing a sample file to be sent by the facility to a company's accounts payable department with approved invoice data and the related accrual data. The file contains columns 2501 with various invoice data, plus the Accrual Period End Date in column 2502, the Accrual Period Law Firm in column 2503, the Accrual Period Ending Balance in column 2504, the Remaining Accrual Balance Prior to the AP Extract in column 2505, and the Remaining Accrual Balance After the AP Extract in column 2506. The Accrual Period Law Firms shown in column 2503 are actual firms, but the firm shown could have been "All firms" if the accrual was for all firms in the matter, or some other generic identifier for groups of firms. If the invoice spending amount 2507 exceeds the Remaining Accrual Balance Prior to the AP Extract amount 2508, then the Remaining Accrual Balance After AP Extract amount 2509 will be a negative number.

Figure 26A:
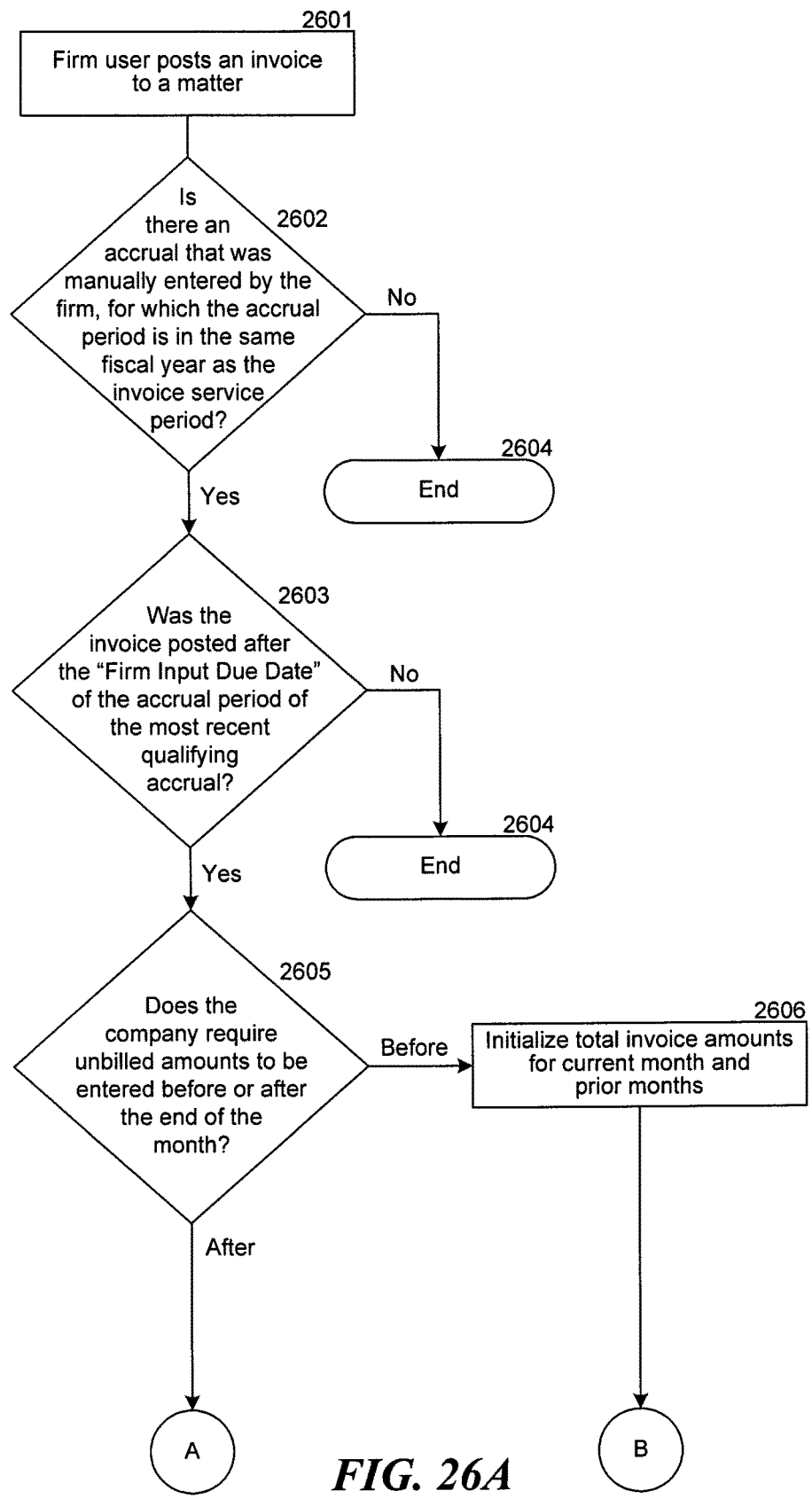
FIGS. 26A and 26B are a flow diagram showing steps typically performed by the facility to determine whether to show an invoice alert because the invoice amount exceeds the unbilled amounts in the applicable accrual.
Figure 26B:
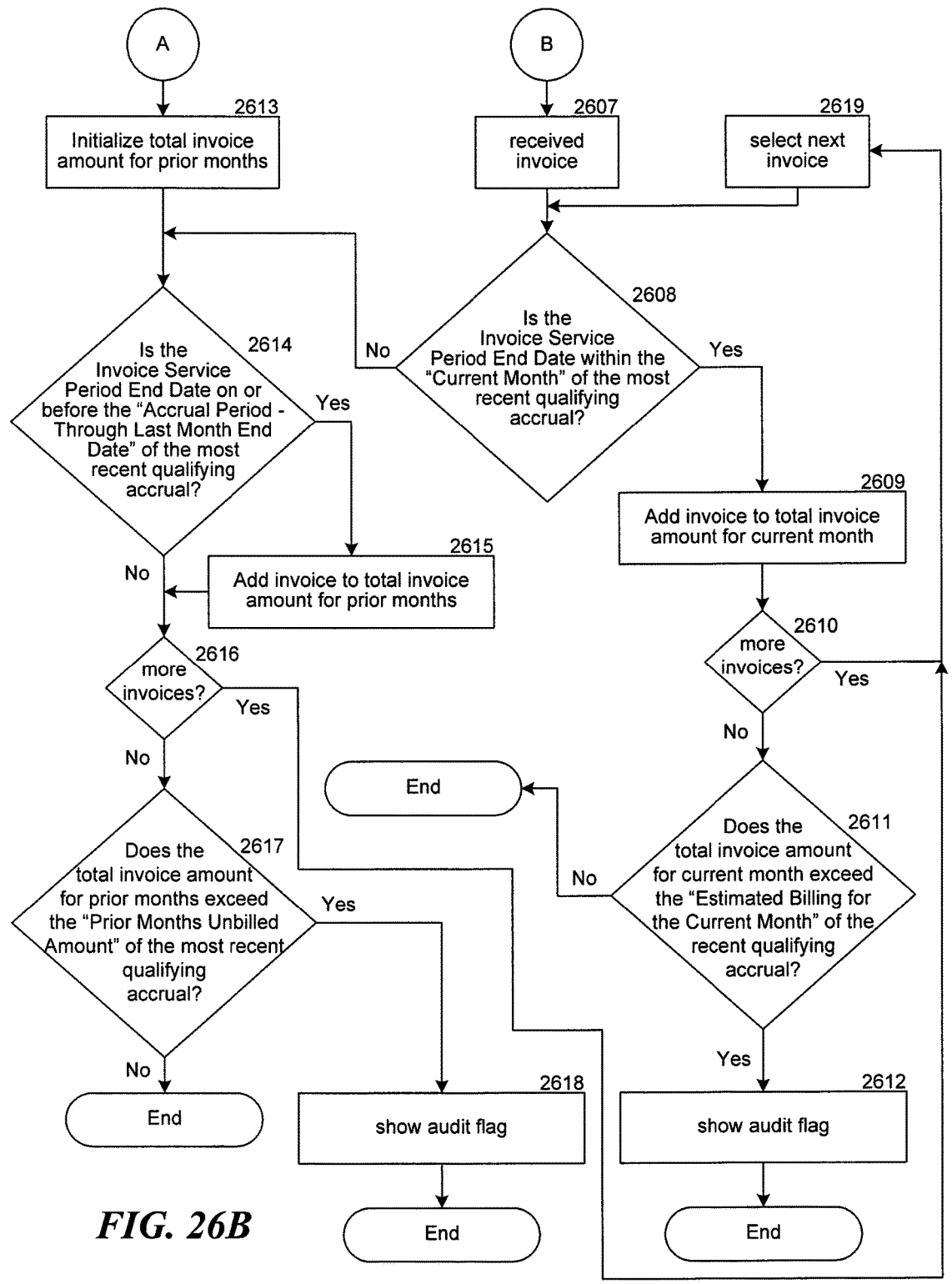

FIGS. 26A and 26B are a flow diagram showing steps typically performed by the facility to determine whether to show an invoice alert because the invoice amount exceeds the unbilled amounts in the applicable accrual. Beginning with FIG. 26A, the process begins at a block 2601 when a firm user posts an invoice to a matter. If (A) at a decision block 2602 there was a prior accrual in which the firm had manually entered unbilled amounts to which the invoice applies and the accrual period of such accrual is in the same fiscal year as the service period end date of the invoice, and (B) at a decision block 2603 the invoice was posted after the due date for the firm to have manually entered the unbilled amounts for the applicable accrual, then the facility conducts one or possibly two audits on the invoice. If either condition (A) at block 2602 or condition (B) at block 2603 is not satisfied, then the facility does not display an audit flag. On the other hand, if both of the conditions are satisfied, and if at a decision block 2605 the company requires firms to enter unbilled amounts before the end of the accrual period, then the facility conducts a first audit on the invoice. At a block 2606 the facility initializes a total invoice amount for the current month and a total invoice amount for the prior months since the accrual. Turning to FIG. 26B, at a block 2607 the facility selects the received invoice, and at a decision block 2608 the facility determines whether the Invoice Service Period End Date is within the "Current Month" of the most recent qualifying accrual. If the Invoice Service Period End Date is within the "Current Month" of the most recent qualifying accrual, at a block 2609 the facility adds the invoice to the total invoice amount for the current month. At a decision block 2610 the facility determines whether there are any remaining invoices to audit. If there are other invoices to audit, at a block 2619 the facility selects the next invoice and continues to audit the remaining invoices. If no invoices remain at block 2610, the facility proceeds to a decision block 2611 where it determines whether the total invoice amount for the current month exceeds the "Estimated Billing for the Current Month." If the total invoice amount for the current month exceeds the "Estimated Billing for the Current Month," then at a block 2612 the facility displays an audit flag. Otherwise, the facility does not display an audit flag. If at block 2608 the Invoice Service Period End Date is not within the "Current Month" of the most recent qualifying accrual, or if at block 2605 (in FIG. 26A) the company requires firms to enter unbilled amounts after the end of the accrual period, the facility conducts a second audit on the invoice. If the company requires firms to enter unbilled amounts after the end of the accrual period, as determined at block 2605, at a block 2613 the facility initializes the total invoice amount for the prior months since the accrual. At a decision block 2614 the facility determines whether the Invoice Service Period End Date is on or before the "Accrual Period— Through Last Month End Date" of the most recent qualifying accrual. If it is, at a block 2615 the facility adds the invoice to the total invoice amount for the prior months since the accrual. Regardless of the determination made at block 2614, at a decision block 2616 the facility determines whether there are any remaining invoices to audit. If there are other invoices to audit, the facility proceeds to block 2619 to select the next invoice and continue to audit the remaining invoices. If no invoices remain at block 2616, the facility proceeds to a decision block 2617 where it determines whether the total invoice amount for the prior months since the accrual exceeds the "Prior Months Unbilled Amount." If the total invoice amount for the prior months since the accrual exceeds the "Prior Months Unbilled Amount," then at a block 2618 the facility displays an audit flag. Otherwise, the facility does not display an audit flag.

FIG. 27 is a display diagram of a typical user interface presented by the facility to alert the user that the invoice amount exceeds the accrual remaining balance. In the audit exceptions worksheet 2700 for an invoice, the facility displays an accrual alert 2701. The facility displays the end date 2702 of the applicable accrual period, as well as whether the unbilled amount is for the prior months 2703 or is the current month estimate (not shown). In this audit exceptions worksheet, the facility shows the original unbilled amount 2704 from the accrual, as well as the spending amount 2705 for the invoices that apply against the applicable unbilled amount. In various embodiments, the spending amount for the invoices that apply against the applicable unbilled amount is the amount of the invoice that generated the audit alert and/or the sum of the current invoice plus all other previously posted invoices that apply against this accrual. Note that the facility does not show the accrual period ending balance, because that is not the applicable amount, as it may include pending invoices that have not been sent to AP, which is not relevant to the firm's invoices that are now being posted. Thus, the audit flag shows only that portion of the accrual that relates to the invoices being posted—the unbilled amount. The facility also displays the variance 2706, or the amount by which the spending exceeds the accrual amount. The facility presents a control 2707 with a drop down selection for the user to specify how to address the situation. For example, the user can select an option to reduce the invoice so that the spending matches the unbilled amount, or the user can choose to ignore or manually adjust the invoice amount.

It will be appreciated by those skilled in the art that the above-described facility may be straightforwardly adapted or extended in various ways. For example, the facility may be used in combination with various electronic billing systems and other forms of intermediary services. While the foregoing description makes reference to particular embodiments, the scope of the invention is defined solely by the claims that follow and the elements recited therein.

We claim:

1. A method for providing a billing system, the method comprising:
   generating, by the billing system, a matter cross-reference table that provides a data structure configured to map one law firm-specific identifier with one client-specific identifier;
   storing, by the billing system, the matter cross-reference table in computer memory;
   permitting, by the billing system, at least one law firm to upload, to the billing system via a network communication link, an unbilled amount for each of one or more first matters for a client, the unbilled amount being a monetary amount of accrued expenses for which no invoice has been generated by the law firm, wherein the unbilled amount is generated in a law firm-specific billing system and is uploaded according to a law firm-specific identifier associated with the first matter;
   accessing, by the billing system for at least one uploaded unbilled amount, the matter cross-reference table to identify a client-specific identifier associated with one or more second matters corresponding to the law firm-specific identifier associated with the at least one uploaded unbilled amount;
   assigning, by the billing system, the at least one uploaded unbilled amount to the client-specific identifier associated with one or more second matters;
   receiving, by the billing system, a client request to view the at least one uploaded unbilled amount for the one or more second matters from among the one or more first matters via the network communication link, wherein the client is associated with the client-specific identifier;
   providing, by the billing system, the client the at least one uploaded unbilled amount for one or more second matters, wherein the at least one uploaded unbilled amount for each of the one or more second matters is provided according to the client-specific identifier associated with the second matter;
providing an iconic indication that at least one dollar value corresponding to at least one unbilled amount relates to at least one matter for which incomplete information has been received from the law firm; and
providing a user interface control with respect to which the client can perform a single interaction to approve the unbilled amounts for a plurality of matters.

2. The method of claim 1, wherein the matter cross-reference table maps multiple law firm-specific identifiers to a single client-specific identifier.

3. The method of claim 1, further comprising aggregating the at least one uploaded unbilled amount to generate a total unbilled amount.

4. The method of claim 1, wherein multiple law firms upload unbilled amounts and the uploaded unbilled amounts from the multiple law firms are aggregated to generate a total unbilled amount.

5. The method of claim 1, wherein a first law firm user uploads unbilled amounts generated by the law firm-specific billing system,
and wherein a second law firm user uploads unbilled amounts that are not generated by the law firm-specific billing system.

6. The method of claim 1, wherein the client has an accounts payable department that receives law firm invoices, the method further comprising:
receiving for the client from a first law firm invoices for one or more distinguished matters;
omitting to send the invoices to the client's accounts payable department; and
determining an accrual amount by summing at least one uploaded unbilled amount and the amounts of the invoices.

7. The method of claim 6, further comprising:
soliciting from the client input specifying either that (1) unbilled amounts are to be received from the first law firm before an end of an accrual period or that (2) unbilled amounts are to be received from the first law firm after the end of the accrual period;
receiving from the client the solicited input;
in response to receiving from the client input specifying that unbilled amounts are to be received from the first law firm before the end of the accrual period:
receiving from the first law firm unbilled amounts for prior months and an estimate of unbilled amounts for a current month,
determining an unbilled amounts total by summing the unbilled amounts for prior months and the estimate of unbilled amounts for the current month, and
determining the accrual amount by summing the unbilled amounts total and the amounts of the invoices; and
in response to receiving from the client input specifying that unbilled amounts are to be received from the first law firm after the end of the accrual period:
receiving from the first law firm unbilled amounts for prior months, and
determining the accrual amount by summing the unbilled amounts for prior months and the amounts of the invoices.

8. The method of claim 7, further comprising, in response to receiving from the client input specifying that unbilled amounts are to be received from the first law firm before the end of the accrual period:
receiving an indication of whether the estimate of unbilled amounts for the current month is (1) an estimate for an entirety of the current month or (2) an estimate for a portion of the current month;
in response to receiving an indication that the estimate of unbilled amounts for the current month is an estimate for the entirety of the current month:
determining the unbilled amounts total by summing the unbilled amounts for prior months and the estimate of unbilled amounts for the entirety of the current month; and
in response to receiving an indication that the estimate of unbilled amounts for the current month is an estimate for a portion of the current month:
determining an estimate of unbilled amounts for the entirety of the current month by prorating the estimate for the portion of the current month, and
determining the unbilled amounts total by summing the unbilled amounts for prior months and the estimate of unbilled amounts for the entirety of the current month.

9. The method of claim 8, wherein the indication is received from the client.

10. The method of claim 8, wherein the indication is received from the first law firm.

11. The method of claim 8, wherein the unbilled amounts total further includes (1) invoices that have been uploaded by the first law firm but have not been delivered to the client and (2) any other withheld amounts.

12. The method of claim 6, further comprising:
soliciting from the client input specifying either that (1) unbilled amounts are to be received from the first law firm before an end of an accrual period or that (2) unbilled amounts are to be received from the first law firm after the end of the accrual period;
receiving from the client the solicited input;
responsive to receiving from the client input specifying that unbilled amounts are to be received from the first law firm before the end of the accrual period:
receiving from the first law firm an estimate of unbilled amounts for a current month,
determining the accrual amount by summing the estimate of unbilled amounts for the current month and the amounts of the invoices; and
responsive to receiving from the client input specifying that unbilled amounts are to be received from the first law firm after the end of the accrual period:
determining the accrual amount by summing the amounts of the invoices.

13. The method of claim 1, wherein the client has an accounts payable department that receives law firm invoices, the method further comprising:
receiving for the client from a law firm an invoice for a distinguished matter;
determining, for the distinguished matter, that at least one unbilled amount is uploaded by the law firm before an end of a month; and
omitting to send the invoice to the client's accounts payable department.

14. The method of claim 1, wherein the client has an accounts payable department that receives law firm invoices, the method further comprising:
receiving for the client from a first law firm an invoice for a distinguished matter;

determining, for the distinguished matter, that an unbilled amount is uploaded by the first law firm during a review period during which the client reviews unbilled amounts; and omitting to send the invoice to the client's accounts payable department.

15. The method of claim 1, wherein the client has an accounts payable department that receives vendor invoices, the method further comprising:
   receiving for the client from a first law firm an invoice for a distinguished matter;
   determining, for the distinguished matter, that an unbilled amount is uploaded by the first law firm during a review period during which the client reviews unbilled amounts; and
   reducing the unbilled amount by the amount of the invoice.

16. The method of claim 1, wherein the client has an accounts payable department that receives law firm invoices, the method further comprising:
   receiving for the client from a first law firm an invoice for a distinguished matter;
   determining, for the distinguished matter, that an unbilled amount is uploaded by the first law firm during a review period during which the client reviews unbilled amounts;
   permitting the first law firm to upload the invoice for the distinguished matter;
   omitting to deliver the invoice to the client for review during the review period;
   omitting to include the invoice in any unbilled amount that has been uploaded for the distinguished matter; and
   sending the invoice to the client's accounts payable department after the review period has elapsed and an accrual amount has been generated.

17. The method of claim 1, further comprising:
   providing a summary of unbilled amounts for the plurality of matters, wherein the user interface control is provided simultaneously with the providing of the summary.

18. The method of claim 17, wherein the provided summary is a summary of unbilled amounts across a plurality of law firms.

19. The method of claim 17, wherein the summary comprises a plurality of dollar values that includes the at least one dollar value further comprising: simultaneously with the providing of the summary and the providing of the user interface control, providing with respect to at least one of the plurality of dollar values a second iconic indication that the at least one of the plurality of dollar value values relates to at least one law firm matter budget that requires approval.

20. The method of claim 17, wherein the provided summary is comprised comprises a plurality of dollar values that includes the at least one dollar value, further comprising: and wherein the iconic indication is provided simultaneously with the providing of the summary and the providing of the user interface control.

21. The method of claim 17, wherein the summary comprises a plurality of dollar values that includes the at least one dollar value further comprising:
   providing with respect to at least one of the plurality of dollar values a second iconic indication that the at least one of the plurality of dollar values relates to at least one matter for which an unbilled amount has been estimated on a basis of matter budgets.

22. The method of claim 1, wherein the client has an accounts payable department that receives vendor invoices, further comprising:
   receiving for the client from a law firm an invoice for a distinguished matter; and
   sending to the client's accounts payable department an invoice payment file that includes the received invoice, an accrual amount against which the received invoice applies, an original accrual amount, a balance prior to receiving the invoice, and a balance after receiving the invoice.

23. The method of claim 1, further comprising:
   receiving for the client from a law firm an invoice for a distinguished matter; and
   generating an audit flag in response to determining that the received invoice exceeds an unbilled amount that has been uploaded for the distinguished matter.

24. The method of claim 1, further comprising:
   requiring the client to review and approve the provided at least one uploaded unbilled amount for the one or more second matters; and
   providing to the client an indication that the provided at least one uploaded unbilled amount is to be reviewed and approved.

25. The method of claim 24, further comprising:
   in response to determining that a first law firm has failed to upload at least one unbilled amount for one or more matters for which an unbilled amount is required to be uploaded:
      requiring the client to enter at least one unbilled amount for the one or more matters for which the first law firm has failed to upload at least one unbilled amount before the client can approve the one or more matters.

26. The method of claim 1, further comprising:
   maintaining a list of one or more law firm users to whom notifications will be sent that unbilled amounts are due for one or more matters; and
   notifying the one or more law firm users on the list that unbilled amounts are due for one or more matters.

27. A billing system comprising at least one memory and at least one processor the billing system comprising:
   an initialization component configured to generate a matter cross-reference table that provides a data structure configured to map one law firm-specific identifier with one client-specific identifier;
   a matter management component configured to store the matter cross-reference table in the at least one memory;
   a law firm interface configured to receive from each of at least one law firm, for each of one or more first matters for a client, an unbilled amount for the first matter uploaded to the billing system via a network communication link, the unbilled amount being a monetary amount of accrued expenses for which no invoice has been generated by the law firm, wherein the unbilled amount is generated in a law firm-specific billing system and is uploaded according to a law firm-specific identifier associated with the first matter;
   a cross-referencing component configured to, for at least one uploaded unbilled amount, access the matter cross-reference table to identify a client specific identifier associated with one or more second matters corresponding to the law firm-specific identifier associated with the at least one uploaded unbilled amount;

a harmonization component configured to assign the at least one uploaded unbilled amount to the client-specific identifier associated with one or more second matters;

a client interface configured to receive a client request to view the at least one uploaded unbilled amount for the one or more second matters from among the one or more first matters via the network communication link, wherein the client is associated with the client-specific identifier; and a provisioning component configured to:
provide the client the at least one uploaded unbilled amount for one or more second matters, wherein the at least one uploaded unbilled amount for each of one or more second matters is provided according to the client-specific identifier associated with the second matter;
provide an iconic indication that at least one dollar value corresponding to at least one unbilled amount relates to at least one matter for which incomplete information has been received from the law firm; and
provide a user interface control with respect to which the client can perform a single interaction to approve the unbilled amounts for a plurality of matters, wherein at least one of the initialization component, the cross-referencing component, the harmonization component, and the provisioning component comprises computer-executable instructions stored in the at least one memory for execution by the at least one processor.

28. The system of claim 27, wherein the matter cross-reference table maps multiple law firm-specific identifiers to a single client-specific identifier.

29. The system of claim 27, further comprising an aggregation component configured to aggregate the at least one uploaded billed amount to generate a total unbilled amount.

30. The system of claim 27, wherein multiple law firms upload unbilled amounts via the law firm interface,
and wherein the system further comprises an aggregation component configured to aggregate the uploaded unbilled amounts from the multiple law firms to generate a total unbilled amount.

31. The system of claim 27, wherein a first law firm user uploads via the law firm interface unbilled amounts generated by the first law firm-specific billing system,
and wherein a second law firm user uploads via the law firm interface unbilled amounts that are not generated by the first law firm-specific billing system.

32. The system of claim 27, wherein the client has an accounts payable department that receives law firm invoices, and wherein the law firm interface is further configured to receive for the client from a first law firm invoices for one or more distinguished matters,
and wherein the system further comprises:
a screening component configured to omit to send the invoices to the client's accounts payable department; and
an analysis component configured to generate an accrual amount by summing at least one uploaded unbilled amount and the amounts of the invoices.

33. The system of claim 27, wherein the client interface further comprises:
an interaction component configured to solicit from the client input specifying either that (1) unbilled amounts are to be received from the first law firm before an end of an accrual period or that (2) unbilled amounts are to be received from the first law firm after the end of the accrual period, and further configured to receive from the client the solicited input; and
an analysis component configured to generate an accrual amount,
and wherein, in response to determining that unbilled amounts are to be received from the first law firm before the end of the accrual period:
the law firm interface is further configured to receive from the first law firm unbilled amounts for prior months and an estimate of unbilled amounts for a current month; and
wherein the analysis component is further configured to:
determine an unbilled amounts total by summing the unbilled amounts for prior months and the estimate of unbilled amounts for the current month, and
determine an accrual amount by summing the unbilled amounts total and the amounts of the invoices,
and wherein, in response to determining that unbilled amounts are to be received from the first law firm after the end of the accrual period:
the law firm interface is further configured to receive from the first law firm unbilled amounts for prior months; and
the analysis component is configured to determine the accrual amount by summing the unbilled amounts for prior months and the amounts of the invoices.

34. The system of claim 33, wherein, in response to determining that unbilled amounts are to be received from the first law firm before the end of the accrual period, the interaction component is further configured to receive an indication of whether the estimate of unbilled amounts for the current month is (1) an estimate for an entirety of the current month or (2) an estimate for a portion of the current month,
and wherein, in response to determining that the estimate of the unbilled amounts for the current month is an estimate for the entirety of the current month:
the analysis component is configured to determine the unbilled amounts total by summing the unbilled amounts for prior months and the estimate of unbilled amounts for the entirety of the current month,
and wherein, in response to determining that the estimate of the unbilled amounts for the current month is an estimate for a portion of the current month:
the analysis component is configured to:
determine an estimate of unbilled amounts for the entirety of the current month by prorating the estimate for the portion of the current month, and
determine the unbilled amounts total by summing the unbilled amounts for prior months and the estimate of unbilled amounts for the entirety of the current month.

35. The system of claim 34, wherein the interaction component receives the indication from the client.

36. The system of claim 34, wherein the interaction component receives the indication from the first law firm.

37. The system of claim 34, wherein the unbilled amounts total determined by the analysis component further includes (1) invoices that have been uploaded by the first law firm but have not been delivered to the client and (2) any other withheld amounts.

38. The system of claim 27, wherein the client interface further comprises:
an interaction component configured to solicit from the client input specifying either that (1) unbilled amounts are to be received from the first law firm before an end of an accrual period or that (2) unbilled amounts are to be received from the first law firm after the end of the accrual period, and receive from the client the solicited input; and an analysis component configured to generate an accrual amount, and wherein, in response to determining that unbilled amounts are to be received from the first law firm before the end of the accrual period:

the law firm interface is further configured to receive from the first law firm an estimate of unbilled amounts for a current month; and the analysis component is further configured to determine an accrual amount by summing the estimate of unbilled amounts for the current month and the amounts of the invoices, and wherein, in response to determining that unbilled amounts are to be received from the first law firm after the end of the accrual period:

the analysis component is further configured to determine the accrual amount by summing the amounts of the invoices.

39. The system of claim 27, wherein the client has an accounts payable department that receives law firm invoices, and wherein the law firm interface is further configured to receive for the client from a first law firm an invoice for a distinguished matter;

and wherein the system further comprises a screening component configured to:

for the distinguished matter, determine that at least one unbilled amount is uploaded by the first law firm before an end of a month, and omit to send the invoice to the client's accounts payable department.

40. The system of claim 27, wherein the client has an accounts payable department that receives law firm invoices, and wherein the law firm interface is further configured to receive for the client from a first law firm an invoice for a distinguished matter;

and wherein the system further comprises a screening component configured to:

for the distinguished matter, determine that at least one unbilled amount is uploaded by the first law firm during a review period during which the client reviews unbilled amounts, and omit to send the invoice to the client's accounts payable department.

41. The system of claim 27, wherein the client has an accounts payable department that receives law firm invoices, and wherein the law firm interface is further configured to receive for the client from a first law firm an invoice for a distinguished matter;

and wherein the system further comprises a screening component configured to:

for the distinguished matter, determine that an unbilled amount is uploaded by the first law firm during a review period during which the client reviews unbilled amounts, and reduce the unbilled amount by the amount of the invoice.

42. The system of claim 27, wherein the client has an accounts payable department that receives law firm invoices, and wherein the law firm interface is further configured to receive for the client from a first law firm an invoice for a distinguished matter;

and wherein the system further comprises a screening component configured to:

for the distinguished matter, determine that an unbilled amount is uploaded by the first law firm during a review period during which the client reviews unbilled amounts, permit the first law firm to upload the invoice for the distinguished matter, omit to deliver the invoice to the client for review during the review period, omit to include the invoice in any unbilled amount that has been uploaded for the distinguished matter, and send the invoice to the client's accounts payable department after the review period has elapsed and an accrual amount has been generated.

43. The system of claim 27, wherein the provisioning component is further configured to:

provide a summary of unbilled amounts for the plurality of matters, wherein the user interface control is provided simultaneously with the providing of the summary.

44. The system of claim 43, wherein the summary is a summary of unbilled amounts across a plurality of law firms.

45. The system of claim 43, wherein the summary comprises a plurality of dollar values that includes at least one dollar value, and wherein the provisioning component is further configured to provide with respect to at least one of the dollar values a second iconic indication that the at least one of the plurality of dollar values relates to at least one law firm matter budget that requires approval.

46. The system of claim 43, wherein the summary is comprised of a plurality of dollar values that includes the at least one dollar value, and wherein the iconic indication is provided simultaneously with the providing of the summary and the user interface control.

47. The system of claim 43, wherein the summary is comprised of a plurality of dollar values that includes the at least one dollar value, and wherein the provisioning component is further configured to:

provide with respect to at least one of the plurality of dollar values a second iconic indication that the at least one of the plurality of dollar values relates to at least one matter for which at least one unbilled amount has been estimated on a basis of matter budgets.

48. The system of claim 27, wherein the client has an accounts payable department that receives law firm invoices, and wherein the law firm interface is further configured to receive for the client from a law firm an invoice for a distinguished matter, and wherein the billing system further comprises an output component configured to send to the client's accounts payable department an invoice payment file that includes the received invoice, an accrual amount against which the received invoice applies, an original accrual amount, a balance prior to receiving the invoice, and a balance after receiving the invoice.

49. The system of claim 27, wherein the law firm interface is further configured to receive for the client from a law firm an invoice for a distinguished matter, and wherein the system further comprises an audit component configured to generate an audit flag in response to determining that the received invoice exceeds an unbilled amount that has been uploaded for the distinguished matter.

50. The system of claim 27, wherein the client interface is further configured to require a client user to review and approve the provided at least one uploaded unbilled amount for the one or more second matters, and wherein the provisioning component is further configured to provide to the client an indication that the provided at least one uploaded unbilled amount is to be reviewed and approved.

51. The system of claim 50, wherein in response determining that a first law firm has failed to upload at least one unbilled amount for one or more matters for which an unbilled amount is required to be uploaded:
the client interface is further configured to require the client to enter at least one unbilled amount for the one or more matters for which the first law firm has failed to upload at least one unbilled amount before the client can approve the one or more matters.

52. The system of claim 27, wherein the law firm interface further comprises:
an identification component configured to maintain a list of one or more law firm users to whom notifications will be sent that unbilled amounts are due for one or more matters; and
a notification component configured to notify the one or more law firm users on the list that unbilled amounts are due for one or more matters.

53. A non-transitory computer-readable medium having program code recorded, thereon for providing a billing system, the program code comprising:
program code for causing a computer to generate a matter cross-reference table that provides a data structure configured to map one law firm-specific identifier with one client-specific identifier;
program code for causing the computer to store the matter cross-reference table in computer memory;
program code for causing the computer to permit at least one law firm to upload, for each of one or more first matters for a client, an unbilled amount for the first matter to the billing system via a network communication link, the unbilled amount being a monetary amount of accrued expenses for which no invoice has been generated by the law firm, wherein the unbilled amount is generated in a law firm-specific billing system and is uploaded according to a law firm-specific identifier associated with the first matter;
program code for causing the computer to access, for at least one uploaded unbilled amount, the matter cross-reference table to identify a client-specific identifier associated with one or more second matters corresponding to the law firm-specific identifier associated with the at least one uploaded unbilled amount;
program code for causing the computer to assign the at least one uploaded unbilled amount to the client-specific identifier associated with one or more second matters;
program code for causing the computer to receive a client request to view the at least one uploaded unbilled amount for the one or more second matters from among the one or more first matters via the network communication link, wherein the client is associated with the client-specific identifier;
program code for causing the computer to provide to the client the at least one uploaded unbilled amount for one or more second matters, wherein the at least one uploaded unbilled amount for each of the one or more second matters is provided according to the client-specific identifier associated with the second matter;
program code for causing the computer to provide an iconic indication that at least one dollar value corresponding to at least one unbilled amount relates to at least one matter for which incomplete information has been received from the law firm; and
program code for causing the computer to provide a user interface control with respect to which the client can perform a single interaction to approve the unbilled amounts for a plurality of matters.

54. The non-transitory computer-readable medium of claim 53, wherein the matter cross-reference table maps multiple law firm-specific identifiers to a single client-specific identifier.

55. The non-transitory computer-readable medium of claim 53, wherein the program code further comprises program code to aggregate the at least one uploaded unbilled amount to generate a total unbilled amount.

56. The non-transitory computer-readable medium of claim 53, wherein multiple law firms upload unbilled amounts and the uploaded unbilled amounts from the multiple law firms are aggregated to generate a total unbilled amount.

57. The non-transitory computer-readable medium of claim 53, wherein a first law firm user uploads unbilled amounts generated by a first law firm-specific billing system, and
wherein a second law firm user uploads unbilled amounts that are not generated by the first law firm-specific billing system.

58. The non-transitory computer-readable medium of claim 53, wherein the client has an accounts payable department that receives law firm invoices, and wherein the program code further comprises:
program code for causing the computer to receive for the client from a first law firm invoices for one or more distinguished matters;
program code for causing the computer to omit to send the invoices to the client's accounts payable department; and
program code for causing the computer to determine an accrual amount by summing at least one uploaded unbilled amount and the amounts of the invoices.

59. The non-transitory computer-readable medium of claim 58, wherein the program code further comprises:
program code for causing the computer to solicit from the client input specifying either that (1) unbilled amounts are to be received from the first law firm before an end of an accrual period or that (2) unbilled amounts are to be received from the first law firm after the end of the accrual period;
program code for causing the computer to receive from the client the solicited input;
in response to receiving from the client input specifying that unbilled amounts are to be received from the law firm before the end of the accrual period:
program code for causing the computer to receive from the first law firm unbilled amounts for prior months and an estimate of unbilled amounts for a current month,
program code for causing the computer to determine an unbilled amounts total by summing the unbilled amounts for prior months and the estimate of unbilled amounts for the current month, and
program code for causing the computer to determine the accrual amount by summing the unbilled amounts total and the amounts of the invoices; and
in response to receiving from the client input specifying that unbilled amounts are to be received from the law firm after the end of the accrual period:

program code for causing the computer to receive from the first law firm unbilled amounts for prior months, and program code for causing the computer to determine the accrual amount by summing the unbilled amounts for prior months and the amounts of the invoices.

60. The non-transitory computer-readable medium of claim 59, wherein the program code further comprises in response to receiving from the client input specifying that unbilled amounts are to be received from the first law firm before the end of the accrual period:

program code for causing the computer to receive an indication of whether the estimate of unbilled amounts for the current month is (1) an estimate for an entirety of the current month or (2) an estimate for a portion of the current month;

in response to receiving an indication that the estimate of unbilled amounts for the current month is an estimate for the entirety of the current month:

program code for causing the computer to determine the unbilled amounts total by summing the unbilled amounts for prior months and the estimate of unbilled amounts for the entirety of the current month; and in response to receiving an indication that the estimate of unbilled amounts for the current month is an estimate for a portion of the current month:

program code for causing the computer to determine an estimate of unbilled amounts for the entirety of the current month by prorating the estimate for the portion of the current month, and program code for causing the computer to determine the unbilled amounts total by summing the unbilled amounts for prior months and the estimate of unbilled amounts for the entirety of the current month.

61. The non-transitory computer-readable medium of claim 60, wherein the indication is received from the client.

62. The non-transitory computer-readable medium of claim 60, wherein the indication is received from the first law firm.

63. The non-transitory computer-readable medium of claim 60, wherein the unbilled amounts total further includes (1) invoices that have been uploaded by the first law firm but have not been delivered to the client and (2) any other withheld amounts.

64. The non-transitory computer-readable medium of claim 58, wherein the program code further comprises:

program code for causing the computer to solicit from the client input specifying either that (1) unbilled amounts are to be received from the law firm before an end of an accrual period or that (2) unbilled amounts are to be received from the law firm after the end of the accrual period;

program code for causing the computer to receive from the client the solicited input;

in response to receiving from the client input specifying that unbilled amounts are to be received from the law firm before the end of the accrual period:

program code for causing the computer to receive from the first law firm an estimate of unbilled amounts for a current month, program code for causing the computer to determine the accrual amount by summing the estimate of unbilled amounts for the current month and the amounts of the invoices; and in response to receiving from the client input specifying that unbilled amounts are to be received from the first law firm after the end of the accrual period:

program code for causing the computer to determine the accrual amount by summing the amounts of the invoices.

65. The non-transitory computer-readable medium of claim 53, wherein the client has an accounts payable department that receives law firm invoices, and wherein the program code further comprises:

program code for causing the computer to receive for the client from a law firm an invoice for a distinguished matter;

for the distinguished matter, program code for causing the computer to determine that at least one unbilled amount is uploaded by the law firm before an end of a month; and program code for causing the computer to omit to send the invoice to the client's accounts payable department.

66. The non-transitory computer-readable medium of claim 53, wherein the client has an accounts payable department that receives law firm invoices, and wherein the program code further comprises:

program code for causing the computer to receive for the client from a first law firm an invoice for a distinguished matter;

for the distinguished matter, program code for causing the computer to determine that an unbilled amount is uploaded by the first law firm during a review period during which the client reviews unbilled amounts; and program code for causing the computer to omit to send the invoice to the client's accounts payable department.

67. The non-transitory computer-readable medium of claim 53, wherein the client has an accounts payable department that receives law firm invoices, and wherein the program code further comprises:

program code for causing the computer to receive for the client from a first law firm an invoice for a distinguished matter;

for the distinguished matter, program code for causing the computer to determine that an unbilled amount for the distinguished matter is uploaded by the law firm during a review period during which the client reviews unbilled amounts; and program code for causing the computer to reduce the unbilled amount by the amount of the invoice.

68. The non-transitory computer-readable medium of claim 53, wherein the client has an accounts payable department that receives law firm invoices, and wherein the program code further comprises:

program code for causing the computer to receive for the client from a law firm an invoice for a distinguished matter;

for the distinguished matter, program code for causing the computer to determine that an unbilled amount is uploaded by the first law firm during a review period during which the client reviews unbilled amounts;

program code for causing the computer to permit the first law firm to upload the invoice for the distinguished matter;

program code for causing the computer to omit to deliver the invoice to the client for review during the review period;

program code for causing the computer to omit to include the invoice in any unbilled amount that has been uploaded for the distinguished matter; and program code for causing the computer to send the invoice to the client's accounts payable department after the review period has elapsed and an accrual amount has been generated.

69. The non-transitory computer-readable medium of claim 53, wherein the program code further comprises:
program code for causing the computer to provide a summary of unbilled amounts for the plurality of matters, wherein the user interface is provided simultaneously with the providing of the summary.

70. The non-transitory computer-readable medium of claim 69, wherein the summary is a summary of unbilled amounts across a plurality of law firms.

71. The non-transitory computer-readable medium of claim 69, wherein the summary is comprised of a plurality of dollar values that includes the at least one dollar value and wherein the program code further comprises:
program code for causing the computer to provide with respect to at least one of the plurality of dollar values a second iconic indication that the at least one of the plurality of dollar values relates to a law firm matter budget that requires approval.

72. The non-transitory computer-readable medium of claim 69, wherein the summary is comprised of a plurality of dollar values that includes the at least one dollar value, and wherein the program code further comprises:
program code for causing the computer to provide the iconic indication simultaneously with the providing of the summary and the providing of the user interface control.

73. The non-transitory computer-readable medium of claim 69, wherein the summary is comprised of a plurality of dollar values that includes the at least one dollar value, and wherein the program code further comprises:
program code for causing the computer to provide with respect to at least one of the plurality of dollar values a second iconic indication that the at least one of the plurality of dollar values relates to at least one matter for which at least one unbilled amount has been estimated on a basis of matter budgets.

74. The non-transitory computer-readable medium of claim 53, wherein the client has an accounts payable department that receives law firm invoices, and wherein the program code further comprises:
program code for causing the computer to receive for the client from a law firm an invoice for a distinguished matter; and
program code for causing the computer to send to the client's accounts payable department an invoice payment file that includes the received invoice, an accrual amount against which the received invoice applies, an original accrual amount, a balance prior to receiving the invoice, and a balance after receiving the invoice.

75. The non-transitory computer-readable medium of claim 53, wherein the program code further comprises:
program code for causing the computer to receive for the client from a law firm an invoice for a distinguished matter; and
program code for causing the computer to generate an audit flag in response to determining that the received invoice exceeds an unbilled amount that has been uploaded for the distinguished matter.

76. The non-transitory computer-readable medium of claim 53, wherein the program code further comprises:
program code for causing the computer to require the client to review and approve the provided at least one uploaded unbilled amount for the one or more second matters; and
program code for causing the computer to provide to the client an indication that the provided at least one uploaded unbilled amount is to be reviewed and approved.

77. The non-transitory computer-readable medium of claim 76, wherein the program code further comprises:
program code for causing the computer to require, in response to determining that a first law firm has failed to upload at least one unbilled amount for one or more matters for which an unbilled amount is required to be uploaded, the client to enter at least one unbilled amount for the one or more matters for which the first law firm has failed to upload at least one unbilled amount before a client user can approve the one or more matters.

78. The non-transitory computer-readable medium of claim 53, wherein the program code further comprises:
program code for causing the computer to maintain a list of one or more law firm users to whom notifications will be sent that unbilled amounts are due for one or more matters; and
program code for causing the computer to notify the one or more law firm users on the list that unbilled amounts are due for one or more matters.

* * * * *

UNITED STATES PATENT AND TRADEMARK OFFICE
CERTIFICATE OF CORRECTION

| | | |
|---|---|---|
| PATENT NO. | : 9,978,097 B1 | |
| APPLICATION NO. | : 11/847258 | |
| DATED | : May 22, 2018 | |
| INVENTOR(S) | : Thomas G. Melling et al. | |

It is certified that error appears in the above-identified patent and that said Letters Patent is hereby corrected as shown below:

In the Claims

At Column 31, Claim number 19, beginning on Line number 45 and ending on Line number 53, delete the claim below:
"19. The method of claim 17, wherein the summary comprises a plurality of dollar values that includes the at least one dollar value further comprising:
    simultaneously with the providing of the summary and the providing of the user interface control, providing with respect to at least one of the plurality of dollar values a second iconic indication that the at least one of the plurality of dollar value values relates to at least one law firm matter budget that requires approval."

And replace with:
--19. The method of claim 17, wherein the summary comprises a plurality of dollar values that includes the at least one dollar value, further comprising:
    providing with respect to at least one of the plurality of dollar values a second iconic indication that the at least one of the plurality of dollar values relates to at least one law firm matter budget that requires approval.--.

At Column 31, Claim number 20, beginning on Line number 54 and ending on Line number 59, delete the claim below:
"20. The method of claim 17, wherein the provided summary is comprised comprises a plurality of dollar values that includes the at least one dollar value, further comprising: and wherein the iconic indication is provided simultaneously with the providing of the summary and the providing of the user interface control."

Signed and Sealed this
Third Day of July, 2018

Andrei Iancu
*Director of the United States Patent and Trademark Office*

And replace with:
--20. The method of claim 17, wherein the summary comprises a plurality of dollar values that includes the at least one dollar value, and wherein the iconic indication is provided simultaneously with the providing of the summary and the providing of the user interface control.--.

At Column 31, Claim number 21, Line number 62, insert --,-- after "value".

At Column 41, Claim number 71, Line number 16, insert --,-- after "value".